(12) United States Patent
Ozaki

(10) Patent No.: US 10,489,929 B2
(45) Date of Patent: Nov. 26, 2019

(54) INFORMATION PROCESSING APPARATUS, INFORMATION PROCESSING METHOD, AND INFORMATION PROCESSING SYSTEM

(71) Applicant: SONY CORPORATION, Tokyo (JP)

(72) Inventor: Koji Ozaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/539,718

(22) PCT Filed: Oct. 9, 2015

(86) PCT No.: PCT/JP2015/078843
§ 371 (c)(1),
(2) Date: Jun. 26, 2017

(87) PCT Pub. No.: WO2016/111066
PCT Pub. Date: Jul. 14, 2016

(65) Prior Publication Data
US 2018/0012373 A1    Jan. 11, 2018

(30) Foreign Application Priority Data

Jan. 7, 2015    (JP) ................................. 2015-001409

(51) Int. Cl.
*G06T 7/70*    (2017.01)
*G01B 11/00*    (2006.01)
*G08G 1/005*    (2006.01)
*G06K 9/00*    (2006.01)
*H04N 5/247*    (2006.01)
(Continued)

(52) U.S. Cl.
CPC ............... *G06T 7/70* (2017.01); *G01B 11/00* (2013.01); *G06K 9/00771* (2013.01); *G06K 9/00805* (2013.01); *G06T 7/73* (2017.01); *G08G 1/005* (2013.01); *G08G 1/166* (2013.01);
(Continued)

(58) Field of Classification Search
CPC ........ G01C 21/26; G01C 21/28; G01B 11/00; G08G 1/005; G08G 1/166; G06K 9/00805; G06K 9/00771; H04N 5/247; G06T 7/70
See application file for complete search history.

(56) References Cited

U.S. PATENT DOCUMENTS

| 2003/0156189 A1 | 8/2003 | Utsumi et al. |
| 2006/0115117 A1 | 6/2006 | Nagaoka et al. |
| 2017/0256042 A1* | 9/2017 | Torma ................. H04N 13/236 |

FOREIGN PATENT DOCUMENTS

| CN | 103975221 A | 8/2014 |
| HK | 1197294 A1 | 1/2015 |

(Continued)

OTHER PUBLICATIONS

International Search Report and Written Opinion of PCT Application No. PCT/JP2015/078843, dated Jan. 12, 2016, 02 pages of English Translation and 08 pages of ISRWO.

*Primary Examiner* — Brenda C Bernardi
(74) *Attorney, Agent, or Firm* — Chip Law Group

(57) ABSTRACT

Provided is an information processing apparatus, including a position estimating unit configured to estimate a position of a second imaging apparatus on the basis of a first captured image captured by a first imaging apparatus whose position is specified and a second captured image captured at a time corresponding to the first captured image by the second imaging apparatus serving as a position estimation target.

20 Claims, 41 Drawing Sheets

(51) Int. Cl.
*G08G 1/16* (2006.01)
*G06T 7/73* (2017.01)

(52) U.S. Cl.
CPC ... *H04N 5/247* (2013.01); *G06T 2207/30232* (2013.01); *G06T 2207/30244* (2013.01)

(56) References Cited

FOREIGN PATENT DOCUMENTS

| | | | |
|---|---|---|---|
| JP | 2003-279315 A | | 10/2003 |
| JP | 2005-098927 A | | 4/2005 |
| JP | 2005-241323 A | | 9/2005 |
| JP | 2005241323 A | * | 9/2005 |
| JP | 2006-153768 A | | 6/2006 |
| JP | 2014-137321 A | | 7/2014 |
| JP | 2014236426 A | * | 12/2014 |
| WO | 2013/088626 A1 | | 6/2013 |
| WO | WO-2013088626 A1 | * | 6/2013 ............... G08G 1/04 |

* cited by examiner

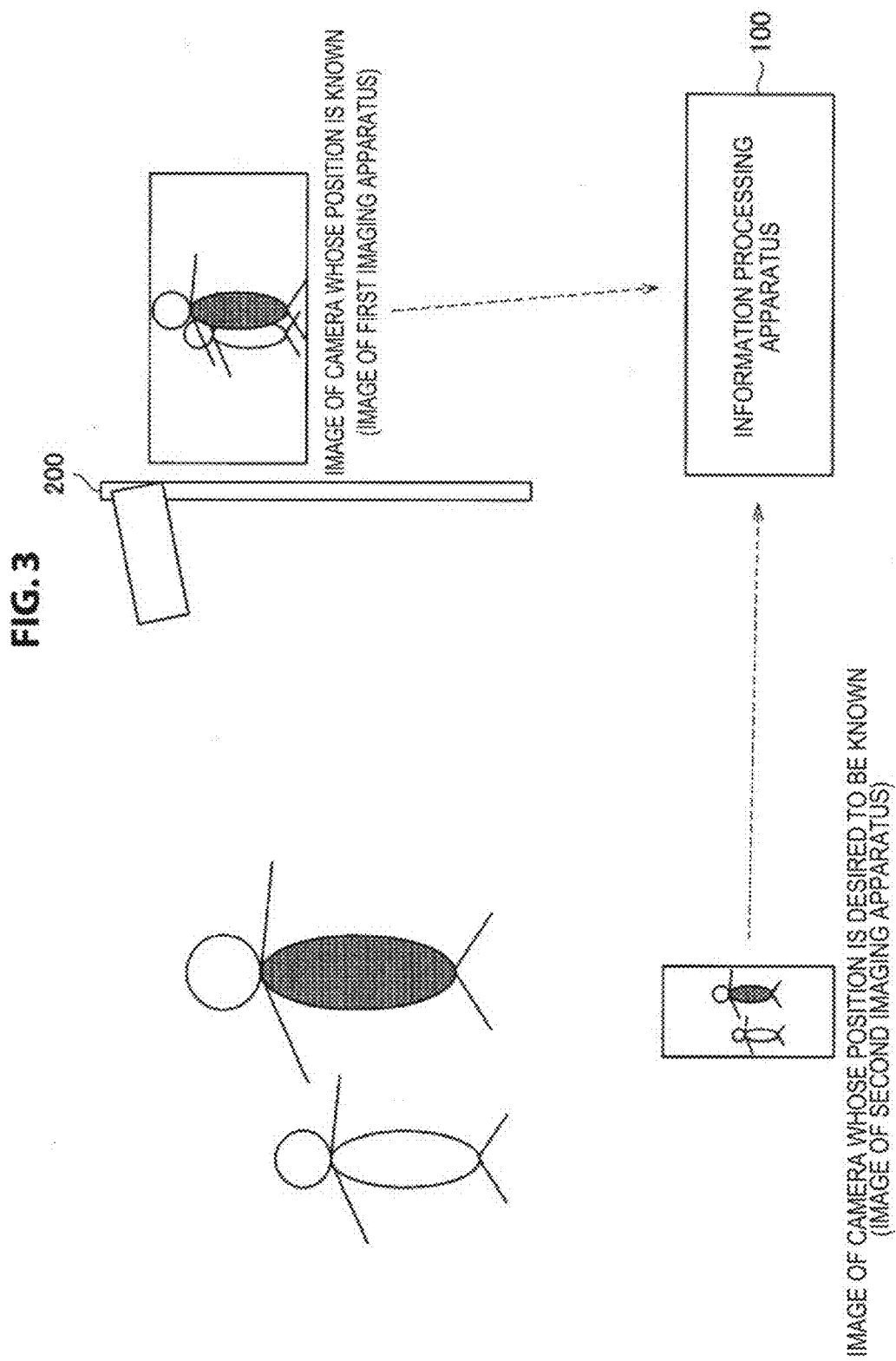

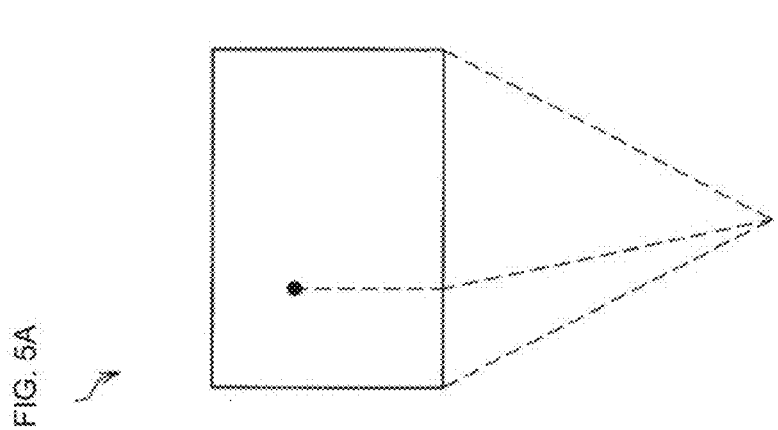

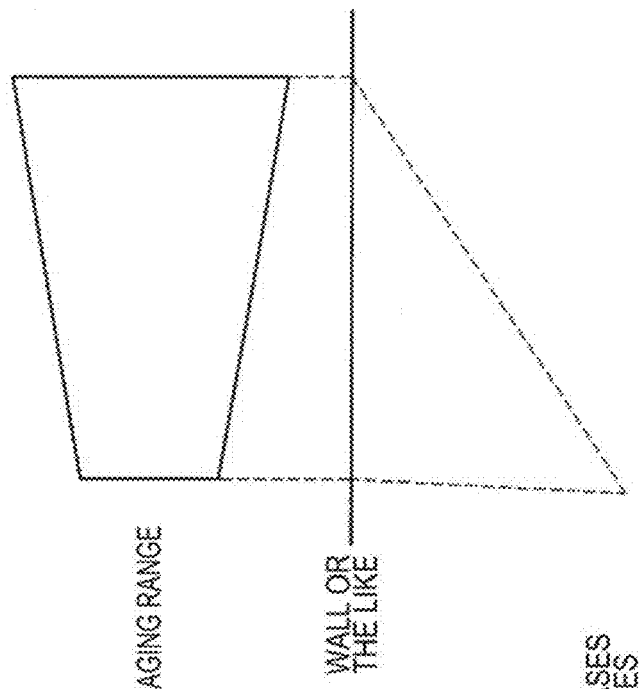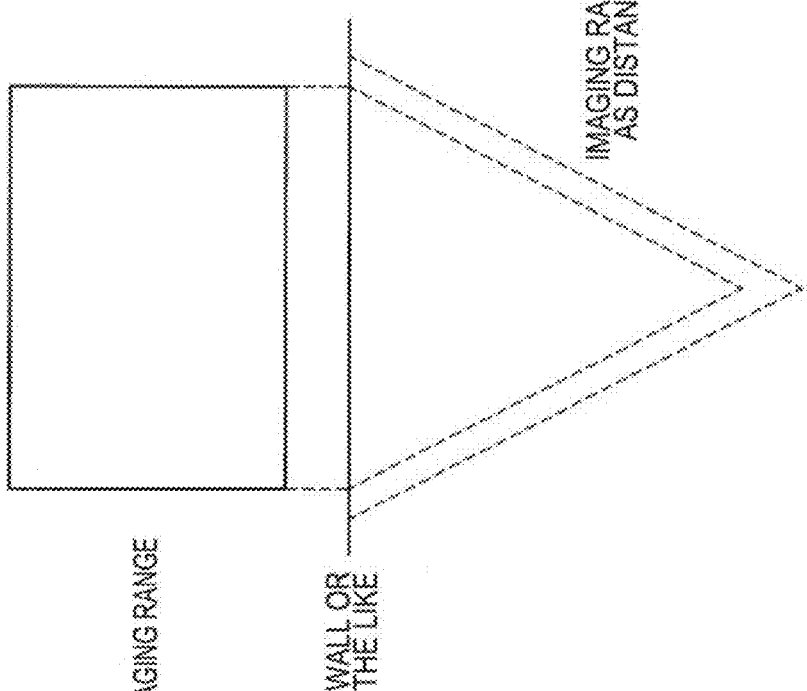

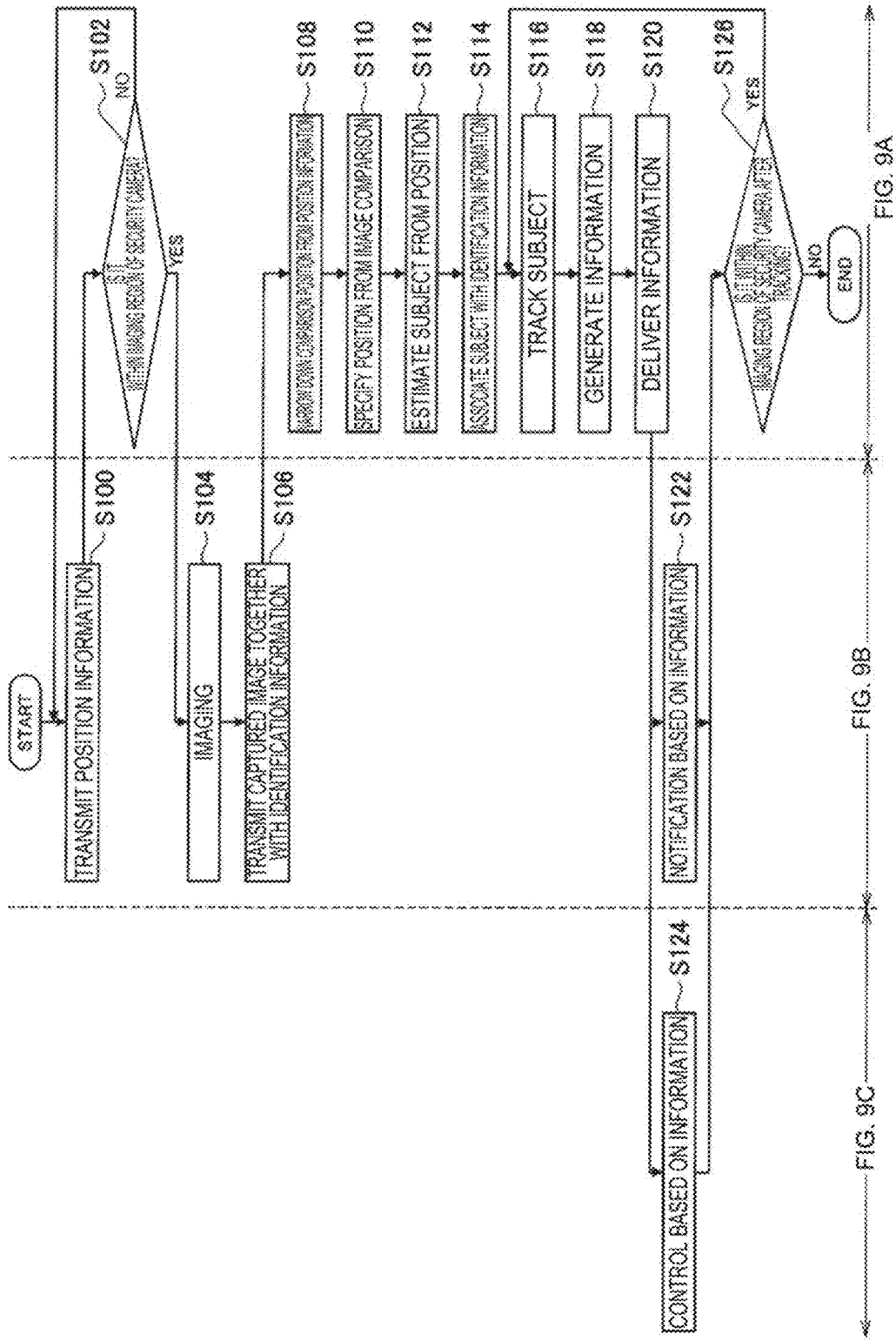

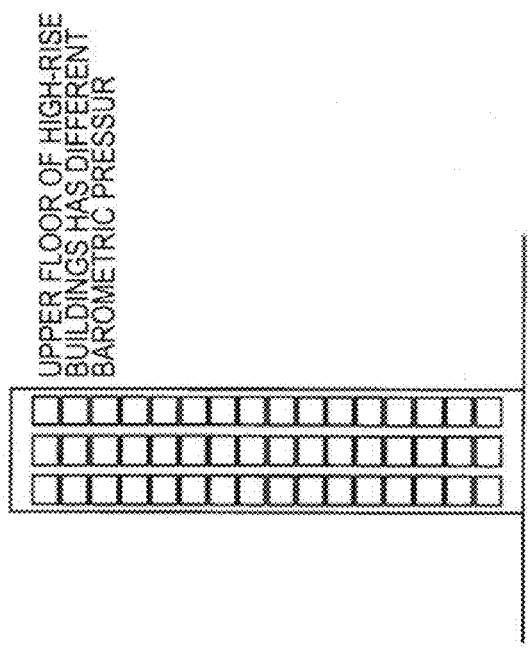
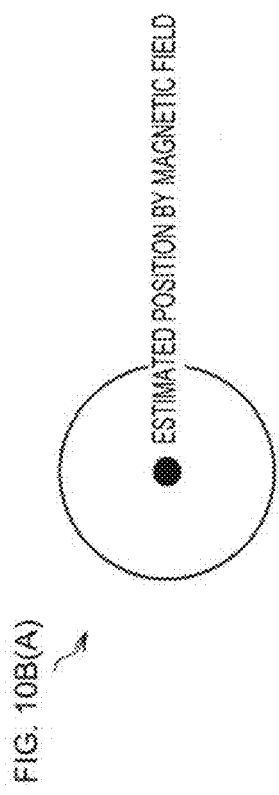
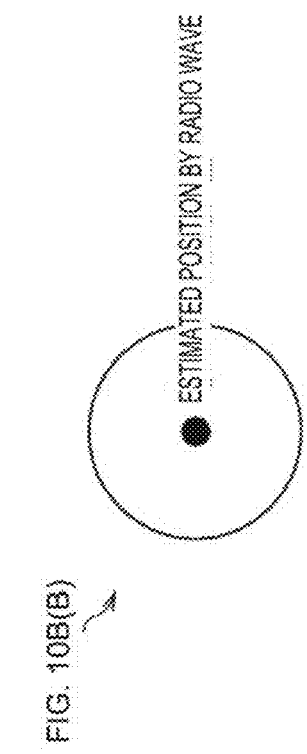
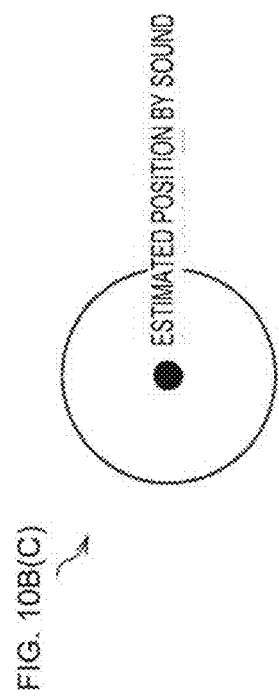

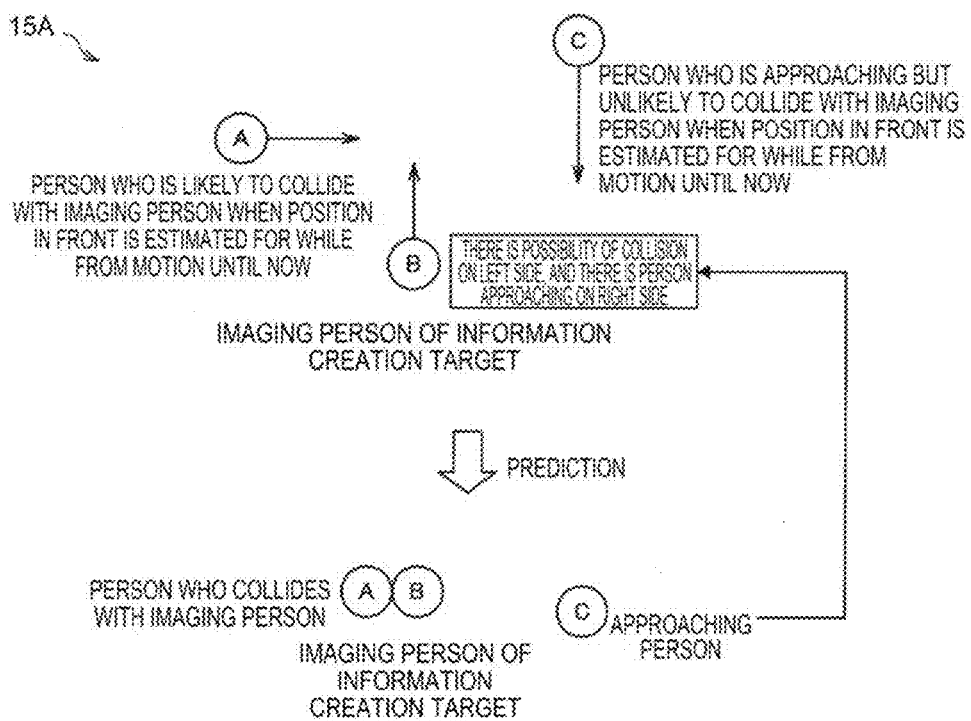
FIG. 15A
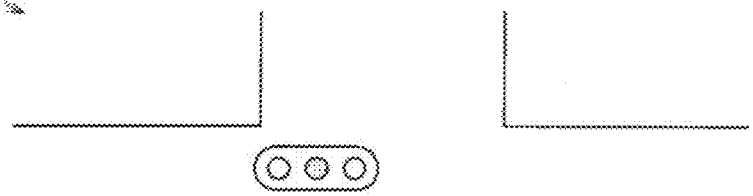
FIG. 15B
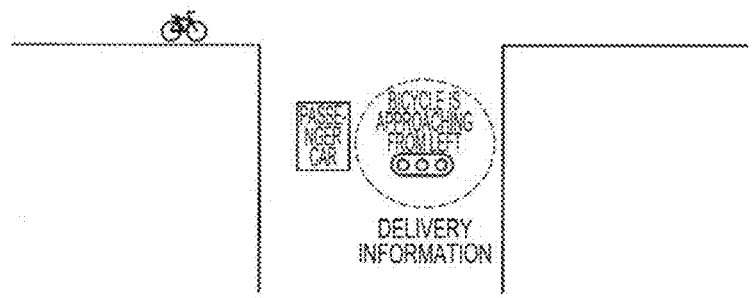

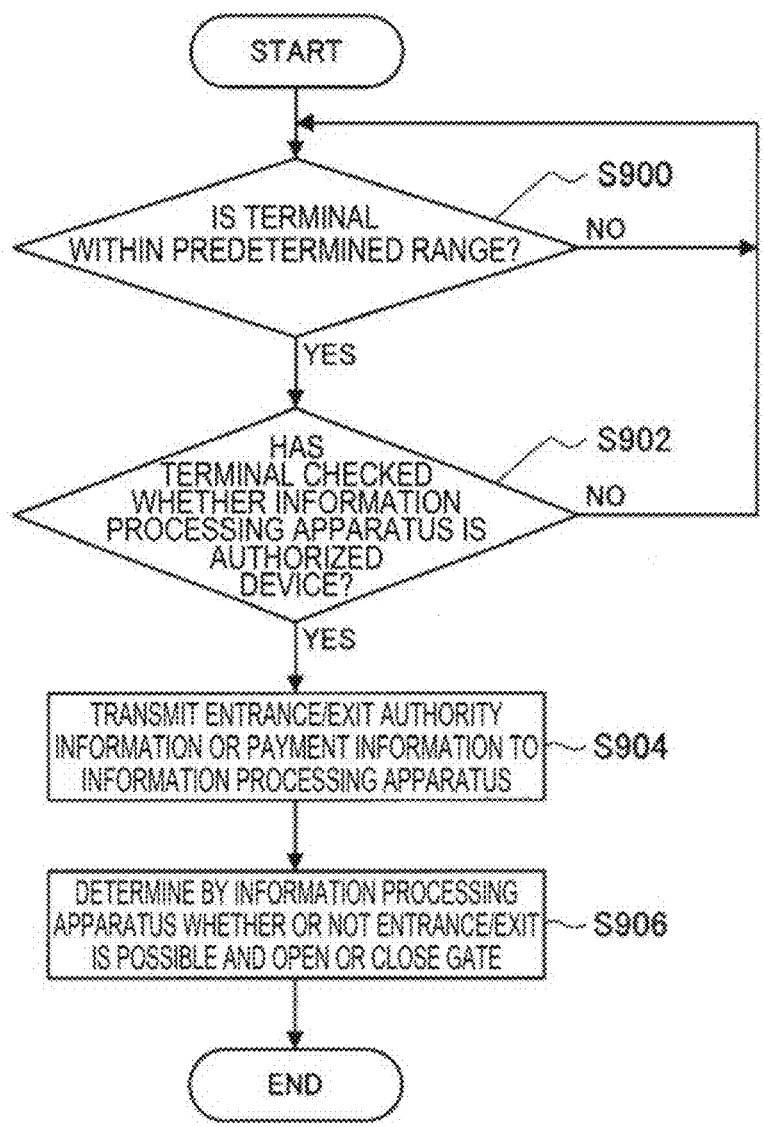

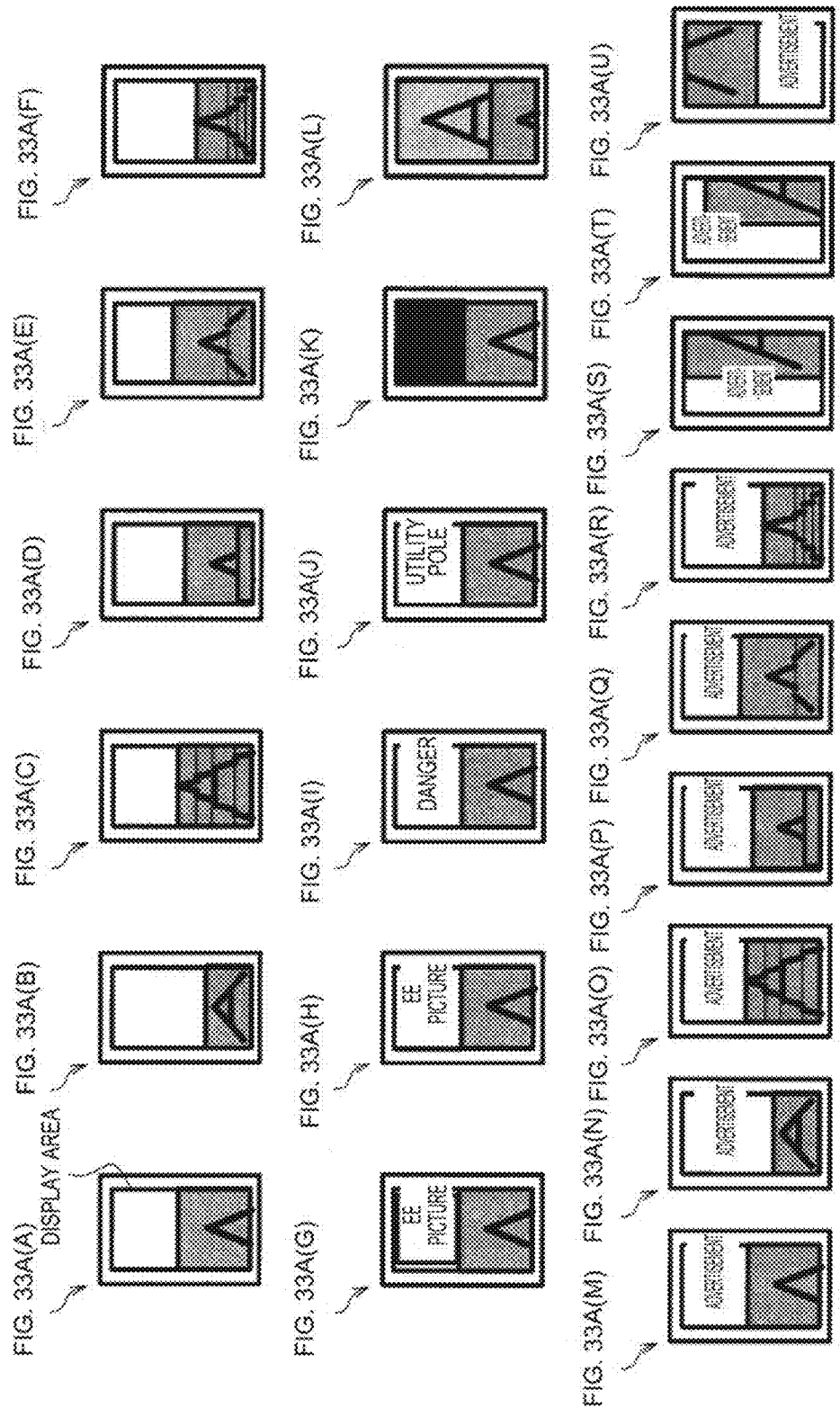

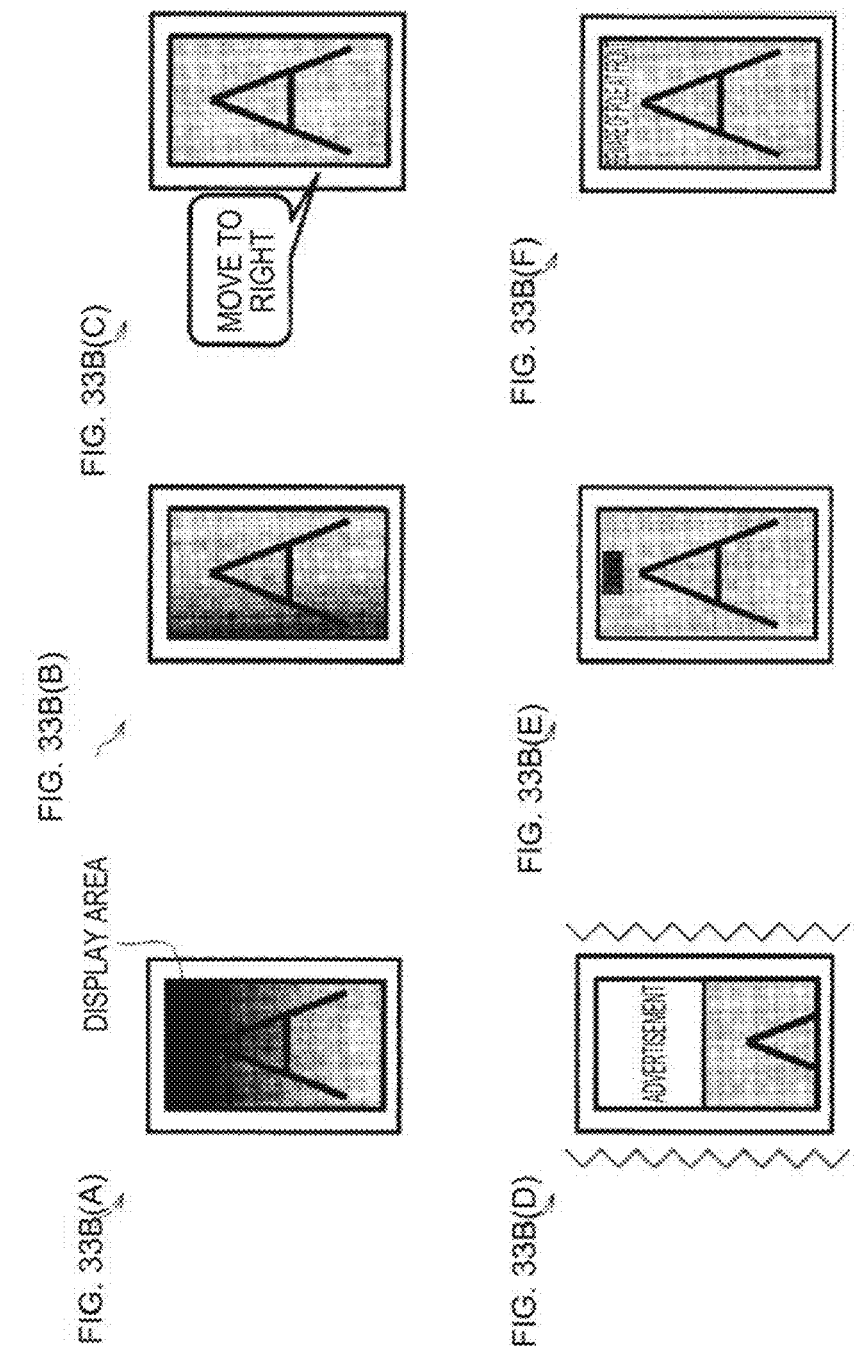

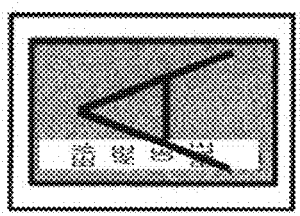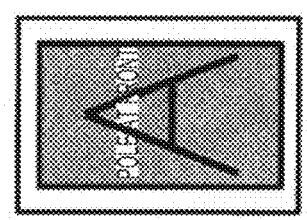
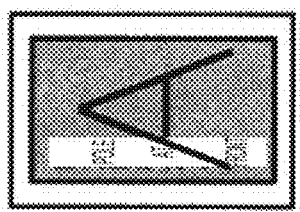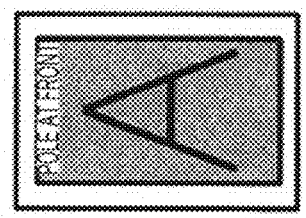
FIG. 33C(B)  FIG. 33C(D)
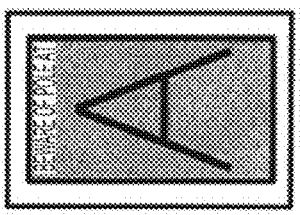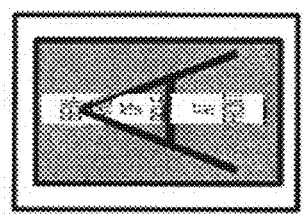
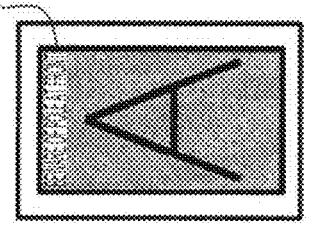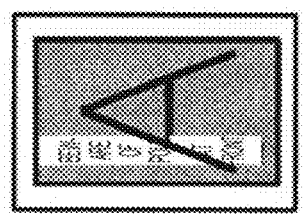
FIG. 33C(A)  FIG. 33C(C)

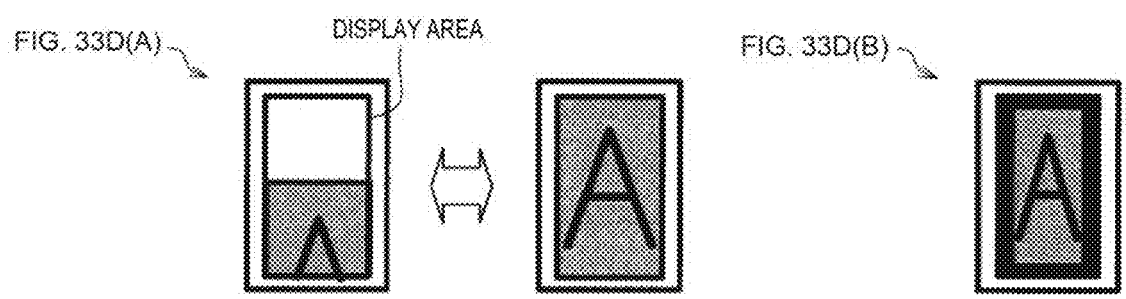

FIG. 33E(A) 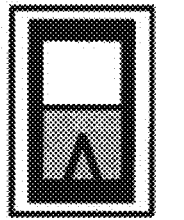  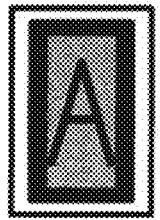   FIG. 33E(B) 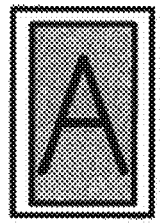

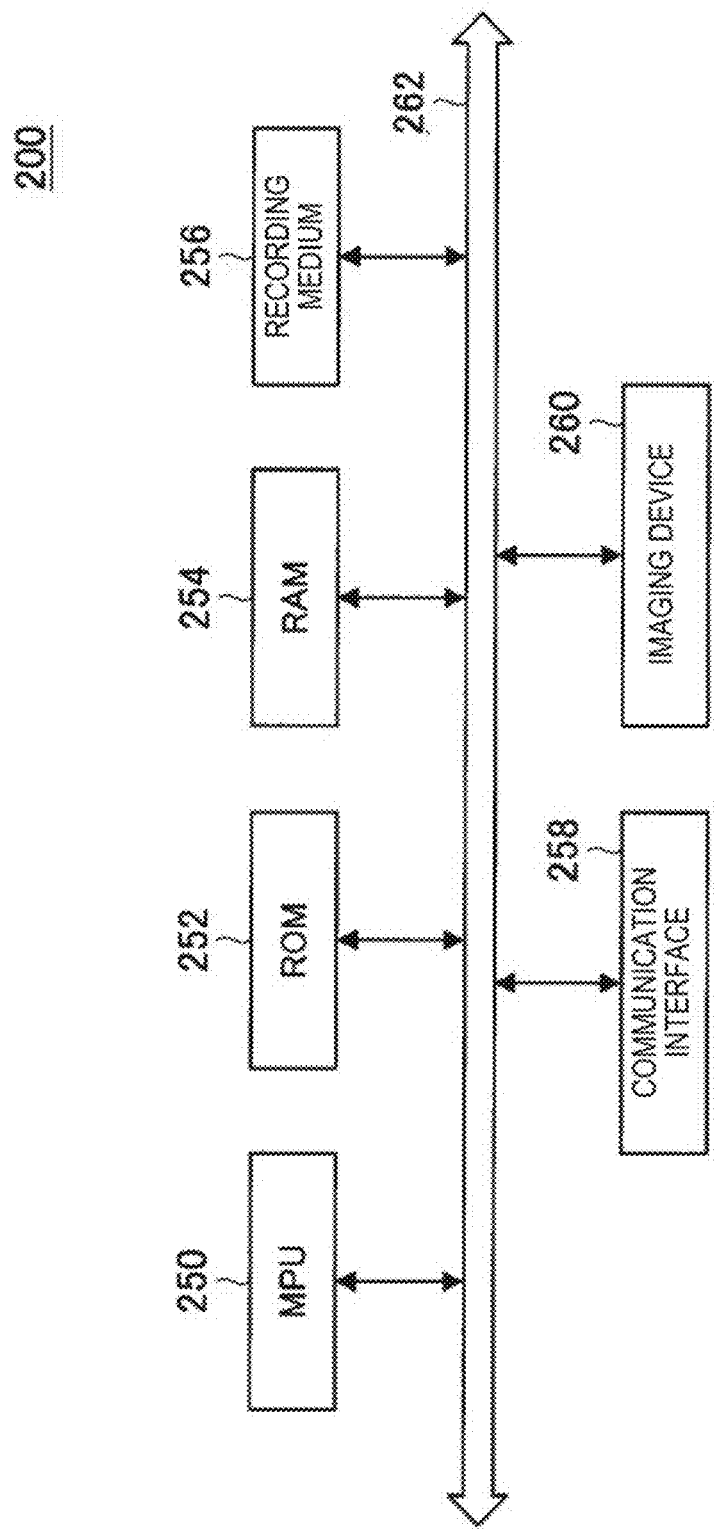

INFORMATION PROCESSING APPARATUS, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2015/078843 filed on Oct. 9, 2015, which claims priority benefit of Japanese Patent Application No. JP 2015-001409 filed in the Japan Patent Office on Jan. 7, 2015. Each of the above-referenced applications is hereby incorporated herein by reference in its entirety.

TECHNICAL FIELD

The present disclosure relates to an information processing apparatus, an information processing method, and an information processing system.

BACKGROUND ART

Techniques of comparing an image captured by an imaging apparatus (hereinafter referred to as a "captured image") with other images and estimating a position at which the captured image is captured have been developed. As a technique of comparing a captured image with other images and estimating the position at which the captured image is captured, for example, a technique described in the following Patent Literature 1 is known.

CITATION LIST

Patent Literature

Patent Literature 1: JP 2011-113245A

DISCLOSURE OF INVENTION

Technical Problem

For example, when the technique described in Patent Literature 1 is used, a captured image is compared with images stored in a database. For example, in the technique described in Patent Literature 1, the presence or absence of comparison is determined using either or both of a date and time and weather conditions as conditions, and a priority with which the comparison is performed is changed. Therefore, for example, when the technique described in Patent Literature 1 is used, it is possible to set an image that is close to the position at which the captured image is captured among the images stored in the database as a comparison target image, and thus there is a possibility that the position at which the captured image was taken will be able to be estimated.

However, for example, when the technique described in Patent Literature 1 is used, the images compared with the captured image are not images captured at the same time as the captured image or at a time that can be regarded as the same time. For this reason, for example, when the technique described in Patent Literature 1 is used, although the comparison is performed while changing the priority, a time and weather conditions in which the images compared with the captured image are captured may be different. Therefore, for example, when the technique described in Patent Literature 1 is used, even if an image captured at the same location as the captured image is included in the database, for example, it is difficult to compare it with the captured image because a shadowing method differs, a hiding relation with other objects differs even when imaging is performed in the same direction, or there is an object which is included in one image but not included in the other image even in both angles of view. Therefore, for example, it is not necessarily possible to improve the accuracy of estimating the position at which the captured image is captured even using the technique described in Patent Literature 1.

The present disclosure proposes an information processing apparatus, an information processing method, and an information processing system, which are novel and improved and capable of estimating a position on the basis of a captured image.

Solution to Problem

According to the present disclosure, there is provided an information processing apparatus including a position estimating unit configured to estimate a position of a second imaging apparatus on the basis of a first captured image captured by a first imaging apparatus whose position is specified and a second captured image captured at a time corresponding to the first captured image by the second imaging apparatus serving as a position estimation target.

In addition, according to the present disclosure, there is provided an information processing method that is performed by an information processing apparatus, the information processing method including a step of estimating a position of a second imaging apparatus on the basis of a first captured image captured by a first imaging apparatus whose position is specified and a second captured image captured at a time corresponding to the first captured image by the second imaging apparatus serving as a position estimation target.

In addition, according to the present disclosure, there is provided an information processing system including: a first imaging apparatus whose position is specified; a second imaging apparatus that serves as a position estimation target; and an information processing apparatus that includes a position estimating unit configured to estimate a position of the second imaging apparatus on the basis of a first captured image captured by the first imaging apparatus and a second captured image captured at a time corresponding to the first captured image by the second imaging apparatus.

Advantageous Effects of Invention

According to the present disclosure, it is possible to estimate a position on the basis of a captured image.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3 is an explanatory diagram for describing an example of a process related to an information processing method according to the present embodiment.

FIGS. 5A, 5B, 5C, 5D, and 5E are explanatory diagrams illustrating an example of a method of estimating a relative position with an object in a first imaging apparatus according to the present embodiment.

FIGS. 6A and 6B are explanatory diagrams illustrating an example of a method of estimating a relative position with an object in a second imaging apparatus according to the present embodiment.

FIGS. 9A, 9B, and 9C are explanatory diagrams illustrating an example of a process in an information processing system to which the information processing method according to the present embodiment is applied.

FIGS. 15A and 15B are explanatory diagrams for describing a first example of a use case implemented by a process using an estimated position of a second imaging apparatus related to an information processing method according to the present embodiment.

FIG. 32 is an explanatory diagram for describing a seventh example of a use case implemented by a process using an estimated position of a second imaging apparatus related to an information processing method according to the present embodiment.

FIGS. 33A(A), 33A(B), 33A(C), 33A(D), 33A(E), 33A(F), 33A(G), 33A(H), 33A(I), 33A(J), 33A(K), 33A(L), 33A(M), 33A(N), 33A(O), 33A(P), 33A(Q), 33A(R), 33A(S), 33A(T), and 33A(U) is are explanatory diagrams illustrating an example of a method of displaying information transmitted through an information transmission control process related to an information processing method according to the present embodiment.

FIGS. 33B(A), 33B(B), 33B(C), 33B(D), 33B(E), and 33B(F) are explanatory diagrams illustrating an example of a method of displaying information transmitted through an information transmission control process related to an information processing method according to the present embodiment.

FIGS. 33C(A), 33C(B), 33C(C), and 33C(D) are explanatory diagrams illustrating an example of a method of displaying information transmitted through an information transmission control process related to an information processing method according to the present embodiment.

FIGS. 33D(A) and 33D(B) are explanatory diagrams illustrating an example of a method of displaying information transmitted through an information transmission control process related to an information processing method according to the present embodiment.

FIGS. 33E(A) and 33E(B) are explanatory diagrams illustrating an example of a method of displaying information transmitted through an information transmission control process related to an information processing method according to the present embodiment.

FIG. 36 is an explanatory diagram illustrating an example of a hardware configuration of the first imaging apparatus according to the present embodiment.

MODE(S) FOR CARRYING OUT THE INVENTION

Figure 1:
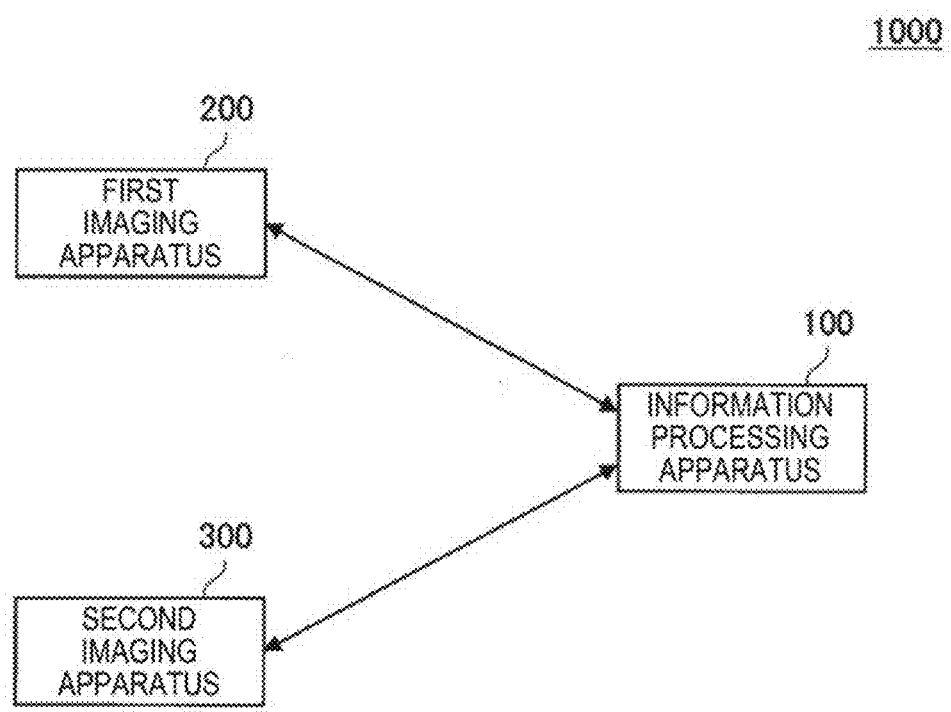
FIG. 1 is an explanatory diagram for describing an information processing method according to the present embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, description will proceed in the following order.
1. Information processing method according to present embodiment
2. Information processing system according to present embodiment
3. Program according to present embodiment

Information Processing Method According to Present Embodiment

Before a configuration of apparatuses constituting an information processing system according to the present embodiment is described, first, an information processing method according to the present embodiment will be described. Hereinafter, an information processing method according to the present embodiment will be described in connection with an example in which the information processing apparatus according to the present embodiment performs a process according to the information processing method of the present embodiment.

[1] Overview of Information Processing Method According to Present Embodiment As described above, even if the priority of the image compared with the captured image is changed using either or both of a date and time and weather conditions as conditions, it is not necessarily possible to improve the estimation accuracy of the position at which the captured image is captured.

In this regard, the information processing apparatus according to the present embodiment estimates a position of an imaging apparatus whose position is to be estimated on the basis of a captured image captured by an imaging apparatus whose position is specified (hereinafter referred to as a "first captured image") and a captured image captured at a time corresponding to a time at which the first captured image is captured by an imaging apparatus whose position is estimated (hereinafter referred to as a "second captured image"). In the following description, the imaging apparatus whose position is specified is referred to as a "first imaging apparatus," and the imaging apparatus whose position is to be estimated is referred to as a "second imaging apparatus." In the following description, an imaging apparatus is also referred to as a "camera."

Here, examples of the captured image according to the present embodiment include a still image or a frame image constituting a moving image.

Further, examples of the time corresponding to the time at which the first captured image according to the present embodiment is captured include the same time as the time at which the first captured image is captured or a time included in a predetermined period including the time at which the first captured image is captured. The predetermined period according to the present embodiment is, for example, a period that can be regarded as the same time as the time at which the first captured image is imaged. The predetermined period of time for the present embodiment may be, for example, a fixed period which is set in advance such as a period within 1 second before and after the time at which the first captured image is imaged. Further, the predetermined period according to the present embodiment may be a variable period that can be appropriately set on the basis of, for example, a user operation of the user of an information processing apparatus 100.

FIG. 1 is an explanatory diagram for describing an information processing method according to the present embodiment and illustrates an example of an information processing system 1000 including the information processing apparatus 100 according to the present embodiment that performs a process according to the information processing method of the present embodiment.

The information processing system 1000 includes the information processing apparatus 100, a first imaging apparatus 200, and a second imaging apparatus 300.

FIG. 1 illustrates the information processing system including one first imaging apparatus and one second imaging apparatus, but the information processing system according to the present embodiment is not limited to the example illustrated in FIG. 1. For example, the information processing system according to the present embodiment may include a plurality of first imaging apparatuses or a plurality of second imaging apparatuses. Further, the information processing system according to the present embodiment may include a plurality of information processing apparatuses according to the present embodiment.

Further, FIG. 1 illustrates an example in which the information processing apparatus 100 is a separate device from the first imaging apparatus and the second imaging apparatus, but the information processing system according to the present embodiment is not limited to the example illustrated in FIG. 1. For example, in the information processing system according to the present embodiment, the information processing apparatus 100 and the first imaging apparatus may be implemented as a single apparatus, or the information processing apparatus 100 and the second imaging apparatus may be implemented as a single apparatus.

The first imaging apparatus 200 may be an imaging apparatus with a fixed imaging position such as a security camera. The first imaging apparatus 200 generates the first captured image, for example, by performing imaging periodically or aperiodically. Here, the periodic imaging in the first imaging apparatus 200 may be, for example, imaging of moving images or intermittent imaging of still images.

In the first imaging apparatus 200, the first captured image is generated in an imaging device of the first imaging apparatus 200 or an imaging device connected to the first imaging apparatus 200. For example, the first imaging apparatus 200 may be equipped with a plurality of imaging devices or connected with a plurality of imaging device. Further, imaging directions of the plurality of imaging devices may be the same or different.

Further, the first imaging apparatus 200 is not limited to an imaging apparatus with a fixed imaging position. For example, the first imaging apparatus 200 may have a variable imaging position as long as it is possible to specify a position using an arbitrary technique capable of specifying a position such as positioning using the Global Positioning System (GPS).

Further, the first captured image according to the present embodiment is not limited to the above example. For example, the first captured image according to the present embodiment may be an image which is captured on the basis of the user operation of the user of the first imaging apparatus 200 or an imaging command transmitted from an external device of the first imaging apparatus 200.

Examples of the second imaging apparatus 300 include an imaging apparatus with a variable imaging position, such as an imaging apparatus mounted on an arbitrary vehicle such as a car (an imaging apparatus installed in a vehicle), or a portable device such as a mobile phone, a smartphone, or a tablet type device. The second imaging apparatus 300 is not limited to the above example. For example, the second imaging apparatus 300 may be an arbitrary imaging apparatus with a variable imaging position such as a wearable device that can be worn by the user and used such as a watch type device or a glasses type device or an unmanned aircraft such as a radio control helicopter. The second imaging apparatus 300 generates the second captured image by performing imaging, for example, periodically or aperiodically or by performing imaging on the basis of the user operation of the user of the second imaging apparatus 300. Here, the periodic imaging in the second imaging apparatus 300 may be, for example, imaging of moving images or intermittent imaging of still images.

In the second imaging apparatus 300, the second captured image is generated in an imaging device included in the second imaging apparatus 300 or an imaging device connected to the second imaging apparatus 300. For example, the second imaging apparatus 300 may be equipped with a plurality of imaging devices or may be connected with a plurality of imaging devices. Further, imaging directions of the plurality of imaging devices may be the same or different.

Further, the second imaging apparatus 300 is not limited to an imaging apparatus with a variable imaging position. For example, the second imaging apparatus 300 may be an imaging apparatus with a fixed imaging position.

Further, the second captured image according to the present embodiment is not limited to the above example. For example, the second captured image according to the present embodiment may be an image which is captured on the basis of an imaging command transmitted from an external device of the second imaging apparatus 300.

The position of the second imaging apparatus 300 is estimated by performing a process according to the information processing method of the present embodiment which will be described later on the basis of the first captured image captured by the first imaging apparatus 200 and the second captured image captured at the time corresponding to the first captured image by the second imaging apparatus 300. The information processing apparatus 100 acquires the first captured image and the second captured image via communication with an external device by a communication unit (which will be described later) or an external communication unit connected thereto, and estimates the position of the second imaging apparatus 300 on the basis of the acquired first captured image and the second captured image. For example, the information processing apparatus 100 may acquire the first captured image and the second captured image by direct communication with the first imaging apparatus 200 and the second imaging apparatus 300 or may acquire the first captured image and the second captured image by indirect communication via another device.

In the information processing system 1000, the information processing apparatus 100 estimates the position of the second imaging apparatus 300 which has captured the second captured image on the basis of the first captured image and the second captured image captured at the time corresponding to the first captured image.

Figure 2A:
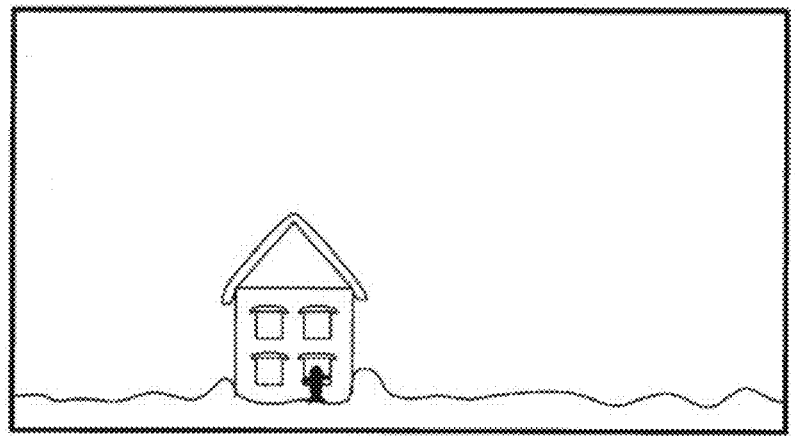
FIGS. 2A and 2B is are explanatory diagrams for describing an information processing method according to the present embodiment.
Figure 2B:
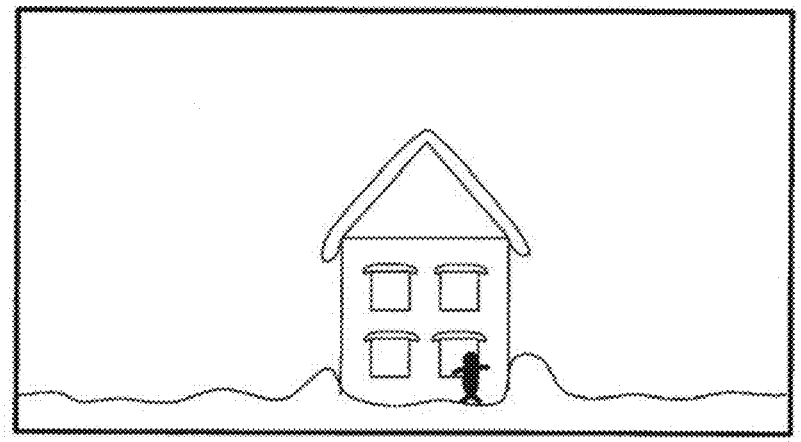

FIGS. 2A and 2B are explanatory diagrams for describing the information processing method according to the present embodiment. FIG. 2A illustrates an example of the first captured image, and FIG. 2B illustrates an example of the second captured image captured at the time corresponding to the first captured image illustrated in FIG. 2A.

For example, as illustrated in FIGS. 2A and 2B, when the first captured image and the second captured image captured at the time corresponding to the first captured image are used, it is possible to regard the imaged time and the weather conditions as the same. Here, when the first captured image and the second captured image are images captured at the same place, for example, a shadowing method for an object is similar, a hiding relation with another object is similar when imaging is performed in the same direction, and there is no object which is included in one image but not included in the other image in both angles of view if there is no hiding relation. Therefore, the information processing apparatus 100 can more easily estimate the position of the second imaging apparatus 300 by performing the process according to the information processing method of the present embodiment and can improve the estimation accuracy of the position of the second imaging apparatus 300.

Further, the information processing apparatus 100 estimates the position of the second imaging apparatus 300 using the first captured image and the second captured image captured at the time corresponding to the first captured image. Therefore, the information processing apparatus 100 can estimate the position of the second imaging apparatus 300 even when the second imaging apparatus 300 is positioned indoors or on high-rise building streets in which it is difficult to obtain high position estimation accuracy through positioning using an existing position specifying method such as a position specifying method using GPS.

[2] Process Related to Information Processing Method According to Present Embodiment Next, the process according to the information processing method of the present embodiment will be described in further detail. Hereinafter, an example in which the process according to the information processing method of the present embodiment is performed by the information processing apparatus 100 constituting the information processing system 1000 illustrated in FIG. 1 will be described.

The information processing apparatus 100 performs, for example, a process (1) to be described below (a position estimation process) as the process according to the information processing method of the present embodiment.
(1) Position Estimation Process The information processing apparatus 100 estimates the position of the second imaging apparatus 300 on the basis of the first captured image captured by the first imaging apparatus 200 whose position is specified and the second captured image captured at the time corresponding to the first captured image by the second imaging apparatus 300 whose position is to be estimated.

(1-1) First Example of Position Estimation Process

For example, when an object contained in the first captured image is included in the second captured image, the information processing apparatus 100 estimates the position of the first imaging apparatus 200 as the position of the second imaging apparatus 300. Hereinafter, an object included in a captured image is also referred to as a "subject."

For example, the information processing apparatus 100 specifies the position of the first imaging apparatus 200 using the "identification information of the first imaging apparatus 200" acquired together with the first captured image and a table (or a database) in which the identification information is associated with a position.

Here, the identification information related to the present embodiment may be, for example, data capable of specifying each of the first imaging apparatus and the second imaging apparatus such as an ID, an Internet protocol (IP) address, or a cookie.

The method of specifying the position of the first imaging apparatus according to the present embodiment is not limited to the above example. For example, the information processing apparatus 100 may specify a position which is set in advance as the position of the first imaging apparatus 200 or may specify a position indicated by position information (data) acquired together with the first captured image from the first imaging apparatus 200 as the position of the first imaging apparatus 200.

Further, when the position of the object is specified, the information processing apparatus 100 may estimate the position of the first imaging apparatus 200 or the position of the object as the position of the second imaging apparatus 300.

For example, the information processing apparatus 100 specifies the position of the object corresponding to the first imaging apparatus 200 with reference to the table (or the database) in which the position of the first imaging apparatus 200 is associated with the position of the object. The method of specifying the position of the object is not limited to the above example. For example, the information processing apparatus 100 may analyze a feature of an object extracted from the captured image and specify the position of the object using an arbitrary method of specifying the position of the object, for example, by specifying the position of the object with reference to a table (or a database) in which the features are associated with the positions.

FIG. 3 is an explanatory diagram for describing an example of the process according to the information processing method of the present embodiment. In FIG. 3, a security camera is illustrated as an example of the first imaging apparatus 200.

As illustrated in FIG. 3, when the same object (person, in the example illustrated in FIG. 3) is extracted from the first captured image ("image of camera whose position is known" in FIG. 3) and the second captured image ("image of camera whose position is desired to be known" in FIG. 3), the information processing apparatus 100 estimates the position of the first imaging apparatus 200 or the position of the object as the position of the second imaging apparatus 300.

Figure 4A:
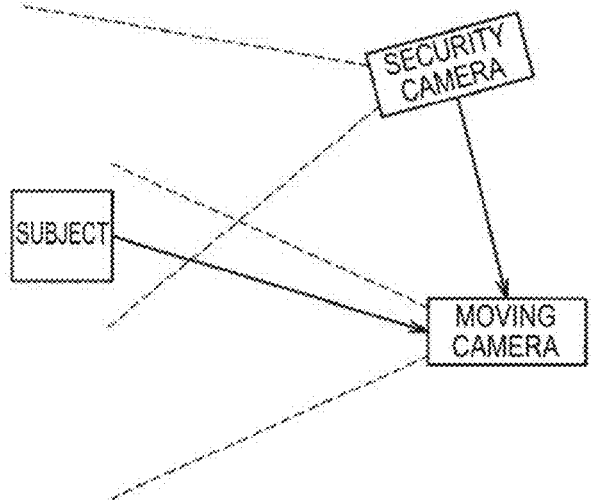
FIGS. 4A, 4B, and 4C are explanatory diagrams for describing an example of a process related to an information processing method according to the present embodiment.
Figure 4B:
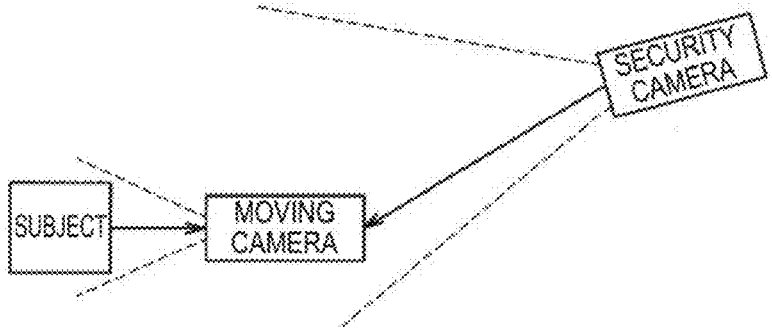
Figure 4C:
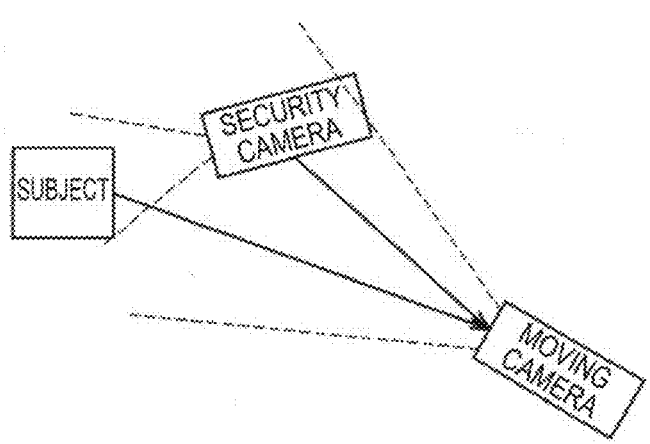

FIGS. 4A, 4B, and 4C are explanatory diagrams for describing an example of the process according to the information processing method of the present embodiment, and illustrates an example of a position estimation process according to the present embodiment. Each of FIGS. 4A, 4B, and 4C illustrates an example of the position estimation process according to the first example.

In the example illustrated in FIGS. 4A, 4B, and 4C, a "security camera" corresponds to the first imaging apparatus 200, and a "moving camera" illustrated in FIGS. 4A, 4B, and 4C corresponds to the second imaging apparatus 300. Further, "→" illustrated in FIGS. 4A, 4B, and 4C indicates the direction in which the position of the second imaging apparatus 300 is estimated, and as illustrated in FIGS. 4A, 4B, and 4C, the position of the first imaging apparatus 200 or the position of the object is estimated as the position of the second imaging apparatus 300.

(1-1-1) Process Illustrated FIG. 4A

The information processing apparatus 100 looks for the same object in both the first captured image and the second captured image.

If the same object is found, the information processing apparatus 100 estimates the position of the first imaging apparatus 200 or the position of the object whose position is specified as the position of the second imaging apparatus 300. Further, when the same object is not found, the information processing apparatus 100 does not estimate the position of the second imaging apparatus 300.

(1-1-2) Processing Illustrated in FIG. 4B

For example, when the first imaging apparatus 200 and the second imaging apparatus 300 have a positional relation illustrated in FIG. 4B, the second imaging apparatus 300 is further included in the first captured image in addition to the object. When the second imaging apparatus 300 is further included in the first captured image as described above, the information processing apparatus 100 may estimate the position of the first imaging apparatus 200 or the position of the object whose position is specified as the position of the second imaging apparatus 300.

For example, the information processing apparatus 100 determines whether or not the second imaging apparatus 300 is included in the first captured image by analyzing the feature of the object extracted from the first captured image and matches the feature with data indicating the feature of the second imaging apparatus 300. Here, examples of the data illustrating the feature of the second imaging apparatus 300 include image data indicating an external appearance of the second imaging apparatus 300 and data indicating a feature of the second imaging apparatus 300 obtained by analyzing the image data.

(1-1-3) Process Illustrated in FIG. 4C

For example, when the first imaging apparatus 200 and the second imaging apparatus 300 have a positional relation illustrated in FIG. 4C, the first imaging apparatus is further included in the second captured image in addition to the object. When the first imaging apparatus 200 is further included in the second captured image as described above, the information processing apparatus 100 may estimate the position of the first imaging apparatus 200 or the position of the object whose position is specified as the position of the second imaging apparatus 300.

For example, the information processing apparatus 100 determines whether or not the first imaging apparatus 200 is included in the second captured image by analyzing the feature of the object extracted from the second captured image and matches the feature with data indicating the feature of the first imaging apparatus 200. Here, examples of the data indicating the feature of the first imaging apparatus 200 include image data indicating an external appearance of the first imaging apparatus 200 and data indicating a feature of the first imaging apparatus 200 obtained by analyzing the image data.

The information processing apparatus 100 estimates the position of the first imaging apparatus 200 or the position of the object whose position is specified as the position of the second imaging apparatus 300 using the first captured image and the second captured image captured at the time corresponding to the first captured image, for example, as illustrated in FIGS. 4A, 4B, and 4C.

(1-2) Second Example of Position Estimation Process

In the position estimation process according to the first example, the position of the first imaging apparatus 200 or the position of the object whose position is specified is estimated as the position of the second imaging apparatus 300, but the position estimation process according to the present embodiment is not limited to the above example. For example, the information processing apparatus 100 is also able to estimate the position of the second imaging apparatus 300 on the basis of an estimation result of the relative position of the object with respect to the first imaging apparatus 200 estimated from the first captured image and an estimation result of the relative position of the object with respect to the second imaging apparatus 300 estimated from the second captured image.

For example, the information processing apparatus 100 estimates a relative position indicated by first relative position information (data) indicating the relative position of the object with respect to the first imaging apparatus 200 as the relative position of the object with respect to the first imaging apparatus 200.

Further, the information processing apparatus 100 estimates a relative position indicated by second relative position information (data) indicating the relative position of the object with respect to the second imaging apparatus 300 as the relative position of the object with respect to the second imaging apparatus 300.

Here, when the same object is included in the first captured image and the second captured image captured at the time corresponding to the first captured image, the position of the object is consistent. Therefore, the relative position of the second imaging apparatus 300 with respect to the first imaging apparatus 200 is decided by estimating the relative position of the object with respect to the first imaging apparatus 200 and the relative position of the object with respect to the second imaging apparatus 300.

Therefore, the information processing apparatus 100 can estimate the position of the second imaging apparatus 300 on the basis of, for example, the first relative position information and the second relative position information.

For example, the information processing apparatus 100 estimates the relative position of the second imaging apparatus 300 with respect to the position of the first imaging apparatus 200 as the position of the second imaging apparatus 300.

Since the position of the first imaging apparatus 200 is specified, it is also possible to estimate an absolute position of the second imaging apparatus 300 by estimating the relative position of the second imaging apparatus 300 with respect to the position of the first imaging apparatus 200. Therefore, the information processing apparatus 100 may estimate, for example, the absolute position of the second imaging apparatus 300 as the position of the second imaging apparatus 300.

For example, the relative position of the object with respect to the first imaging apparatus 200 and the relative position of the object with respect to the second imaging apparatus 300 are estimated as follows. It will be appreciated that the estimation method of the relative position of the object with respect to the first imaging apparatus 200 and the relative position of the object with respect to the second imaging apparatus 300 is not limited to an example to be described below.

The relative position of the object with respect to the first imaging apparatus 200 is estimated, for example, by estimating a direction in which the object is located and a distance from the object in the first imaging apparatus 200 as will be described below.

FIGS. 5A, 5B, 5C, 5D, and 5E are explanatory diagrams illustrating an example of an estimation method of the relative position with respect to the object in the first imaging apparatus 200 according to the present embodiment.

Since an angle of view and a direction are known in the first imaging apparatus 200, the first imaging apparatus 200 can estimate the direction of the object included in the first captured image (FIG. 5A).

Further, the first imaging apparatus 200 estimates the distance from the object, for example, by using the following method.

- A focused position is estimated as the distance of the object using contrast auto focus (AF) or the like (FIG. 5B).
- The distance of the object is estimated from a degree of blur when an optical zoom magnification is changed using the fact that a depth of field changes when the optical zoom magnification changes (FIG. 5B).
- The distance of the object is estimated from an amount of deviation of the object in a plurality of captured images captured at substantially the same time through a plurality of imaging devices whose imaging position deviation is known (or an imaging device including a plurality of optical systems) (FIG. 5D).

The distance of the object is estimated on the basis of a distance measurement value of a distance sensor (a phase difference sensor) using a phase difference AF or the like, or the distance of the object is estimated using a captured image captured by a light field camera (FIG. 5E).

For example, as described above, the first imaging apparatus 200 estimates the relative position with respect to the object by estimating the direction in which the object is located and the distance from the object. Then, the first imaging apparatus 200 causes a communication device with which the first imaging apparatus 200 is equipped or a connected external communication device to transmit the first relative position information indicating the estimation result to the external device such as the information processing apparatus 100. When the relative position with respect to the object is fixed, the first imaging apparatus 200 may transmit the first relative position information stored in a recording medium to the external device.

Further, the process related to the estimation of the relative position between the first imaging apparatus 200 and the object is not limited to an example in which the process is performed in the first imaging apparatus 200. For example, the process related to the estimation of the relative position between the first imaging apparatus 200 and the object may be performed by the first imaging apparatus 200 and the information processing apparatus 100 in cooperation.

The relative position of the object with respect to the second imaging apparatus 300 is estimated, for example, by estimating the direction in which the object is located and the distance from the object in the second imaging apparatus 300 as will described below.

FIGS. 6A and 6B are explanatory diagrams illustrating an example of the estimation method of the relative position with respect to the object in the second imaging apparatus 300 according to the present embodiment. FIGS. 6A and 6B illustrate an example of an imaging range when a plane such as a wall (an example of an object) is imaged. FIG. 6A illustrates an example of the imaging range when a plane such as a wall (an example of an object) is imaged from the front, and FIG. 6B illustrates an example of the imaging range when a flat surface such as a wall (an example of an object) is obliquely imaged.

Here, when the same object is included in the first captured image and the second captured image, since the position of the first imaging apparatus 200 is specified, the information processing apparatus 100 is able to estimate the position of the object on the basis of the first relative position information. In other words, FIGS. 6A and 6B illustrate an example of an estimation method in which the second imaging apparatus 300 estimates the relative position with respect to the object whose position is specified. Examples of the first relative position information used when the information processing apparatus 100 estimates the position of the object include first relative position information acquired through communication by the communication unit (which will be described later) or a connected external imaging device and first relative position information stored in a storage medium such as a storage unit (which will be described later) or a connected external recording medium. For example, the first relative position information stored in the recording medium may be information which is stored in the recording medium in advance or the first relative position information which is acquired through communication and stored in the recording medium.

The second imaging apparatus 300 estimates the distance from the angle of view using, for example, known lens information. The second imaging apparatus 300 estimates the distance from the object, for example, in accordance with the magnitude of the imaging range using the fact that the angle of view is known.

Further, the second imaging apparatus 300 estimates the direction in which the object is located by estimating the angle of view with the object from a shape of the imaging range.

For example, as described above, the second imaging apparatus 300 estimates the relative position with respect to the object by estimating the direction in which the object is located and the distance from the object. The second imaging apparatus 300 can estimate the direction in which the object is located and the distance from the object using a similar method to that of the first imaging apparatus 200 described above.

Then, the second imaging apparatus 300 causes the communication device with which the second imaging apparatus 300 is equipped or a connected external communication device to transmit the second relative position information indicating the estimation result to an external device such as the information processing apparatus 100.

Further, the process related to the estimation of the relative position between the second imaging apparatus 300 and the object is not limited to an example in which it is performed in the second imaging apparatus 300. For example, the process related to the estimation of the relative position between the second imaging apparatus 300 and the object may be performed by the second imaging apparatus 300 and the information processing apparatus 100 in cooperation.

Figure 7A:
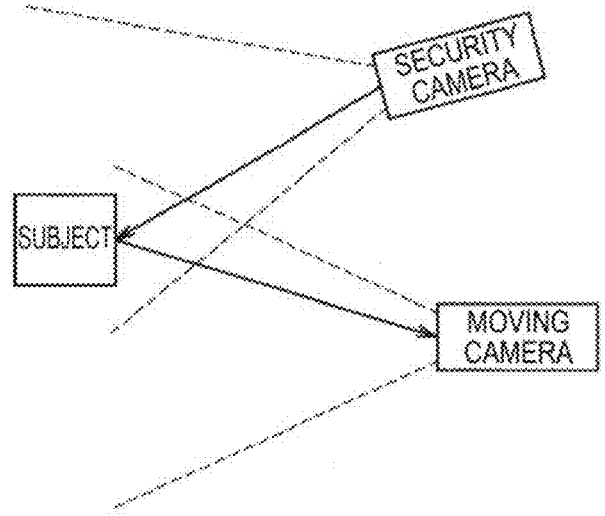
FIGS. 7A, 7B, and 7C are explanatory diagrams for describing an example of a process related to an information processing method according to the present embodiment.
Figure 7B:
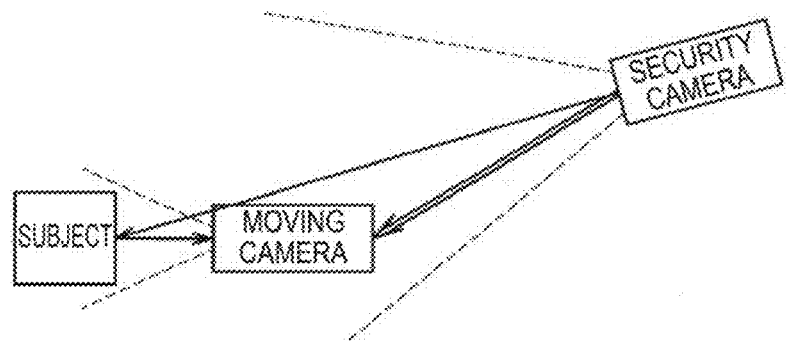
Figure 7C:
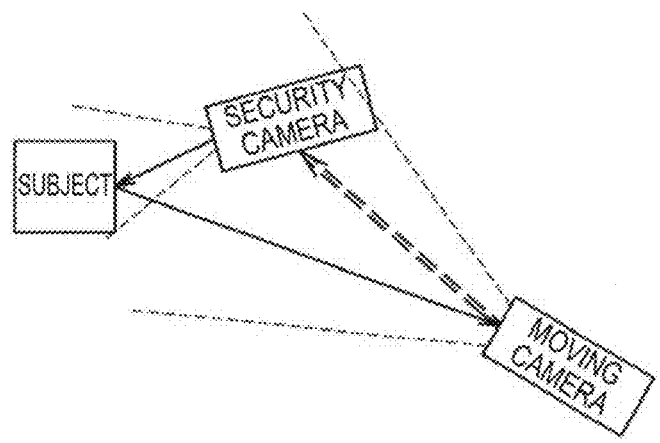

Hereinafter, an example of the position estimation process according to the second example will be described. FIGS. 7A, 7B, and 7C is are explanatory diagrams for describing an example of a process according to the information processing method of the present embodiment and illustrates an example of the position estimation process according to the present embodiment. Each of FIGS. 7A, 7B, and 7C illustrates an example of the position estimation process according to the second example.

In the example illustrated in FIGS. 7A, 7B, and 7C, a "security camera" corresponds to the first imaging apparatus 200, and a "moving camera" illustrated in FIGS. 7A, 7B, and 7C corresponds to the second imaging apparatus 300. Further, "→" illustrated in FIGS. 7A, 7B, and 7C indicates the direction in which the position of the second imaging apparatus 300 is estimated.

(1-2-1) Process Illustrated in FIG. 7A

The information processing apparatus 100 looks for the same object in both the first captured image and the second captured image captured at the time corresponding to the first captured image.

When the same object is found, the information processing apparatus 100 estimates the position of the second imaging apparatus 300 on the basis of the first relative position information corresponding to the first captured image and the second relative position information corresponding to the second captured image. For example, the information processing apparatus 100 estimates the relative position of the second imaging apparatus 300 or the absolute position of the second imaging apparatus 300 with respect to the position of the first imaging apparatus 200 as the position of the second imaging apparatus 300. Further, when the same object is not found, the information processing apparatus 100 does not estimate the position of the second imaging apparatus 300.

(1-2-2) Process Illustrated in FIG. 7B

For example, when the first imaging apparatus 200 and the second imaging apparatus 300 have a positional relation illustrated in FIG. 7B, the second imaging apparatus 300 is further included in the first captured image in addition to the object. When the second imaging apparatus 300 is further included in the first captured image as described above, the information processing apparatus 100 may estimate the position of the second imaging apparatus 300 on the basis of third relative position information (data) indicating the relative position of the second imaging apparatus with respect to the first imaging apparatus 200.

The information processing apparatus 100 determines whether or not the second imaging apparatus 300 is included in the first captured image, for example, similarly to the process of (1-1-2).

Further, the information processing apparatus 100 estimates the relative position indicated by the third relative position information indicating the relative position of the second imaging apparatus 300 with respect to the first imaging apparatus 200 as the relative position of the second imaging apparatus 300 with respect to the first imaging apparatus 200. Further, since the position of the first imaging apparatus 200 is specified, the information processing apparatus 100 can estimate the absolute position of the second imaging apparatus 300 using the estimated position.

Here, the relative position of the second imaging apparatus 300 with respect to the first imaging apparatus 200 is estimated in the first imaging apparatus 200, for example, by a method similar to the method for estimating the relative position of the object with respect to the first imaging apparatus 200. Then, the information processing apparatus 100 estimates the position of the second imaging apparatus 300 using, for example, the third relative position information indicating the estimation result acquired from the first imaging apparatus 200. Further, similarly to the method of estimating the relative position of the object with respect to the first imaging apparatus 200, the process related to the estimation of the relative position of the second imaging apparatus 300 with respect to the first imaging apparatus 200 may be performed by the first imaging apparatus 200 and the information processing apparatus 100 in cooperation.

Further, the processing illustrated in FIG. 7B is not limited to the process described above.

For example, the information processing apparatus 100 may estimate the absolute position of the second imaging apparatus 300 through a similar process to the process (1-2-1).

Further, the information processing apparatus 100 may estimate the absolute position of the second imaging apparatus 300, for example, using both the process based on the third relative position information and the process of (1-2-1). For example, when both of the processes are used, the information processing apparatus 100 complementarily uses the result of the process based on the third relative position information.

(1-2-3) Process Illustrated in FIG. 7C

For example, when the first imaging apparatus 200 and the second imaging apparatus 300 have a positional relation illustrated in FIG. 7C, the first imaging apparatus 200 is further included in the second captured image in addition to the object. When the first imaging apparatus 200 is further included in the second captured image as described above, the information processing apparatus 100 may estimate the position of the second imaging apparatus 300 on the basis of fourth relative position information (data) indicating the relative position of the first imaging apparatus 200 with respect to the second imaging apparatus 300.

The information processing apparatus 100 determines whether or not the first imaging apparatus 200 is included in the second captured image, similarly to the process of (1-1-3).

Further, the information processing apparatus 100 estimates the relative position of the second imaging apparatus 300 with respect to the first imaging apparatus 200, for example, using the relative position indicated by the fourth relative position information indicating the relative position of the first imaging apparatus 200 with respect to the second imaging apparatus 300. Further, since the position of the first imaging apparatus 200 is specified, the information processing apparatus 100 can estimate the absolute position of the second imaging apparatus 300 using the estimated position.

Here, the relative position of the second imaging apparatus 300 with respect to the first imaging apparatus 200 is estimated in the second imaging apparatus 300, for example, by a method similar to the method of estimating the relative position of the object with respect to the second imaging apparatus 300. Then, the information processing apparatus 100 estimates the position of the second imaging apparatus 300, for example, using the fourth relative position information indicating the estimation result acquired from the second imaging apparatus 300. Similarly, in the method of estimating the relative position of the object with respect to the second imaging apparatus 300, the process related to the estimation of the relative position of the first imaging apparatus 200 with respect to the second imaging apparatus 300 may be performed by the second imaging apparatus 300 and the information processing apparatus 100 in cooperation.

Further, the process illustrated in FIG. 7C is not limited to the process described above.

For example, the information processing apparatus 100 may estimate the absolute position of the second imaging apparatus 300 through a similar process to the process (1-2-1).

Further, the information processing apparatus 100 may estimate the absolute position of the second imaging apparatus 300, for example, using both the process based on the fourth relative position information and the process of (1-2-1). For example, when both of the processes are used, the information processing apparatus 100 complementarily uses a result of the process based on the fourth relative position information.

For example, the information processing apparatus 100 performs the position estimation process according to the first example described in (1-1) and the position estimation process according to the second example described in (1-2) as the position estimation process.

Further, the position estimation process according to the present embodiment is not limited to the position estimation process according to the first example described in (1-1) and the position estimation process according to the second example described in (1-2).

For example, when the information processing system according to the present embodiment includes a plurality of first imaging apparatuses, there may be a plurality of first captured images captured at the same time. Here, the information processing apparatus 100 can estimate the position of the second imaging apparatus by performing the position estimation process using both the second captured image captured by a certain second imaging apparatus and all of a plurality of first captured images. However, when the position estimation process is performed using all of the plurality of first captured images, a processing load may be increased.

In this regard, in the position estimation process according to the present embodiment, the information processing apparatus 100 may narrow down the first captured image used for the process and estimate the position of the second imaging apparatus on the basis of the narrowed first captured image and the second captured image captured at the time corresponding to the first captured image.

For example, the information processing apparatus 100 narrows down the position at which the second imaging apparatus is likely be located on the basis of information related to the second imaging apparatus. Then, the information processing apparatus 100 estimates the position of the second imaging apparatus on the basis of the first captured image captured by the first imaging apparatus located at the position corresponding to the narrowed position.

The information related to the second imaging apparatus according to the present embodiment is data used for narrowing down the position at which the second imaging apparatus is likely be located. The information related to the second imaging apparatus according to the present embodiment includes, for example, the following information. An example of the position estimation process using the information related to the second imaging apparatus according to the present embodiment will be described later.

Position information indicating the position of the second imaging apparatus

Information indicating motion of the second imaging apparatus (for example, data indicating change in acceleration or angular velocity)

Tracking information indicating a history obtained by tracking the second imaging apparatus (tracking according to the present embodiment will be described later.)

Information related to a magnetic field around the second imaging apparatus (for example, data indicating a strength and a direction of the magnetic field)

Information related to radio waves near the second imaging apparatus (for example, data indicating a strength and a delay time of radio waves)

Information related to a sound near the second imaging apparatus (for example, data indicating strength and a delay time of a sound)

Information related to light near the second imaging apparatus (for example, data indicating luminance and color)

Information indicating barometric pressure around the second imaging apparatus

When the position estimation process is performed, the position of the second imaging apparatus 300 is estimated on the basis of the first captured image and the second captured image captured at the time corresponding to the first captured image. Therefore, the information processing apparatus 100 can estimate the position on the basis of the captured image by performing the position estimation process.

Further, when the position estimation process is performed, the information processing apparatus 100 can obtain the effect that is obtained by performing the process according to the information processing method of the present embodiment.

The above descriptions is in connection with the example in which the roles of the imaging apparatuses (the first imaging apparatus and the second imaging apparatus) constituting the information processing system are fixed, but an application example of the information processing method according to the present embodiment is not limited to the above example.

For example, in the information processing system to which the information processing method according to the present embodiment is applied, the roles of the imaging apparatuses constituting the information processing system may change.

Figure 8:
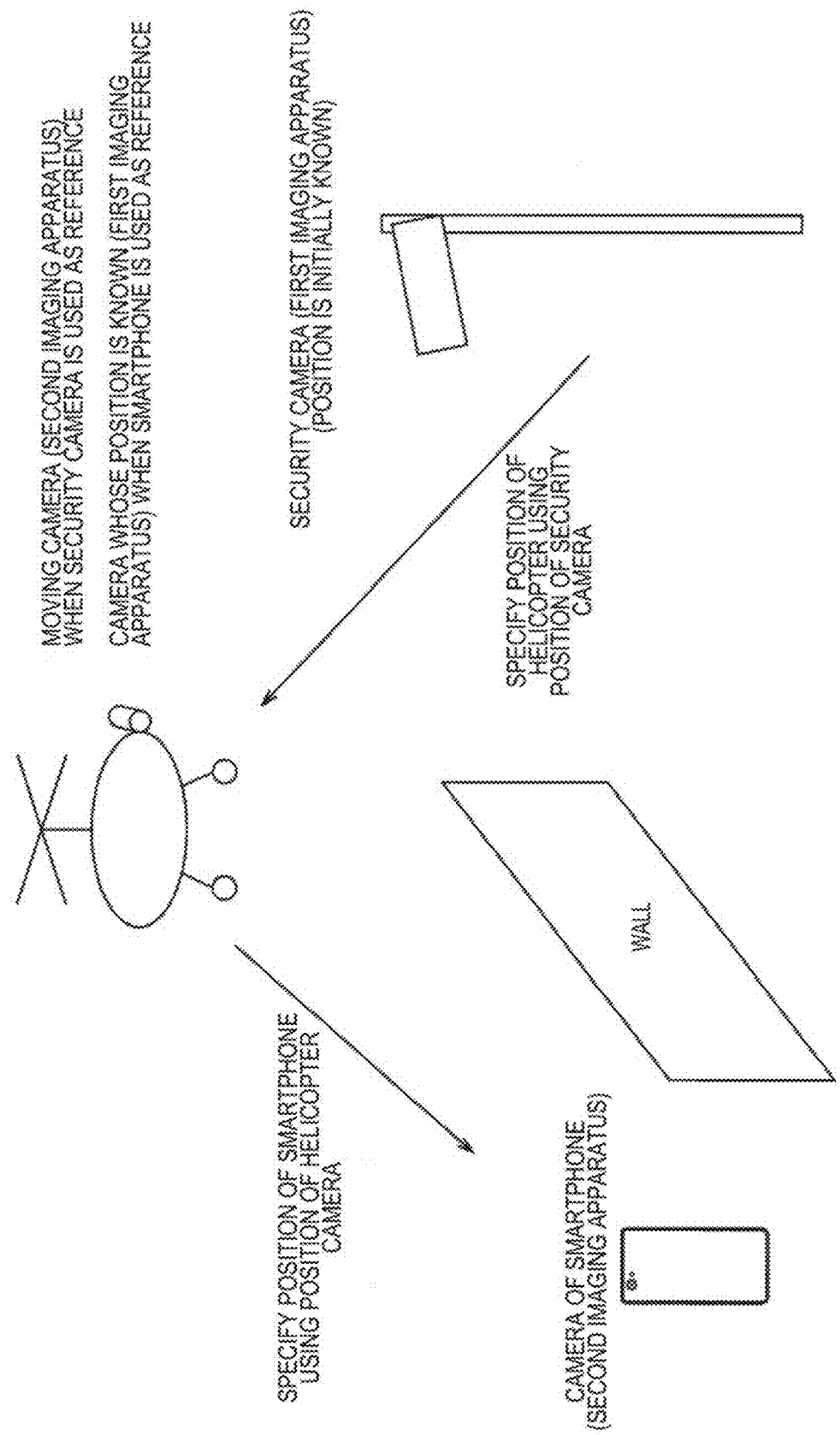
FIG. 8 is an explanatory diagram for describing another application example of an information processing method according to the present embodiment.

FIG. 8 is an explanatory diagram for describing another application example of the information processing method according to the present embodiment. The information processing system illustrated in FIG. 8 includes, for example, a security camera, a camera installed in a helicopter (a "helicopter camera" illustrated in FIG. 8), and a camera mounted on a smartphone (a "smartphone camera" illustrated in FIG. 8). Here, the security camera illustrated in FIG. 8 corresponds to the first imaging apparatus whose position is specified.

In the information processing system illustrated in FIG. 8, the information processing apparatus according to the present embodiment estimates the position of the camera mounted on the helicopter using a captured image captured by the security camera as the first captured image and a captured image captured by the camera mounted on the helicopter as the second captured image. In other words, the camera mounted on the helicopter plays the role of the second imaging apparatus when the security camera is used as a reference.

When the position of the camera mounted on the helicopter is estimated, the position of the camera mounted on the helicopter is specified. Therefore, the information processing apparatus according to the present embodiment can perform the position estimation process using the captured image captured by the camera mounted on the helicopter as the first captured image.

Therefore, in the information processing system illustrated in FIG. 8, the information processing apparatus according to the present embodiment estimates the position of the camera mounted on the smartphone using the captured image captured by the camera mounted on the helicopter as the first captured image and a captured image captured by the camera mounted on the smartphone as the second captured image. In other words, the camera mounted on the helicopter plays the role of the first imaging apparatus when the camera mounted on the smartphone is used as a reference.

For example, the role of the imaging apparatus constituting the information processing system is changed like the camera mounted on the helicopter illustrated in FIG. 8, and thus even when the position of the camera mounted on the smartphone is unable to be estimated directly using the captured image captured by the security camera which is originally the first imaging apparatus and the captured image captured by the camera mounted on the smartphone, for example, due to a wall or the like illustrated in FIG. 8, the information processing apparatus according to the present embodiment can estimate the position of the camera mounted on the smartphone.

The process according to the information processing method of the present embodiment is not limited to the process (position estimation process) of (1).

For example, the information processing apparatus according to the present embodiment can further perform the process using the estimated position of the second imaging apparatus. As the process using the estimated position of the second imaging apparatus, for example, the following process (an information transmission control process) of (2) may be used.

(2) Information Transmission Control Process

The information processing apparatus according to the present embodiment transmits information based on the estimated position of the second imaging apparatus to the external device. The information processing apparatus according to the present embodiment causes the communication unit (which will be described later) with which the information processing apparatus is equipped or a connected external communication device to transmit the information on the basis of the position of the second imaging apparatus to the external device.

An example of the information based on the position of the second imaging apparatus according to the present embodiment and an example of a use case implemented by transmitting the information based on the position of the second imaging apparatus will be described later.

The process using the estimated position of the second imaging apparatus is not limited to the process (information transmission control process) of (2). For example, the information processing apparatus according to the present embodiment can perform an arbitrary process which can be performed using the estimated position of the second imaging apparatus such as a "process of recording the estimated position of the second imaging apparatus in a recording medium as a log" or a "process of estimating the second imaging apparatus, a user who carries the second imaging apparatus, or a vehicle on which the second imaging apparatus is mounted from the estimated position of the second imaging apparatus." An example of the use case implemented by the process using the estimated position of the second imaging apparatus according to the present embodiment will be described later.

For example, the information processing apparatus according to the present embodiment performs the "'process (position estimation process) of (1)" or "the process (position estimation process) of (1) and the process using the estimated position of the second imaging apparatus" as the process related to information processing method according to the present embodiment.

The information processing apparatus according to the present embodiment can achieve the following effects, for example, by performing the process according to the information processing method of the present embodiment.

The position is estimated using the first captured image and the second captured image which are captured at a corresponding time, and thus a time and weather conditions are the same (substantially the same), and the position is easily estimated.

Since the position of the second imaging apparatus is estimated using the first captured image and the second captured image, it is possible to estimate the position of the second imaging apparatus with a high degree of accuracy even indoors or on high-rise building streets in which it is difficult to obtain the high accuracy through positioning using existing positioning such as positioning using GPS.

A subject corresponding to the second imaging apparatus is specified on the basis of the first captured image, and the subject is tracked, and thus the position can be continuously estimated without repeating the process (position estimation process) of (1).

The process (information transmission control process) of (2) is performed as the process using the estimated position of the second imaging apparatus, and thus it is possible to deliver various kinds of information to the second imaging apparatus, the user of the second imaging apparatus, and the like.

"The process (position estimation process) of (1)" or "the process (position estimation process) of (1) and the process using the estimated position of the second imaging apparatus" are processes obtained by dividing the process according to the information processing method of the present embodiment for the sake of convenience. Therefore, in the process according to the information processing method of the present embodiment, for example, "the process (position estimation process) of (1)" may be regarded as two or more processes (by an arbitrary division method). Further, in the process according to the information processing method of the present embodiment, "the process (position estimation process) of (1) and the process using the estimated position of the second imaging apparatus" may be regarded as one process, or "the process (position estimation process) of (1) and the process using the estimated position of the second imaging apparatus" may be regarded as two or more processes (by an arbitrary division method).

[3] Specific Example of Process Related to Information Processing Method According to Present Embodiment A specific example of the process according to the information processing method of the present embodiment will be described below.

In the following example, the information processing apparatus 100 illustrated in FIG. 1 performs the process (position estimation process) of (1) and the process using the estimated position of the second imaging apparatus as the process according to the information processing method of the present embodiment. Further, an example in which the information processing apparatus 100 performs the process (information transmission control process) of (2) as the process using the estimated position of the second imaging apparatus will be mainly described below. Furthermore, in the following example, the first imaging apparatus is assumed to be a security camera.

FIGS. 9A, 9B, and 9C are explanatory diagrams illustrating an example of a process in the information processing system to which the information processing method according to the present embodiment is applied.

FIG. 9A illustrates an example of a process in the information processing apparatus 100 and the security camera (an example of the first imaging apparatus). More specifically, a process of steps S108 and S110 illustrated in FIGS. 9A, 9B, and 9C corresponds to an example of the process (position estimation process) of (1). A process of step S118 and S120 illustrated in FIG. 9 corresponds to an example of the process (information transmission control process) of (2), and steps S112 to S116 illustrated in FIGS. 9A, 9B, and 9C correspond to an example of the process using the estimated position of the second imaging apparatus.

FIG. 9B illustrates an example of a process in the second imaging apparatus. FIG. 9C illustrates an example of a process in an external device (or an external system) of the information processing apparatus 100 that performs a process on the basis of the information based on the position of the second imaging apparatus transmitted through the process (information transmission control process) of (2).

The second imaging apparatus transmits position information indicating the position of the second imaging apparatus to either or both of the first imaging apparatus and the information processing apparatus 100 (S100). For example, the second imaging apparatus transmits data indicating the position specified using a GPS device or the like as the position information. Further, the second imaging apparatus transmits identification information such as an IP address together with position information.

Here, for example, the position information transmitted in the process of step S100 is used for narrowing down the first captured image in step S108 to be described later. In other words, the position information transmitted in the process of step S100 corresponds to an example of the information related to the second imaging apparatus.

For example, the first imaging apparatus determines whether or not the second imaging apparatus is within the imaging region of the first imaging apparatus on the basis of the position information transmitted in the process of step S100 (S102). Here, when the second imaging apparatus is determined not to be within the imaging region in step S102, the process starting from step S100 is performed in the information processing system according to the present embodiment.

When the second imaging apparatus is determined to be within the imaging region in step S102, the second imaging apparatus performs imaging (S104). The second imaging apparatus performs the imaging, for example, on the basis of an imaging command transmitted from the first imaging apparatus. As described above, it will be appreciated that the imaging in the second imaging apparatus is not limited to imaging performed on the basis of the imaging command.

The second imaging apparatus, for example, transmits the second captured image generated by the imaging to the information processing apparatus 100 together with the identification information such as the IP address (S106).

For example, the information processing apparatus 100 narrows down the position at which the second imaging apparatus is likely be located using the position information transmitted from the second imaging apparatus in step S100 and specifies the first imaging apparatus corresponding to the position at which the second imaging apparatus is likely be located (S108).

For example, the information processing apparatus 100 regards a predetermined range set from the position indicated by the position information as the position at which the second imaging apparatus is likely be located, and specifies the first imaging apparatus included in the predetermined range. Here, the predetermined range according to the present embodiment may be a fixed range that is set or may be a variable range that varies according to the lapse of time from the acquisition of the position information. A change in the range according to the lapse of time from the acquisition of the position information may be, for example, a change which is made so that the range is increased.

The method of narrowing down the position at which the second imaging apparatus is likely be located according to the present embodiment is not limited to the above example.

Figure 10A:
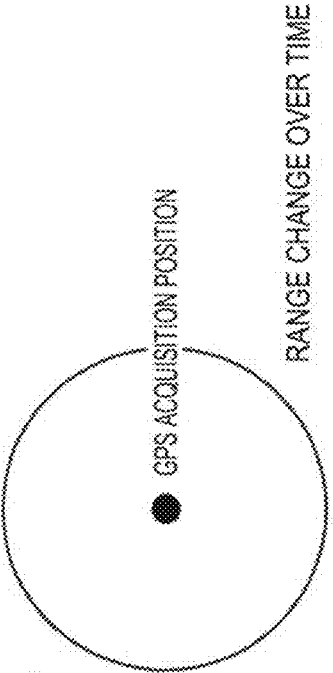
FIGS. 10A(A), 10A(B), 10A(C), and 10A(D) are explanatory diagrams for describing an example of a process related to an information processing method according to the present embodiment.
Figure 10A:
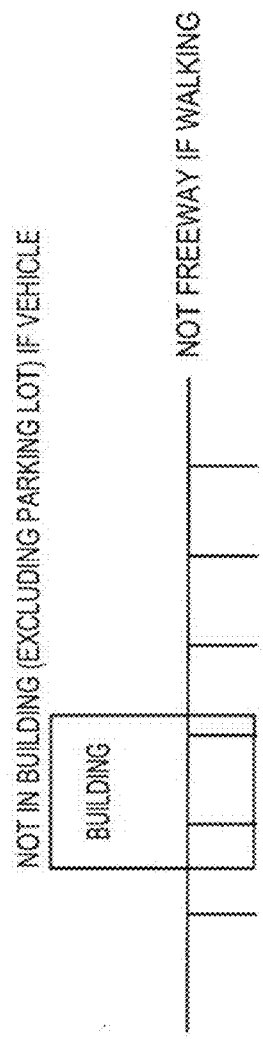
Figure 10A:
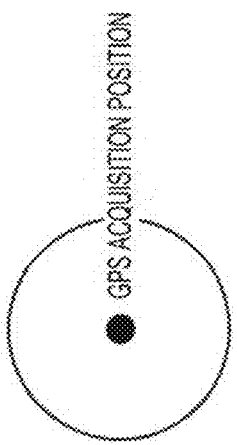

FIGS. 10A(A), 10A(B), 10A(C), 10A(D) and 10B(A), 10B(B), 10B(C), 10B(D), 10B(E) are explanatory diagrams for describing an example of the process according to the information processing method of the present embodiment and illustrate an example of a method for narrowing down the position at which the second imaging apparatus is likely be located in the position estimation process according to the present embodiment.

For example, as illustrated in FIG. 10(A), the information processing apparatus 100 sets a position within a predetermined range set from the position indicated by the acquired position information as the position at which the second imaging apparatus is likely be located. Further, for example, as illustrated in FIG. 10A(B), the predetermined range may be changed to a larger range in accordance with the lapse of time after the acquisition of the position information. Since the predetermined range is changed to a larger range in accordance with the lapse of time, for example, even when the user carrying the second imaging apparatus moves, the information processing apparatus 100 can specify a more appropriate first imaging apparatus in the position estimation process according to the present embodiment.

Further, for example, when information indicating the motion is used as the information related to the second imaging apparatus, the information processing apparatus 100 narrows down the position at which the second imaging apparatus is likely be located by excluding the position at which the second imaging apparatus is difficult to be located as illustrated in FIG. 10A(C).

Further, for example, when the tracking information is used as the information related to the second imaging apparatus, the information processing apparatus 100 regards a position within the predetermined range set from the latest position indicated by the tracking information as the position at which the second imaging apparatus is likely be located as illustrated in FIG. 10A(D).

Figure 10B:
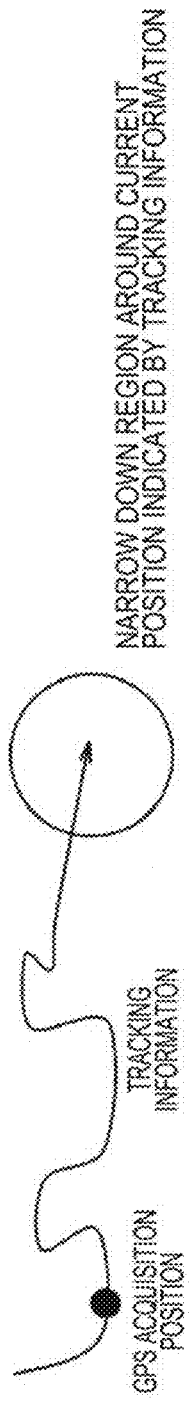
FIGS. 10B(A), 10B(B), 10B(C), 10B(D), and 10B(E) are explanatory diagrams for describing an example of a process related to an information processing method according to the present embodiment.

Further, for example, when the information related to the magnetic field is used as the information related to the second imaging apparatus, the information processing apparatus 100 estimates the position at which the second imaging apparatus is likely be located in accordance with the strength and the direction of the magnetic field as illustrated in FIG. 10B(A). For example, the information processing apparatus 100 refers to a table (or a database) in which the position of the first imaging apparatus is associated with data indicating the strength and the direction of the magnetic field. Further, for example, the information processing apparatus 100 regards a position within a predetermined range set from a position of the first imaging apparatus coinciding with the strength and the direction of the magnetic field indicated by the information related to the magnetic field (or a position of the first imaging apparatus in which a difference with the strength and the direction of the magnetic field indicated by the information related to the magnetic field is within a predetermined range) as the position at which the second imaging apparatus is likely be located.

Further, for example, when the information related to the radio wave is used as the information related to the second imaging apparatus, the information processing apparatus 100 estimates the position at which the second imaging apparatus is likely be located on the basis of the strength and the delay time of the radio wave as illustrated in FIG. 10B(B). For example, the information processing apparatus 100 refers to a table (or a database) in which the position of the first imaging apparatus is associated with data indicating the strength and the delay time of the radio wave. Further, for example, the information processing apparatus 100 regards a position within a predetermined range set from a position of the first imaging apparatus coinciding with the strength and the delay time of the radio wave indicated by the information related to the radio wave (or a position of the first imaging apparatus in which a difference with the strength and the delay time of the radio wave indicated by the information related to the radio wave is within a predetermined range) as the position at which the second imaging apparatus is likely be located.

Further, for example, when the information related to the sound is used as the information related to the second imaging apparatus, the information processing apparatus 100 estimates the position at which the second imaging apparatus is likely be located in accordance with the strength and the delay time of the sound such as a public announcement as illustrated in FIG. 10B(C). For example, the information processing apparatus 100 refers to a table (or a database) in which the position of the first imaging apparatus is associated with data indicating the strength and the delay time of the sound. Further, for example, the information processing apparatus 100 regards a position within a predetermined range set from a position of the first imaging apparatus coinciding with the strength and the delay time of the sound indicated by the information related to the sound (or a position of the first imaging apparatus in which a difference with the strength and the delay time of the sound indicated by the information related to the sound is within a predetermined range) as the position at which the second imaging apparatus is likely be located.

Further, for example, when the information related to the light is used as the information related to the second imaging apparatus, the information processing apparatus 100 estimates the position at which the second imaging apparatus is likely be located in accordance with luminance or color as illustrated in FIG. 10B(D). For example, the information processing apparatus 100 refers to a table (or a database) in which the position of the first imaging apparatus is associated with data indicating luminance or color. Further, for example, the information processing apparatus 100 regards a position within a predetermined range set from a position of the first imaging apparatus coinciding with the luminance or the color indicated by the information related to the light (or a position of the first imaging apparatus in which a difference with the luminance or the color indicated by the information related to the light is within a predetermined range) as the position at which the second imaging apparatus is likely be located.

Further, for example, when the information indicating the barometric pressure is used as the information related to the second imaging apparatus, the information processing apparatus 100 estimates the position at which the second imaging apparatus is likely be located in accordance with the barometric pressure, for example, as illustrated in FIG. 10B(E). For example, the information processing apparatus 100 refers to a table (or a database) in which the position of the first imaging apparatus is associated with data indicating the barometric pressure. Then, for example, the information processing apparatus 100 regards a position within a predetermined range set from a position of the first imaging apparatus coinciding with the barometric pressure indicated by the information indicating the barometric pressure (or a position of the first imaging apparatus in which a difference with the barometric pressure indicated by the information indicating barometric pressure is within a predetermined range) as the position at which the second imaging apparatus is likely be located.

The information processing apparatus 100 narrows down the position at which the second imaging apparatus is likely be located, for example, by any one of the methods described with reference to FIGS. 10A(A), 10A(B), 10A(C), 10A(D) and 10B(A), 10B(B), 10B(C), 10B(D), 10B(E) or a combination of the methods described with reference to FIGS. 10A(A), 10A(B), 10A(C), 10A(D) and 10B(A), 10B (B), 10B(C), 10B(D), 10B(E). It will be appreciated that the method of narrowing down the position at which the second imaging apparatus is likely be located according to the present embodiment is not limited to the methods described with reference to FIGS. 10A(A), 10A(B), 10A(C), 10A(D) and 10B(A), 10B(B), 10B(C), 10B(D), 10B(E).

The example of the process in the information processing system to which the information processing method according to the present embodiment is applied will be described with reference back to FIGS. 9A, 9B, and 9C. For example, the information processing apparatus 100 estimates the position of the second imaging apparatus on the basis of the second captured image transmitted in step S106 and the first captured image which is captured by the first imaging apparatus located at the position corresponding to the narrowed position at the time corresponding to the second imaging apparatus (S110).

For example, the information processing apparatus 100 estimates the position of the second imaging apparatus by performing the position estimation process according to the first example described in (1-1) or the position estimation process according to the second example described in (1-2).

When the position of the second imaging apparatus is estimated in step S110, the information processing apparatus 100 estimates the user carrying the second imaging apparatus or the vehicle in which the second imaging apparatus is mounted (S112). The process of step S112 corresponds to an example of the process using the estimated position of the second imaging apparatus.

Here, the user, the vehicle, or the like estimated in step S112 may be a target of tracking using the first captured image captured by the first imaging apparatus in a process related to tracking to be described later. Therefore, hereinafter, the user, the vehicle, or the like estimated in step S112 is also referred to as a "subject."

Figure 11A:
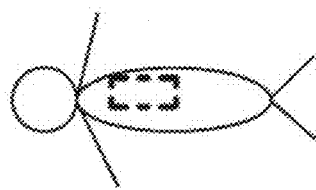
FIGS. 11A, 11B, and 11C are explanatory diagrams for describing an example of a process related to an information processing method according to the present embodiment.
Figure 11B:
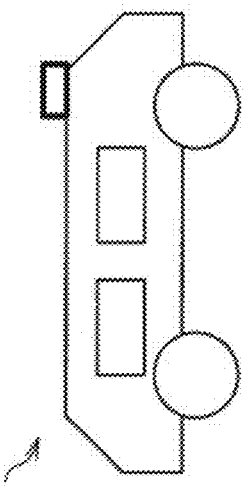
Figure 11C:
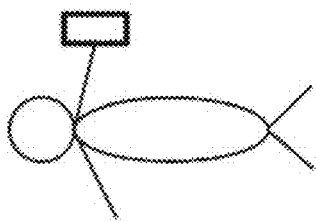

FIGS. 11A, 11B, and 11C are explanatory diagrams for describing an example of the process according to the information processing method of the present embodiment, and illustrates an example of estimating the subject in step S112 of FIGS. 9A, 9B, and 9C.

For example, after estimating the position of the second imaging apparatus, when the second imaging apparatus is included in the first captured image captured by the first imaging apparatus that has captured the first captured image used for the estimation, the information processing apparatus 100 estimates the user or the vehicle in a predetermined range regarded as being integrated with the second imaging apparatus as the subject (the user carrying the second imaging apparatus or the vehicle in which the second imaging apparatus is mounted) as illustrated in FIGS. 11A and 11B.

Further, the process related to the estimation of the subject in step S112 in FIGS. 9A, 9B, and 9C is not limited to the above example. For example, the information processing apparatus 100 can set a range in which the subjects such as the user carrying the second imaging apparatus or the vehicle in which the second imaging apparatus is mounted is likely be located for each subject candidate and estimate the subject candidate corresponding to the range closest to the estimated position of the second imaging apparatus among the set ranges as the subject.

As described above, the subject candidate corresponding to the range closest to the estimated position of the second imaging apparatus among the set ranges is estimated as the subject, and thus even when the device is a blind spot of the imaging range of the first imaging apparatus as illustrated in FIG. 11C, it is possible to estimate the subject.

When the subject is estimated in step S112 as described above, when the subject estimated from the first captured image captured by the first imaging apparatus constituting the information processing system according to the present embodiment is detected, the information processing apparatus 100 can continuously estimate the position of the second imaging apparatus without performing the process (position estimation process) of (1) again.

The example of the process in the information processing system to which the information processing method according to the present embodiment is applied will be described with reference back to FIGS. 9A, 9B, and 9C. For example, the information processing apparatus 100 associates the subject estimated in step S112 with the identification information acquired from the second imaging apparatus (S114).

For example, the information processing apparatus 100 associates the estimated subject with the identification information by associating data related to the subject such as an image indicating the subject estimated in step S112 or data indicating a feature of the subject obtained by analyzing the image with the identification information acquired from the second imaging apparatus and storing it in a recording medium such as a storage unit (which will be described later). Further, the process of step S114 is not limited to the above example, and the information processing apparatus 100 can perform an arbitrary process capable of associating the estimated subject with the identification information.

The information processing apparatus 100 tracks the subject estimated in step S112 (S116). Here, the estimation of the subject in step S112 is performed on the basis of the estimated position of the second imaging apparatus. Therefore, the process of step S116 can be regarded as an example of the process using the estimated position of the second imaging apparatus.

Figure 12:
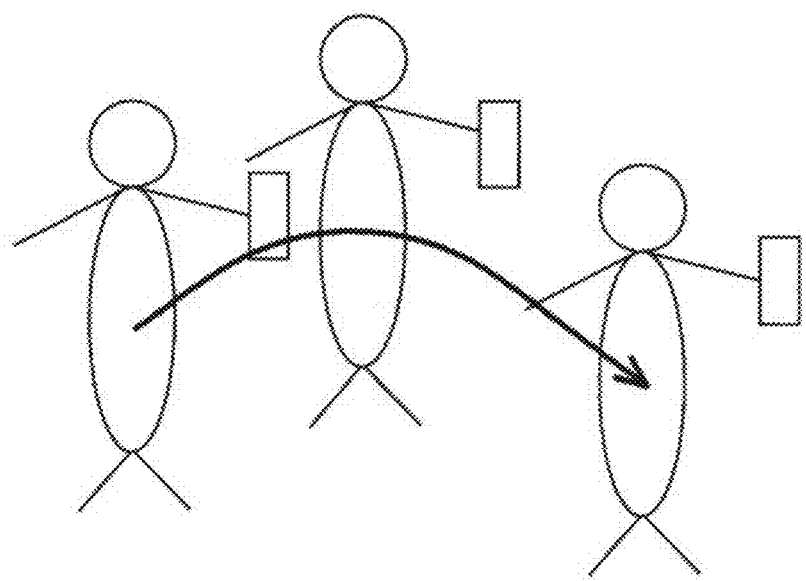
FIG. 12 is an explanatory diagram for describing an example of a process related to an information processing method according to the present embodiment.

FIG. 12 is an explanatory diagram for describing an example of the process according to the information processing method of the present embodiment, and illustrates an example of tracking the subject in step S116 in FIGS. 9A, 9B, and 9C.

For example, the information processing apparatus 100 tracks the subject by separating the background from the first captured image and detecting an object having the same feature as the feature of the subject.

Further, the process related to the tracking of the subject in step S116 is not limited to the above process. For example, the information processing apparatus 100 can track the subject by detecting the subject from the first captured image using any technique capable of detecting an object from an image.

Figure 13:
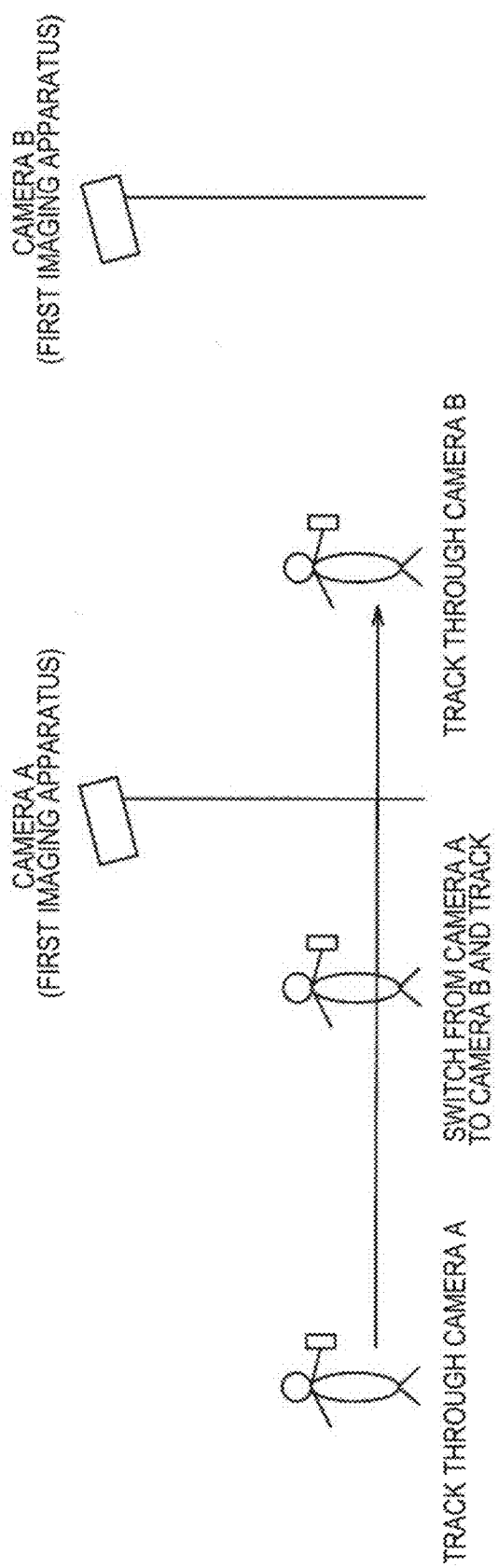
FIG. 13 is an explanatory diagram for describing an example of a process related to an information processing method according to the present embodiment.

FIG. 13 is an explanatory diagram for describing an example of the process according to the information processing method of the present embodiment, and illustrates another example of tracking the subject in step S116 of FIGS. 9A, 9B, and 9C.

For example, when the subject can move as in the case in which the subject is the user carrying the second imaging apparatus, the subject may come out of an imaging range of one first imaging apparatus. In this regard, when the information processing system according to the present embodiment has a plurality of first imaging apparatuses, the information processing apparatus 100 may switch the first captured image of imaging the subject and track the subject using the first captured image captured by the switched first imaging apparatus, for example, as illustrated in FIG. 13. FIG. 13 illustrates an example in which the information processing apparatus 100 performs switching from a camera A to a camera B and performs tracking.

Figure 14:
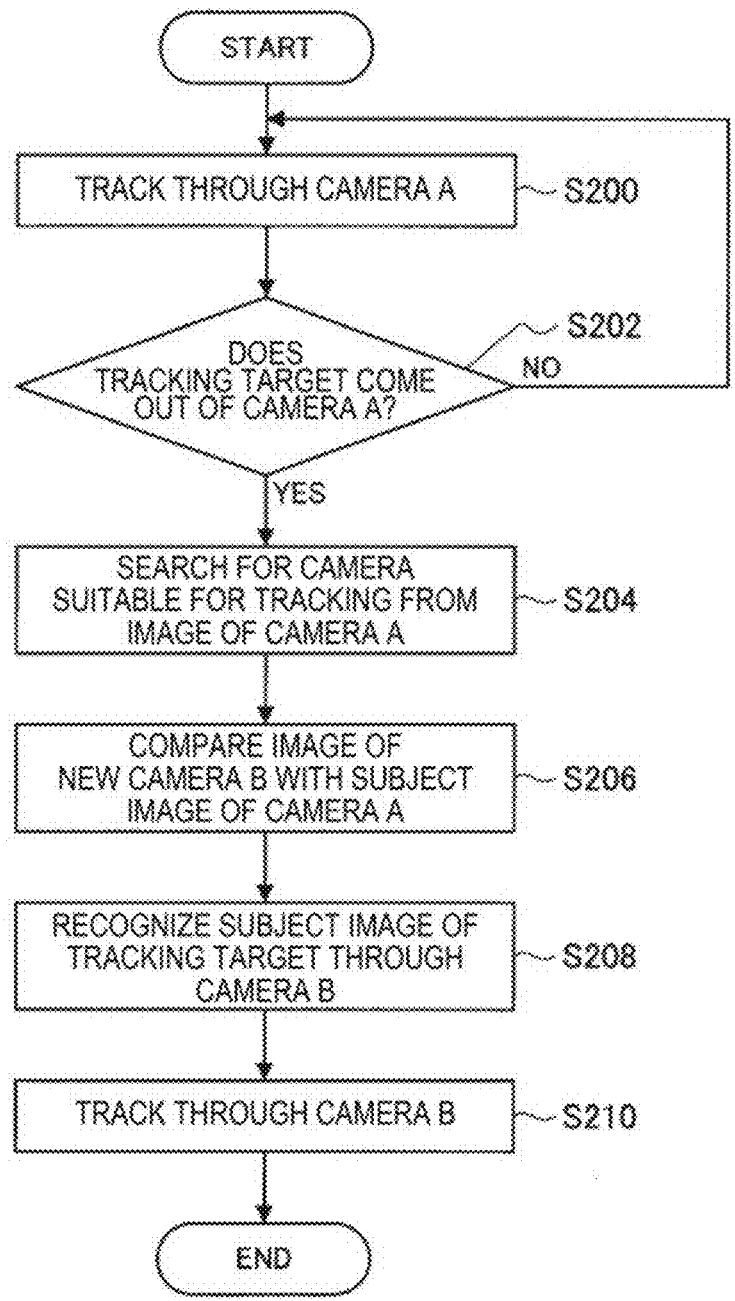
FIG. 14 is an explanatory diagram for describing an example of a process related to an information processing method according to the present embodiment.

FIG. 14 is an explanatory diagram for describing an example of the process related to the information processing method according to the embodiment and illustrates an example in which switching from the camera A (an example of the first imaging apparatus) to the camera B (another example of the first imaging apparatus) illustrated in FIG. 13 is performed to perform tracking.

The information processing apparatus 100 tracks the subject using the captured image captured by the camera A (S200).

The information processing apparatus 100 determines whether or not the subject comes out of the imaging range of the camera A (S202). For example, when the subject is detected from a predetermined region in the captured image captured by the camera A (for example, a set region such as a region corresponding to an end portion of an image), the information processing apparatus 100 determines that the subject comes out of the imaging range of camera A.

When the subject is determined not to come out of the imaging range of the camera A in step S202, the information processing apparatus 100 repeats the process starting from step S200.

When the subject is determined to come out of the imaging range of the camera A in step S202, the information processing apparatus 100 searches for the first imaging apparatuses suitable for the tracking among the first imaging apparatuses constituting the information processing system according to the present embodiment (S204).

For example, the information processing apparatus 100 estimates a moving direction of the subject from the captured image captured by the camera A, and selects the first imaging apparatus adjacent in the estimated moving direction among the first imaging apparatuses adjacent to the camera A as the first imaging apparatus suitable for the tracking. In FIG. 14, the camera B is assumed to be searched for through the above process. It will be appreciated that the process of step S204 is not limited to the above example.

For example, the information processing apparatus 100 detects the subject detected from the captured image captured by the camera A from the captured image captured by the camera B searched in step S204 (S206). Then, when the subject is detected from the captured image captured by the camera B (S208), the information processing apparatus 100 tracks the subject using the captured image captured by the camera B (S210).

For example, when the process illustrated in FIG. 14 is performed, tracking by switching from the camera A to the camera B as illustrated in FIG. 13 is implemented. It will be appreciated that the process capable of implementing the camera switching as illustrated in FIG. 13 is not limited to the example illustrated in FIG. 14.

The example of the process in the information processing system to which the information processing method according to the present embodiment is applied will be described with reference back to FIGS. 9A, 9B, and 9C. For example, the information processing apparatus 100 generates information based on the position of the second imaging apparatus estimated in step S110 (S118), and transmits the information based on the generated position of the second imaging apparatus to the external device (S120). The information processing apparatus 100 transmits the information based on the position of the second imaging apparatus to each of transmission target devices using the identification information corresponding to each of the transmission target devices such as the IP address corresponding to each of the transmission target devices.

The second imaging apparatus that has received the information based on the position of the second imaging apparatus transmitted in step S120 gives a notification based on the information based on the received position of the second imaging apparatus (S122). For example, the second imaging apparatus gives a visual notification by causing content of the information based on the received position of the second imaging apparatus to be displayed on the display screen or an auditory notification by causing a sound (including music) corresponding to the information based on the position of the second imaging apparatus to be output from an audio output device.

A device (or a system) such as a server that has received the information based on the position of the second imaging apparatus transmitted in step S120 performs control based on the information based on the received position of the second imaging apparatus (S124).

A use cases implemented by the process of steps S118 to S124 in FIGS. 9A, 9B, and 9C will be described later.

After the tracking, the information processing apparatus 100 determines whether or not the subject is within the imaging region in the first imaging apparatus included in the information processing system according to the present embodiment (S126). For example, when the subject is detected from any one of the first captured images captured by the first imaging apparatuses included in the information processing system according to the present embodiment, the information processing apparatus 100 determines that the subject is within the imaging region.

For example, when the subject is determined to be within the imaging region in step S126, the information processing apparatus 100 repeats the processing starting from step S116. On the other hand, when the subject is determined not to be within the imaging region in step S212, the information processing apparatus 100 ends the process according to the information processing method of the present embodiment.

In the information processing system according to the present embodiment, for example, the process as illustrated in FIGS. 9A, 9B, and 9C is performed.

The processing in the information processing system according to the present embodiment is not limited to the process illustrated in FIGS. 9A, 9B, and 9C.

For example, the information processing apparatus 100 may not perform the process of step S108 illustrated in FIGS. 9A, 9B, and 9C. Even when the process of step S108 illustrated in FIGS. 9A, 9B, and 9C is not performed, in step S110 the information processing apparatus 100 can estimate the position of the second imaging apparatus on the basis of the first captured images captured by the first imaging apparatuses included in the information processing system according to the present embodiment and the second captured images captured at the times corresponding to the first captured images. Further, when the process of step S108 illustrated in FIGS. 9A, 9B, and 9C is not performed, the second imaging apparatus may not perform the process of step S100.

Further, the information processing apparatus 100 may not perform the process related to the tracking of the subject described in steps S112, S114, and S116 illustrated in FIGS. 9A, 9B, and 9C. Even when the process of steps S112, S114, and S116 illustrated in FIGS. 9A, 9B, and 9C is not performed, the information processing apparatus 100 can track the second imaging apparatus by appropriately performing the process (position estimation process) of (1).

[4] Use Case Implemented by Process Using Estimated Position of Second Imaging Apparatus According to Information Processing Method According to Present Embodiment Next, the use case implemented by the process using the estimated position of the second imaging apparatus according to the information processing method of the present embodiment will be described. Among the use cases to be described below, for example, a use case described in (4-1) and a use case described in (4-2) correspond to an example of a use case implemented by the "process in steps S118 and S120 illustrated in FIGS. 9A, 9B, and 9C" and "either or both of the process of step S122 and the process of step S124 illustrated in FIGS. 9A, 9B, and 9C."

(4-1) First Example of Use Case: Use Case in which Transmission of Information for Collision Avoidance and Warning is Performed FIGS. 15A and 15B are explanatory diagrams for describing a first example of a use case implemented by the process using the estimated position of the second imaging apparatus according to the information processing method of the present embodiment. FIGS. 15A and 15B illustrate an example of a use case in which the information processing apparatus 100 transmits information for collision avoidance and warning to the user of the second information processing apparatus.

FIG. 15A illustrates one use case in which transmission of information for collision avoidance and for warning is performed. FIG. 15A illustrates an example in which the information processing apparatus 100 estimates the position of the second imaging apparatus of each of a user A, a user B, and a user C through the process according to the information processing method of the present embodiment, and tracks each of the user A, the user B, and the user C as the subject. Further, FIG. 15A illustrates an example in which the second imaging apparatus of the user B is a transmission target to which the information based on the position of the second imaging apparatus is transmitted through the process (information transmission control process) of (2). When the second imaging apparatus serving as the transmission target to which the information based on the position of the second imaging apparatus is transmitted through the process (information transmission control process) of (2) is only the second imaging apparatus of the user B, the user A and user C may not have the second imaging apparatus. Even when the user A and user C do not have the second imaging apparatus, it is possible to track the user A and the user C respectively using the first captured image.

The information processing apparatus 100 determines that the user A and the user B are getting close to each other and likely to collide with each other from the positions of the user A (an example of the subject) and the user B (an example of the subject) and a history of a change in the position (motion of each user). Further, the information processing apparatus 100 determines that the user B and the user C are getting close to each other but unlikely to collide with each other from the positions of the user A (an example of the subject) and the user C (an example of the subject) and a history of a change in the position (motion of each user).

On the basis of the determination result, for example, the information processing apparatus 100 generates information for giving a notification indicating that "there is a possibility of collision on the left side, and there is something approaching on the right side" (the information for collision avoidance and warning) as the information based on the position of the second imaging apparatus. Then, the information processing apparatus 100 transmits the information based on the generated position of the second imaging apparatus to the second imaging apparatus corresponding to the user B.

The second imaging apparatus corresponding to the user B who has received the information based on the position of the second imaging apparatus transmitted by the information processing apparatus 100 gives a notification indicating content indicated by the information based on the position of the second imaging apparatus to the user B. Therefore, for example the user B can more easily avoid collision with the user A and pay attention to the user C.

FIG. 15B illustrates another use case in which transmission of the information for collision avoidance and warning is performed. FIG. 15B illustrates an example in which the information processing apparatus 100 estimates, for example, the positions of the second imaging apparatuses mounted on a passenger vehicle and a bicycle and tracks the passenger vehicle and the bicycle as the subject through the process according to the information processing method of the present embodiment. Further, FIG. 15B illustrates an example in which the second imaging apparatus mounted on the passenger vehicle is a transmission target to which the information based on the position of the second imaging apparatus is transmitted through the process (information transmission control process) of (2). Furthermore, when the second imaging apparatus serving as the transmission target to which the information based on the position of the second imaging apparatus is transmitted through the process (information transmission control process) of (2) is the second imaging apparatus mounted on the passenger car, the second imaging apparatus may not be mounted on the bicycle. Even when the second imaging apparatus is not mounted on the bicycle, it is possible to track the bicycle using the first captured image.

Here, the second imaging apparatus mounted on the passenger vehicle is assumed to be the transmission target to which the information based on the position of the second imaging apparatus is transmitted through the process (information transmission control process) of (2). For example, the information processing apparatus 100 determines that the bicycle and the passenger vehicle are getting close to each other by a similar process to the process described with reference to FIG. 15A and generates information for giving a notification indicating that "there is something approach from the left side" (the information for collision avoidance and warning) as the information based on the position of the second imaging apparatus. Then, the information processing apparatus 100 transmits the generated information on the basis of the position of the second imaging apparatus to the second imaging apparatus mounted on the passenger car. Further, when the information processing apparatus 100 is capable of acquiring information indicating a state of a signal, the information processing apparatus 100 may further transmit information indicating the state of the signal.

The second imaging apparatus mounted on the passenger vehicle that has received the information based on the position of the second imaging apparatus transmitted by the information processing apparatus 100 gives a notification indicating content indicated by the information based on the position of the second imaging apparatus or the like to a driver of the passenger car. Therefore, for example, the driver of the passenger vehicle can more easily avoid collision with the bicycle.

(4-2) Second Example of Use Case: Use Case in which Transmission of Information for Guidance is Performed FIGS. 16A, 16B, 16C, 16D, and 16E are explanatory diagrams for describing a second example of the use case implemented by the process using the estimated position of the second imaging apparatus according to the information processing method of the present embodiment. FIGS. 16A, 16B, 16C, 16D, and 16E illustrate an example of the use case in which the information processing apparatus 100 transmits guidance information for guiding the user of the second information processing apparatus.

For example, the information processing apparatus 100 estimates the position of the second imaging apparatus (or the subject) through the process according to the information processing method of the present embodiment. The information processing apparatus 100 generates guidance information for guiding the user of the second information processing apparatus using a change in the estimated position (corresponding to the moving direction) or map information (data) indicating a map around the estimated position as the information based on the position of the second imaging apparatus. Then, the information processing apparatus 100 transmits the information based on the generated position of the second imaging apparatus to the second imaging apparatus of the transmission target of the information based on the position of the second imaging apparatus.

When the guidance information (an example of the information based on the position of the second imaging apparatus) is transmitted, for example, the following effects are implemented.

Figure 16A:
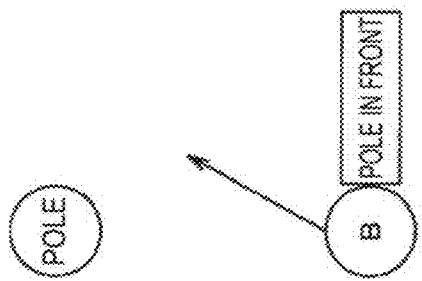
FIGS. 16(A), 16(B), 16(C), 16(D), and 16(E) are explanatory diagrams for describing a second example of a use case implemented by a process using an estimated position of a second imaging apparatus related to an information processing method according to the present embodiment.

Guidance by transmission of the guidance information indicating that a pole is in front (FIG. 16A).

Figure 16B:
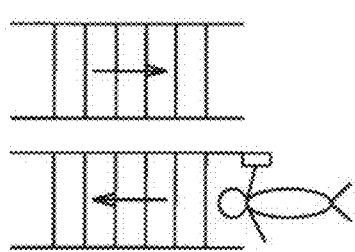

Guidance that the user who is heading for an escalator in an incorrect direction heads for an escalator in a correct direction (FIG. 16B)

Figure 16C:
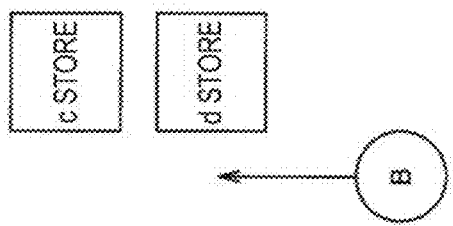

Store guidance (FIG. 16C)

Figure 16D:
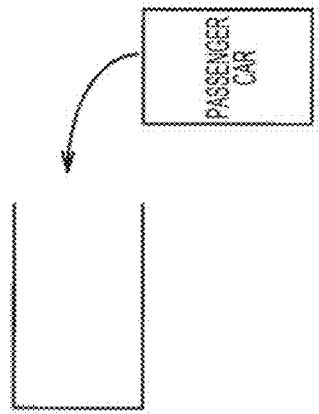
Figure 16E:
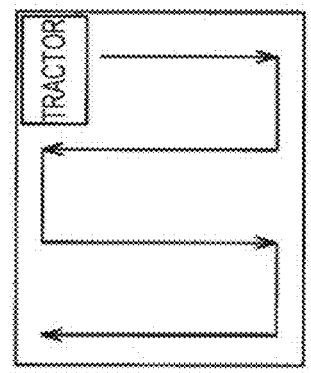

Automatic driving of moving bodies such as passenger cars and tractors (FIGS. 16D and 16E)

In the examples illustrated in FIGS. 16D and 16E, for example, the information for collision avoidance and warning described in (4-1) is further transmitted as the information based on the position of the second imaging apparatus, and thus the avoidance of collision with other objects in the automatic driving can be implemented.

Figure 17C:
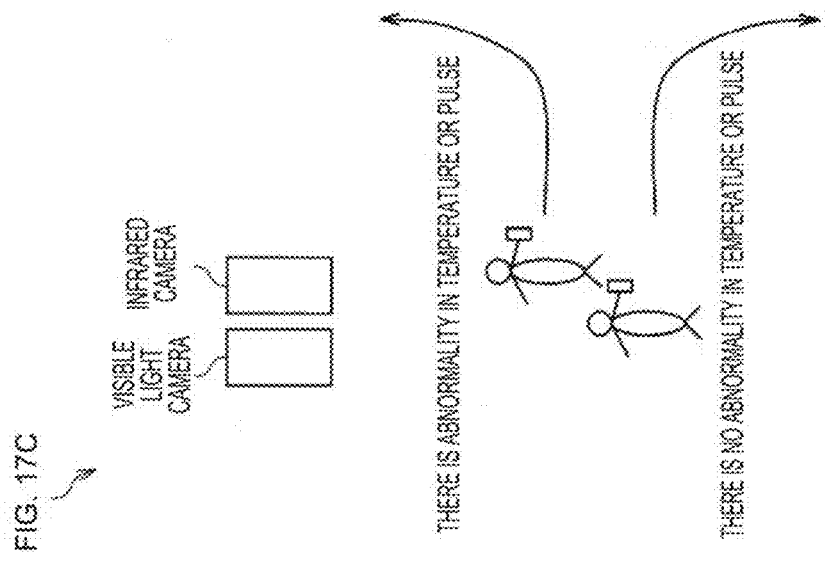
FIGS. 17A, 17B, and 17C are explanatory diagrams for describing a second example of a use case implemented by a process using an estimated position of a second imaging apparatus related to an information processing method according to the present embodiment.
Figure 17B:
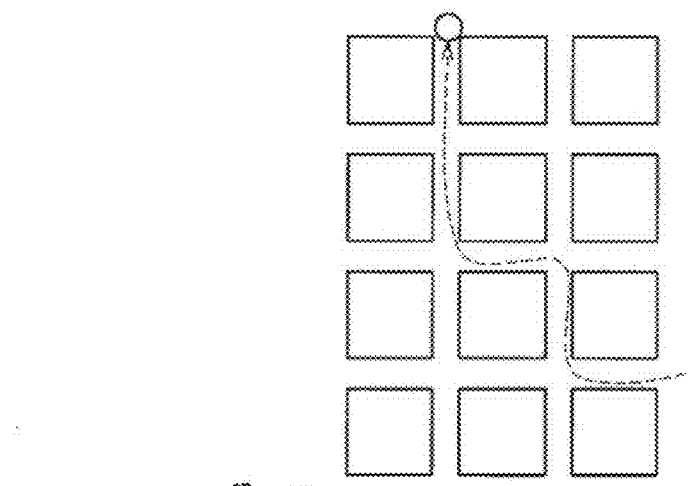
Figure 17A:

FIGS. 17A, 17B, and 17C explanatory diagrams for describing a second example of the use case implemented by the process using the estimated position of the second imaging apparatus according to the information processing method of the present embodiment. FIGS. 17A, 17B, and 17C illustrates another example of the use case in which the information processing apparatus 100 transmits the guidance information for guiding the user of the second information processing apparatus.

The information processing apparatus 100 can also generate the guidance information using acquired other information (data). Examples of guidance based on the guidance information generated using other information are as follows.

Guidance so that the user whose tries to go through a red light is stopped (FIG. 17A)

Guidance so that movement is performed similarly to a tracking history in the same region in the past (or a history of the estimated position) (FIG. 17B).

Guidance so that guidance content when there is an abnormality in the user is different from guidance content when there is no abnormality (FIG. 17C).

Here, the guidance indicated by FIG. 17A is implemented by, for example, guidance information generated using information indicating the state of the signal corresponding to the estimated position.

Further, the guidance illustrated in FIG. 17B is implemented, for example, by guidance information generated using the information of the tracking history in the same area in the past (or the information of the history of the estimated position. Hereinafter, also referred to as "history information"). The history information may be history information corresponding to the user of the second imaging apparatus of the guidance target or history information corresponding to another user.

Further, when the guidance illustrated in FIG. 17C is performed, for example, the information processing apparatus 100 determines the presence or absence of an abnormality in the body temperature by analyzing a captured image captured by an infrared camera, and determines the presence or absence of an abnormality in a pulse by analyzing a captured image captured by a visible light camera.

Here, the information processing apparatus 100 determines the presence or absence of an abnormality in the body temperature through a threshold value process based on a body temperature measurement result using a known technique capable of measuring the body temperature using a captured image captured by an infrared camera and a threshold related to a set body temperature. Further, the information processing apparatus 100 determines the presence or absence of an abnormality in the body temperature through a threshold value process based on a pulse measurement result using a known technique capable of measuring the pulse using a captured image captured by a visible light camera and a threshold related to a set pulse.

For example, when either or both of the body temperature and the pulse are determined to be abnormal, the information processing apparatus 100 determines that there is an abnormality in the user. Then, the information processing apparatus 100 generates guidance information indicating guidance content corresponding to a determination result on the basis of the determination result of the abnormality in the user. The guidance illustrated in FIG. 17C may be used, for example, for airport quarantine or the like.

The determination method of the abnormality in the user is not limited to the above example. The information processing apparatus 100 may generate the guidance information indicating the guidance content corresponding to the determination result on the basis of the determination result of the abnormality in the user determined using an arbitrary method capable of determining the abnormality in the user.

For example, when the guidance illustrated in FIGS. 17A, 17B, and 17C is performed, the information processing apparatus 100 acquires signal information around the position corresponding to the estimated position, history information of the subject corresponding to the estimated position, and information such as the body temperature and the pulse, and generates the guidance information on the basis of the acquired information, the estimated position, and a change in the estimated position.

Figure 18:
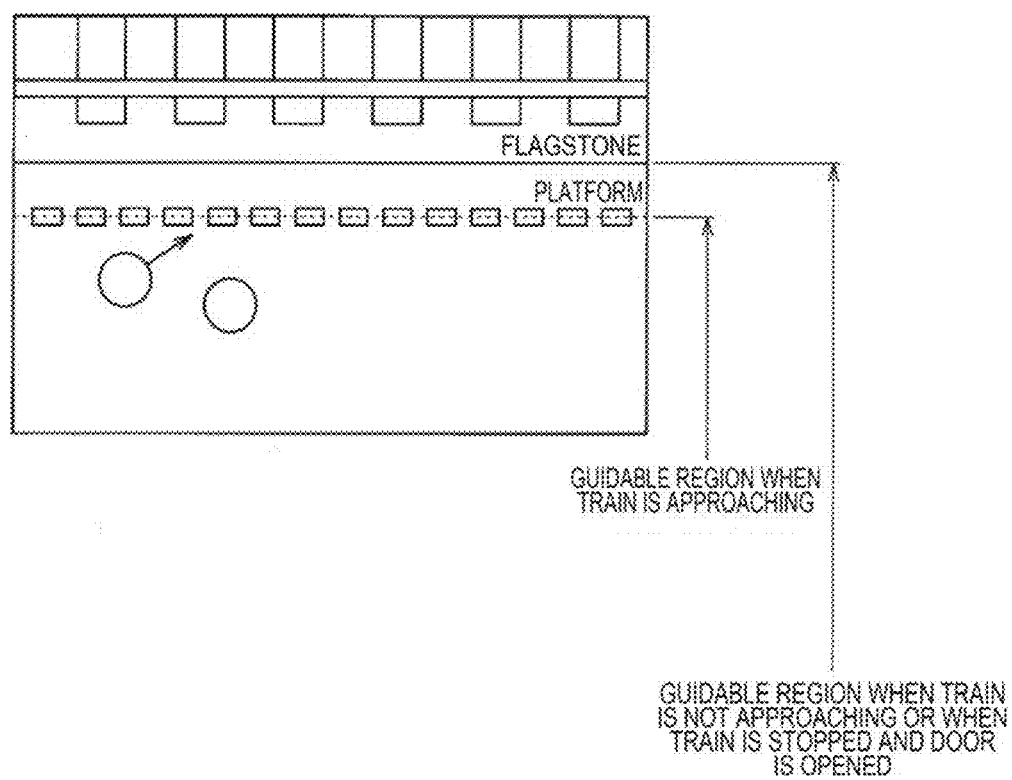
FIG. 18 is an explanatory diagram for describing a second example of a use case implemented by a process using an estimated position of a second imaging apparatus related to an information processing method according to the present embodiment.

FIG. 18 is an explanatory diagram for describing a second example of the use case implemented by the process using the estimated position of the second imaging apparatus according to the information processing method of the present embodiment. FIG. 18 illustrates another example of the use case in which the information processing apparatus 100 transmits the guidance information for guiding the user of the second information processing apparatus. Here, FIG. 18 illustrates an example of guiding the subject using information indicating the state of the signal, train operation information, and door open/close information of the train and illustrates another example in which the information processing apparatus 100 generates the guidance information using acquired other information.

For example, in the case in which the subject or the like is guided through a similar process as the process illustrated in FIGS. 16A, 16B, 16C, 16D, and 16E, when the information processing apparatus 100 is able to acquire the information indicating the state of the signal, the train operation information, the door open/close information of the train (an example of other information), the information processing apparatus 100 can generate the guidance information using each piece of acquired information and change a guidance range. Here, for example, the information processing apparatus 100 acquires the information indicating the state of the signal, the train operation information, and the door open/close information of the train from an external device such as a server that performs a process related to an operation of the train.

For example, the information processing apparatus 100 determines whether or not the train is approaching using the information indicating the state of the signal or the train operation information, and when the train is determined to be approaching, the information processing apparatus 100 generates guidance information for guiding the user having the second imaging apparatus not to move at an edge of a platform. Further, when the train is determined not to be approaching, the information processing apparatus 100 generates guidance information for guiding that the user having the second imaging apparatus is able to move at the edge of the platform.

Further, the information processing apparatus 100 determines whether or not the train is stopped, and the door of the train is opened, for example, using the door open/close information of the train in addition to the information indicating the state of the signal and the train operation information. For example, when it is determined that the train is stopped, and the door of the train is opened, the information processing apparatus 100 generates guidance information for guiding that the user having the second imaging apparatus is able to move at the edge of the platform.

Figure 19:
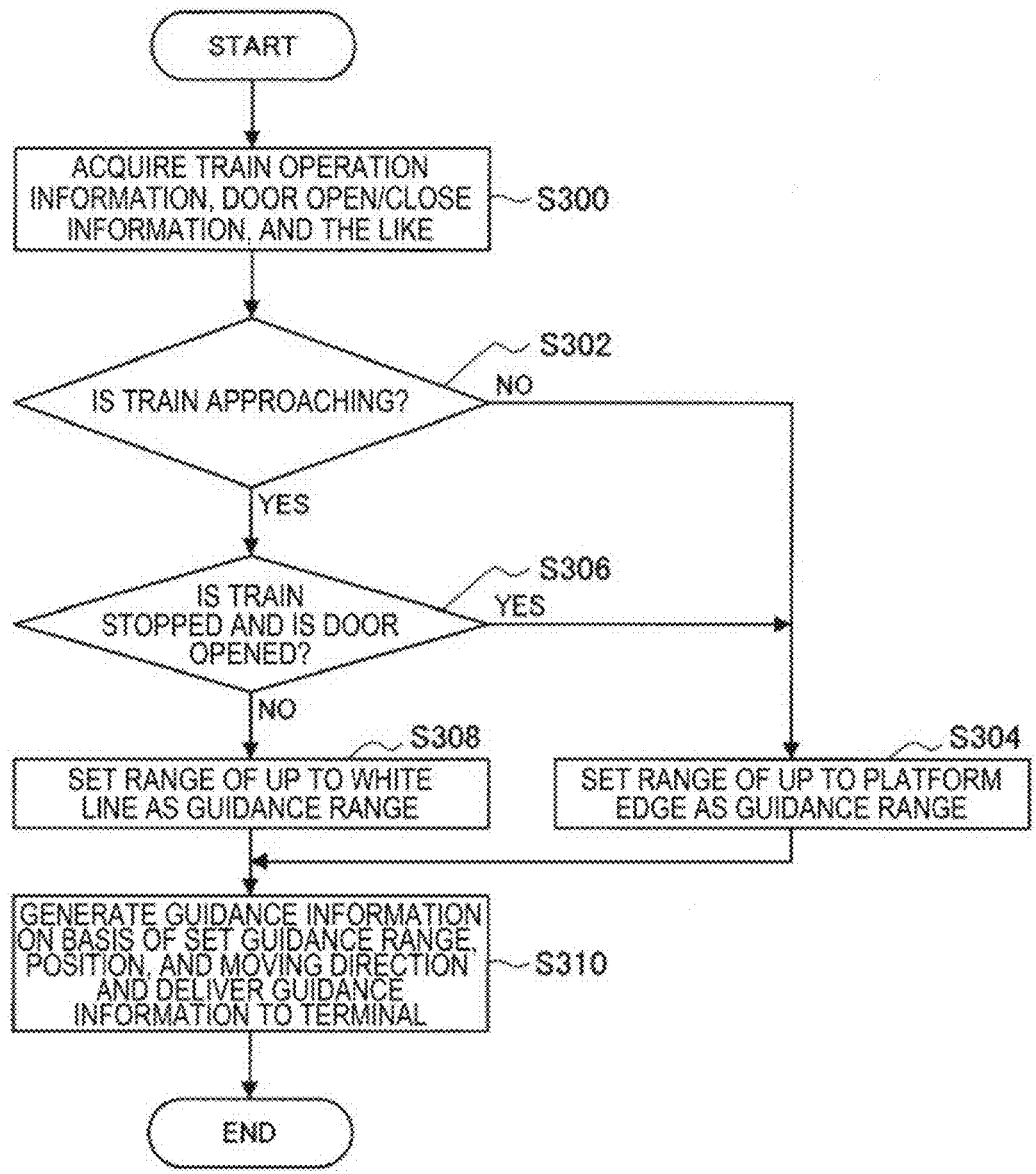
FIG. 19 is an explanatory diagram for describing a second example of a use case implemented by a process using an estimated position of a second imaging apparatus related to an information processing method according to the present embodiment.

FIG. 19 is an explanatory diagram for describing the second example of the use case implemented by the process using the estimated position of the second imaging apparatus according to the information processing method of the present embodiment, and illustrates an example of the process of the information processing apparatus 100 for implementing the guidance illustrated in FIG. 18.

For example, the information processing apparatus 100 acquires the information indicating the state of the signal, the train operation information, and the door open/close information of the train (S300).

The information processing apparatus 100 determines whether or not the train is approaching (S302) using the information acquired in step S300.

When the train is determined not to be approaching the platform in step S302, the information processing apparatus 100 sets a range of up to the platform edge as the guidance range (S304).

When the train is determined to be approaching in step S302, the information processing apparatus 100 determines whether or not the train is stopped, and the train door is opened using the information acquired in step S300 (S306).

When it is determined in step S306 that the train is stopped, and the train door is opened, the information processing apparatus 100 sets the range of up to the platform edge as the guidance range (S304).

When it is not determined in step S306 that the train is stopped, and the train door is opened, the information processing apparatus 100 sets a range of up to a white line of the platform as the guidance range (S308).

When the guidance range is set in step S304 or step S308, the information processing apparatus 100 generates the guidance information on the basis of the set guidance range, the position estimated in the process (position estimation process) of (1), and the change in the estimated position, and transmits the generated guidance information to the second imaging apparatus of the transmission target (S310).

For example, when the process illustrated in FIG. 19 is performed, the information processing apparatus 100 implements the guidance described with reference to FIG. 18.

Figure 20:
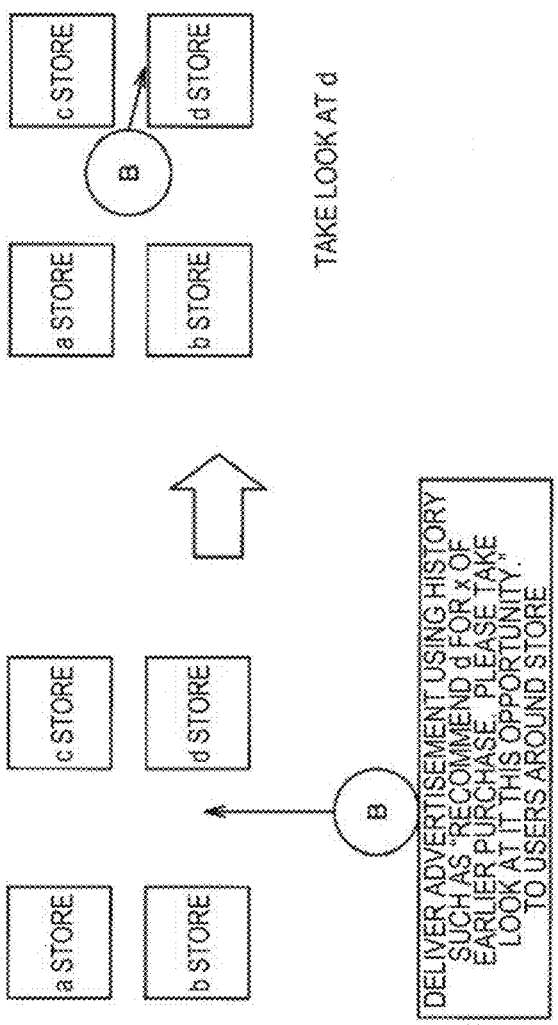
FIGS. 20A and 20B are explanatory diagrams for describing a third example of a use case implemented by a process using an estimated position of a second imaging apparatus related to an information processing method according to the present embodiment.

(4-3) Third Example of Use Case: Use Case in which Advertising Information is Transmitted FIGS. 20A and 20B is are explanatory diagrams for describing a third example of the use case implemented by the process using the estimated position of the second imaging apparatus according to the information processing method of the present embodiment. FIGS. 20A and 20B illustrates an example of a use case in which the information processing apparatus 100 transmits advertising information indicating an advertisement or a coupon to the user of the second information processing apparatus.

For example, the information processing apparatus 100 acquires advertising information corresponding to a region around the estimated position from an external server or the like. Then, for example, the information processing apparatus 100 selects advertising information corresponding to the estimated position from the acquired advertising information, and sets the selected advertising information as the information based on the position of the second imaging apparatus. The information processing apparatus 100 may process the selected advertising information and set the processed advertising information as the information based on the position of the second imaging apparatus.

As the advertising information corresponding to the estimated position, advertising information at the position closest to the estimated position can be cited. Further, when information indicating the direction of the second imaging apparatus (for example, data indicating an azimuth direction such as data indicating a detection value of a magnetic direction sensor) is acquired, the advertising information corresponding to the estimated position may be advertising information of a position corresponding to the direction in which the second imaging apparatus faces within a predetermined range including the estimated position. For example, the direction of the second imaging apparatus may also be estimated from a direction of an object in the first captured image and a direction of an object in in the second captured image. Further, when the user of the second imaging apparatus is identified by authentication or the like, the advertising information corresponding to the estimated position may be advertising information selected using information of action history of the identified user among advertising information of a position within a predetermined range including the estimated position.

For example, when the advertising information of a position closest to the estimated position or the advertising information of a position corresponding to the direction in which the second imaging apparatus faces is selected as the advertising information corresponding to the estimated position, an advertisement is delivered when the user B of the second imaging apparatus moves to a predetermined position or is heading for a predetermined position in a store as illustrated in FIG. 20A. Further, for example, when the advertising information selected using the information of the action history is selected as the advertising information corresponding to the estimated position, it is possible to deliver an advertisement which is likely to be suitable for preference of the user as illustrated in FIG. 20B.

The information processing apparatus 100 can further transmit either or both of the guidance information described in (4-2) and the information for collision avoidance and warning described in (4-1) as the information based on the position of the second imaging apparatus.

Figure 21:
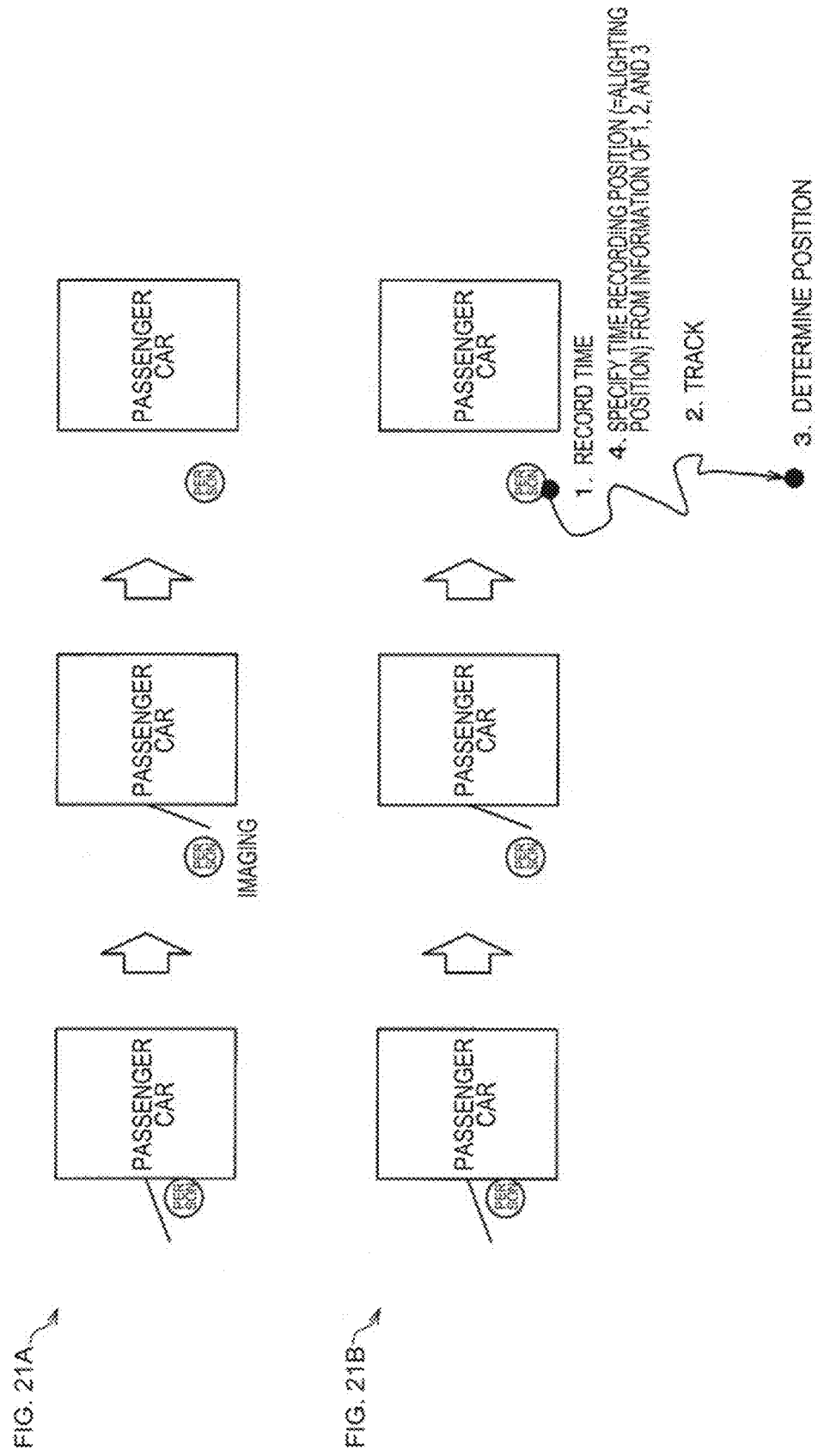
FIGS. 21A and 21B is are explanatory diagrams for describing a fourth example of a use case implemented by a process using an estimated position of a second imaging apparatus related to an information processing method according to the present embodiment.

(4-4) Fourth Example of Use Case: Use Case in which Riding Position and Alighting Position are Specified FIGS. 21A and 21B are explanatory diagrams for describing a fourth example of the use case implemented by the process using the estimated position of the second imaging apparatus according to the information processing method of the present embodiment. FIGS. 21A and 21B illustrate an example of the use case in which the information processing apparatus 100 specifies either or both of the riding position and the alighting position using the position estimated by the process (position estimation process) of (1).

For example, the information processing apparatus 100 determines whether or not a transportation on the second imaging apparatus side is changed through a threshold value process on the basis of sensor information (data) indicating a detection value of a sensor capable of detecting motion such as an acceleration sensor with which the second imaging apparatus is equipped (or an external acceleration sensor connected to the second imaging apparatus). For example, when the transportation is determined to be changed, the information processing apparatus 100 transmits an imaging command to the second imaging apparatus to perform imaging and specifies the riding position or the alighting position by performing the process (position estimation process) of (1) using the captured second captured image. Here, the information processing apparatus 100 can specify whether or not the specified position is the riding position or the alighting position on the basis of the change in motion indicated by the sensor information.

Further, a determination process related to the change in the transportation on the second imaging apparatus side may be performed in the second imaging apparatus or the external device of the information processing apparatus 100, and the imaging command is generated by an apparatus that has performed the determination process.

In the case in which the alighting position is estimated, when the second imaging apparatus is able to perform imaging in accordance with the imaging command, a difference in motion is determined from the change in the acceleration of the second imaging apparatus, imaging is performed using the determination as a trigger, and the position of the second imaging apparatus is estimated as illustrated in FIG. 21A. In the example illustrated in FIG. 21A, the alighting position is estimated by the information processing apparatus 100.

Further, the second imaging apparatus may be unable to immediately perform imaging in accordance with the imaging command, or an image may be difficult to be used in the process (position estimation process) of (1), for example, when the captured image captured in accordance with the imaging command is a black image. For example, when the second imaging apparatus is unable to immediately perform imaging as described above, the information processing apparatus 100 records a time at which the transportation on the second imaging apparatus side is determined to be changed as illustrated in FIG. 21B. For example, when the transportation in the second imaging apparatus is determined to be changed, the recording of the time may be performed in the second imaging apparatus.

Further, when it is possible to track the second imaging apparatus (or subject) through the first captured image captured by the first imaging apparatus such as the security camera, the information processing apparatus 100 tracks the second imaging apparatus (or the subject). Further, when imaging is performed in the second imaging apparatus in accordance with the imaging command, the information processing apparatus 100 estimates the position of the second imaging apparatus (or the subject) by performing the process (position estimation process) of (1). Then, the information processing apparatus 100 estimates a place in which the time is recorded using the recorded time, tracking information, and the estimated position, and stores the position corresponding to the place in which the estimated time is recorded as the alighting position.

Further, the riding position can also be estimated by a process similar to the estimation of the alighting position.

When the riding position or the alighting position are estimated as described above, for example, the following be implemented. Further, the use case of using the estimated riding position or the alighting position will be described later.

- The user of the second imaging apparatus that has returned to a parking lot is guided to the alighting position.
- When the user gets on or off the vehicle, a positional relation between the vehicle and the second imaging apparatus (or the user serving as the subject) is detected, and the key of the vehicle is unlocked or locked automatically. Further, after the user of the second imaging apparatus is authenticated, the key of the vehicle may be unlocked and locked.

Figure 22:
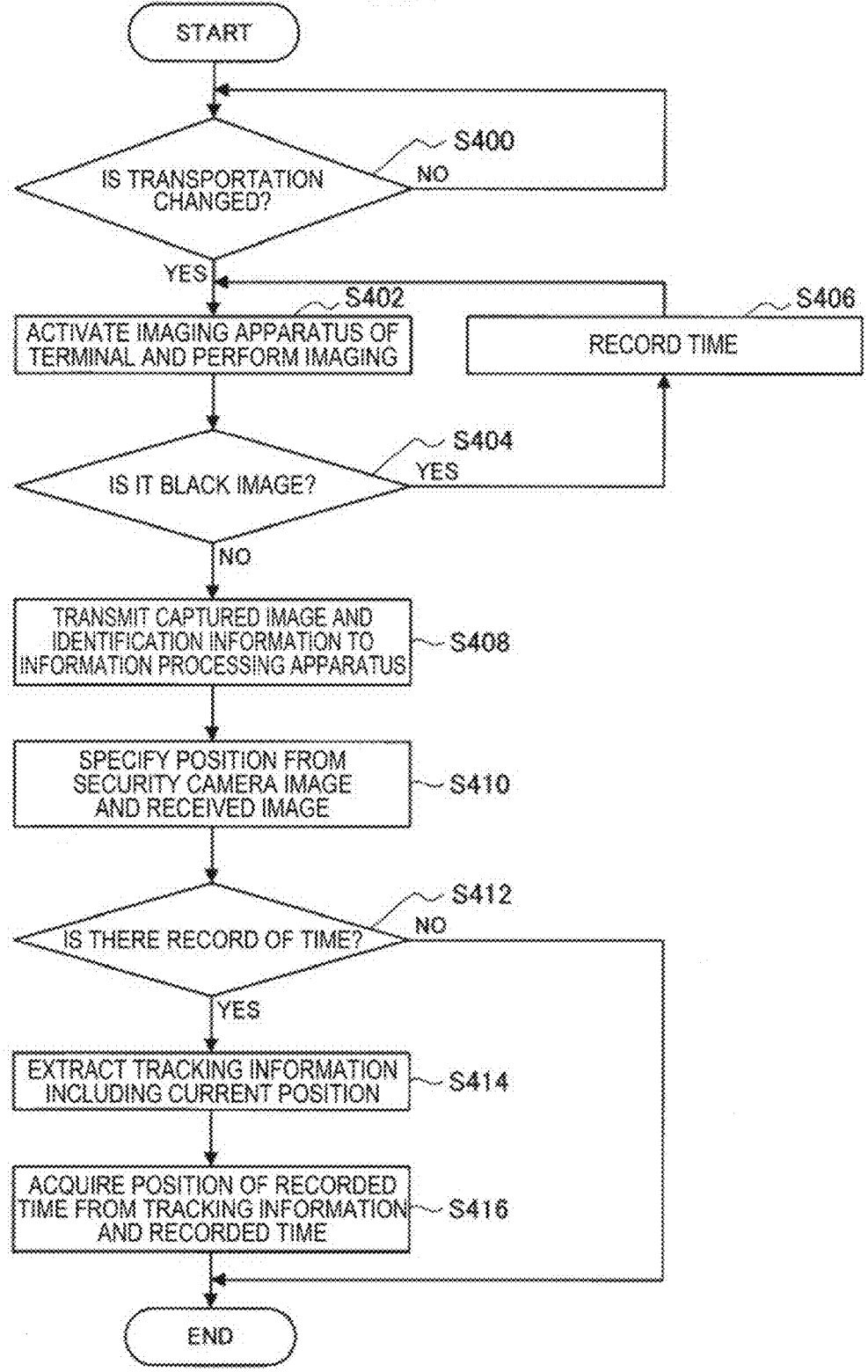
FIG. 22 is an explanatory diagram for describing a fourth example of a use case implemented by a process using an estimated position of a second imaging apparatus related to an information processing method according to the present embodiment.

FIG. 22 is an explanatory diagram for describing the fourth example of the use case implemented by the process using the estimated position of the second imaging apparatus according to the information processing method of the present embodiment, and illustrates an example of the process of the information processing system illustrated in FIG. 21B. FIG. 22 illustrates an example of the process when the processes such as the determination of the change in the transportation and the recording of the time are performed in the second imaging apparatus.

The second imaging apparatus determines whether or not the transportation is changed by a threshold value process based on the sensor information or the like (S400). When the transportation is determined not to be changed in step S400, the second imaging apparatus holds the process until the transportation is determined to be changed in step S400.

When the transportation is determined to be changed in step S400, the second imaging apparatus performs imaging using the imaging device (S402). When the imaging device is not in a state in which imaging is performed, the second imaging apparatus causes the imaging device to enter the state in which imaging is performed and then performs the imaging.

The second imaging apparatus determines whether or not the captured image is a black image (S404). For example, the second imaging apparatus determines that the image is a black image, for example, when no change in luminance is detected or when no object is detected from the captured image. It will be appreciated that a method of determining a black image is not limited to the above example.

When the captured image is determined to be a black image in step S404, the second imaging apparatus records the time (S406) and repeats the process starting from step S402.

When the captured image is determined not to be a black image in step S404, the second imaging apparatus transmits the captured image and the identification information to the information processing apparatus 100 (S408). Further, when the time is recorded in step S406, the second imaging apparatus also transmits information (data) indicating the recorded time together.

For example, when the captured image (the second captured image) transmitted in step S408 is acquired, the information processing apparatus 100 estimates the position of the second imaging apparatus through the process (position estimation process) of (1) (S410).

The information processing apparatus 100 determines whether or not the time is recorded (S412). For example, when the information indicating the time is acquired, the information processing apparatus 100 determines that the time is recorded.

Further, when the time is determined not be recorded in step S412, the information processing apparatus 100 estimates the position estimated in step S410 as the alighting position.

When the time is determined to be recorded in step S412, the information processing apparatus 100 specifies the tracking information indicating that the user arrives at the current position (the position estimated in step S410) (S414). When the tracking information is specified, the information processing apparatus 100 estimates the position in which the time is recorded using the tracking information and the time indicated by the time information, and estimates the estimated position as the alighting position.

In the information processing system, for example, when the process illustrated in FIG. 22 is performed, the estimation of the alighting position illustrated in FIG. 21B is implemented. Further, the estimation of the alighting position has been described above, but it is also possible to estimate the riding position through a similar process. It will be appreciated that the process related to the estimation of the riding position or the alighting position in the information processing system according to the present embodiment is not limited to the example illustrated in FIG. 22.

Figure 23:
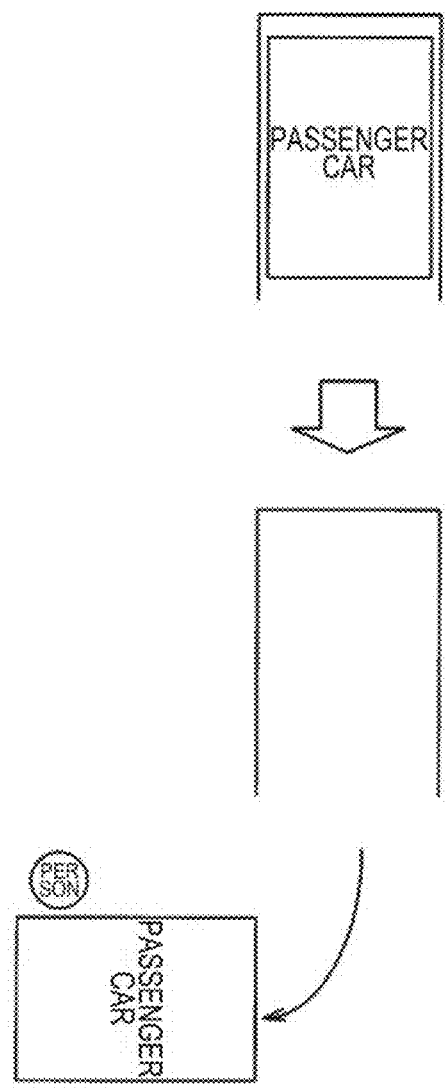
FIG. 23 is an explanatory diagram for describing a fourth example of a use case implemented by a process using an estimated position of a second imaging apparatus related to an information processing method according to the present embodiment.

FIG. 23 is an explanatory view for describing the fourth example of the use case implemented by the process using the estimated position of the second imaging apparatus according to the information processing method of the present embodiment, and illustrates an example of automatic pull-out from the parking lot using the estimated alighting position.

In the case in which the alighting position is estimated, when the user of the second imaging apparatus is associated with the vehicle, it is possible to specify the vehicle corresponding to the user of the second imaging apparatus returning to the parking lot from the estimated alighting position. Thus, for example, the vehicle is moved automatically in accordance with the guidance information or the like according to the present embodiment using an arbitrary automatic driving technique, and thus automatic pull-out of moving the vehicle in front of the user of the second imaging apparatus returning to the parking lot can be implemented.

Figure 24:
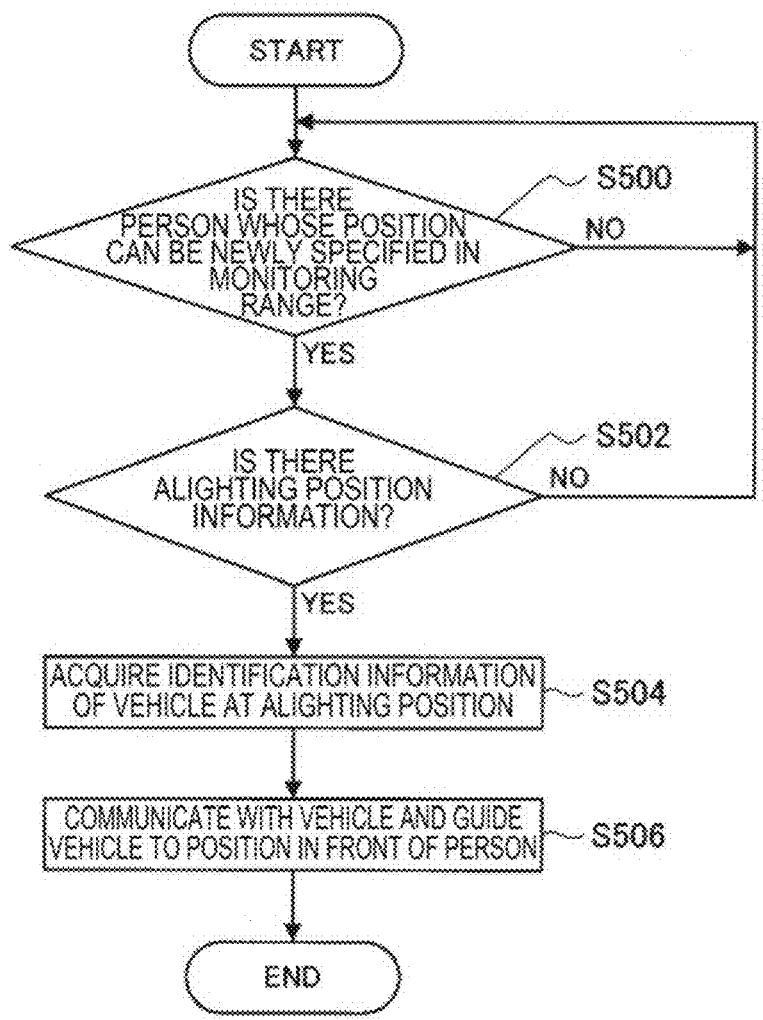
FIG. 24 is an explanatory diagram for describing a fourth example of a use case implemented by a process using an estimated position of a second imaging apparatus related to an information processing method according to the present embodiment.

FIG. 24 is an explanatory diagram for describing the fourth example of the use case implemented by the process using the estimated position of the second imaging apparatus according to the information processing method of the present embodiment, and illustrates an example of a process in the information processing apparatus 100 for implementing the automatic pull-out illustrated in FIG. 23.

For example, the information processing apparatus 100 determines whether or not there is a person serving as a subject whose position is newly estimated in a monitoring range (imaging range) of the security camera on the basis of the first captured image captured by the security camera installed in the parking lot (S500).

When it is determined in step S500 that there is no person whose position is newly estimated, the information processing apparatus 100 holds the process until it is determined in step S500 that there is a person serving as a subject whose position is newly estimated.

When it is determined in step S500 that there is a person who is a subject whose position is newly estimated, the information processing apparatus 100 determines whether or not there is alighting position information indicating the alighting position corresponding to the person (S502). For example, the information processing apparatus 100 authenticates the person determined in step S500 through face authentication or the like, and determines that there is alighting position information when the alighting position information associated with the authenticated person is stored in a recording medium such as a storage unit (which will be described later). A method of authenticating the person determined in step S500 is not limited to the above example. The information processing apparatus 100 can authenticate the person determined in step S500 using, for example, an identifier of the second imaging apparatus or another authentication information.

When it is determined in step S502, that there is no alighting position information, the information processing apparatus 100 repeats the process starting from step S500.

When it is determined in step S502 that there is alighting position information, the information processing apparatus 100 acquires identification information of the vehicle located at the alighting position indicated by the alighting position information (S504). For example, the information processing apparatus 100 acquires the identification information of the vehicle located at the alighting position on the basis of a table (or a database) in which the alighting position is associated with the identification information and the alighting position information.

For example, the information processing apparatus 100 pulls the vehicle corresponding to the identification information acquired in step S504 outs by transmitting the guidance information for guiding the vehicle to the position at which the person determined in the step S500 is located (S506).

In the information processing apparatus 100, for example, the automatic pull-out as illustrated in FIG. 23 is implemented by performing the process illustrated in FIG. 24. It will be appreciated that the process for implementing the automatic pull-out illustrated in FIG. 23 is not limited to the process illustrated in FIG. 24.

Figure 25A:
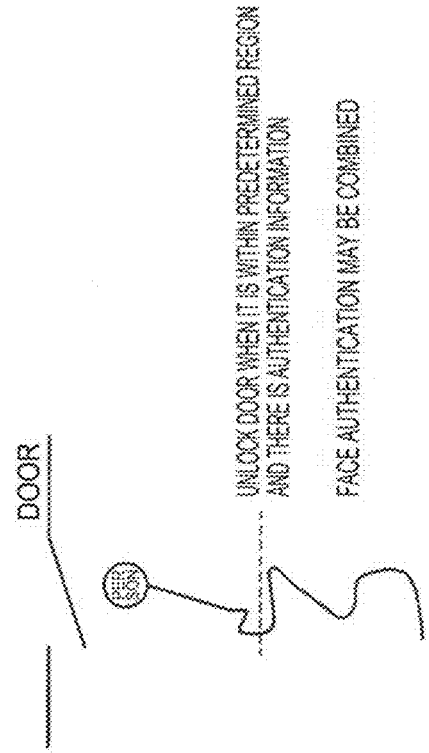
FIGS. 25A and 25B are explanatory diagrams for describing a fifth example of a use case implemented by a process using an estimated position of a second imaging apparatus related to an information processing method according to the present embodiment.
Figure 25B:
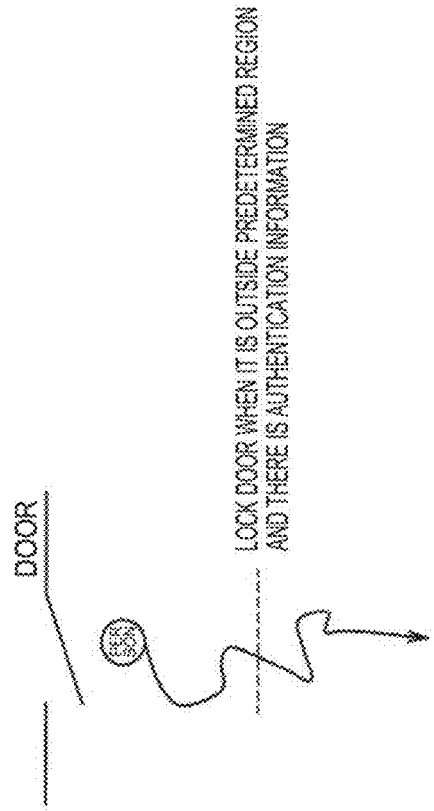

(4-5) Fifth Example of Use Case: Use Case Related to Automatic Locking and Unlocking of Key FIGS. 25A and 25B is are explanatory diagrams for describing a fifth example of a use case implemented by the process using the estimated position of the second imaging apparatus according to the present embodiment according to the information processing method. FIGS. 25A and 25B illustrate an example of the use case in which the information processing apparatus 100 controls automatic locking and unlocking of a key of the door using the position estimated through the process (position estimation process) of (1).

For example, the information processing apparatus 100 acquires the position of the second imaging apparatus through the process (position estimation process) of (1), and acquires locked state information (data) indicating a locked state from a server that manages the locked state of the door or the like. The information processing apparatus 100 can undertake the role of the server that manages the locked state of the door.

As illustrated in FIG. 25A, when the key is in the unlocked state, and the position of the second imaging apparatus (the position of the user of the second imaging apparatus) is out of a set predetermined region, the information processing apparatus 100 locks the key of the door by transmitting a locking command for locking the key of the door to the server that manages the locked state of the door or the like. Further, the information processing apparatus 100 may authenticate the user of the second imaging apparatus through face authentication or the like and lock the key of the door when the authentication is normally completed.

Further, as illustrated in FIG. 25B, when the key is in the locked state, and the position of the second imaging apparatus (the position of the user of the second imaging apparatus) is within a set predetermined region, the information processing apparatus 100 unlocks the key of the door by transmitting an unlocking command for unlocking the key of the door to the door or the server that manages the locked state of the door. Further, the information processing apparatus 100 may authenticate the user of the second imaging apparatus through face authentication or the like and unlock the key of the door when the authentication is normally completed.

Figure 26:
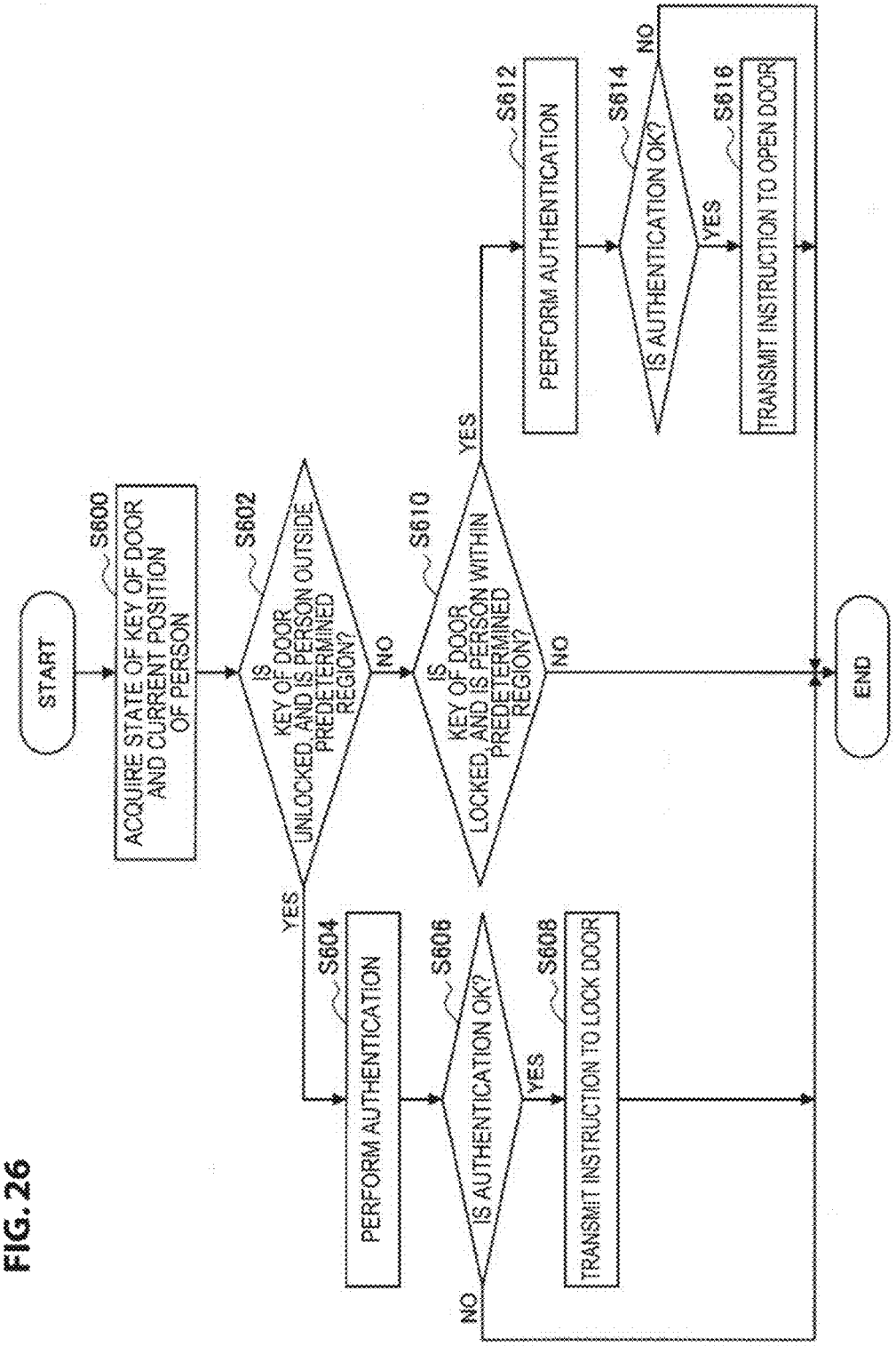
FIG. 26 is an explanatory diagram for describing a fifth example of a use case implemented by a process using an estimated position of a second imaging apparatus related to an information processing method according to the present embodiment.

FIG. 26 explanatory diagram for describing the fifth example of the use case implemented by the process using the estimated position of the second imaging apparatus according to the information processing method of the present embodiment, and illustrates an example of the process in the information processing apparatus 100 for implementing automatic locking and unlocking of the key illustrated in FIGS. 25A and 25B.

For example, the information processing apparatus 100 acquires the locked state information and the position of the second imaging apparatus (S600).

In step S602, the information processing apparatus 100 determines whether or not the key is in the unlocked state, and of the position of the second imaging apparatus (the position of the user of the second imaging apparatus) is outside a set predetermined region.

When it is determined in step S602 that the key is in the unlocked state, and the position of the second imaging apparatus (the position of the user of the second imaging apparatus) is outside the set predetermined region, the information processing apparatus 100 performs authentication of the user of the second imaging apparatus (S604). The information processing apparatus 100 may authenticate the user through face authentication or the like or may authenticate the user in accordance with authentication information (for example, an ID and a password or data that can be used for authentication such as biometric information) transmitted from the second imaging apparatus.

The information processing apparatus 100 determines whether or not the authentication in step S604 is normally completed (S606).

When the authentication is determined not to be normally completed in step S604, the information processing apparatus 100 ends the process.

Further, when the authentication is determined to be normally completed in step S604, the information processing apparatus 100 locks the key of the door by transmitting the locking command to the door or the like (S608).

When it is not determined in step S602 that the key is in the unlocked state, and the position of the second imaging apparatus (the position of the user of the second imaging apparatus) is outside a set predetermined region, the information processing apparatus 100 determines whether or not the key is in a locked state, and the position of the second imaging apparatus (the position of the user of the second imaging apparatus) is within a set predetermined region (S610).

When it is not determined in step S610 that the key is in the locked state, and the position of the second imaging apparatus (the position of the user of the second imaging apparatus) is within a set predetermined region, the information processing apparatus 100 ends the process.

When it is determined in step S610 that the key is in the locked state, and the position of the second imaging apparatus (the position of the user of the second imaging apparatus) is within the set predetermined region, the information processing apparatus 100 authenticates the user of the second imaging apparatus, similarly to step S604 (S612).

The information processing apparatus 100 determines whether or not the authentication in step S604 is normally completed (S614).

When the authentication is determined not to be normally completed in step S612, the information processing apparatus 100 ends the process.

When the authentication is determined to be normally completed in step S612, the information processing apparatus 100 unlocks the key of the door by transmitting the unlocking command to the door or the like (S616).

In the information processing apparatus 100, for example, automatic locking and unlocking of keys illustrated in FIGS. 25A and 25B is implemented, for example, by performing the process illustrated in FIG. 26. It will be appreciated that the process illustrated in FIGS. 25A and 25B for implementing the automatic locking and unlocking of the key is not limited to the process illustrated in FIG. 26.

(4-6) Sixth Example of Use Case: Use Case Related to Control of Signal

Figure 27:
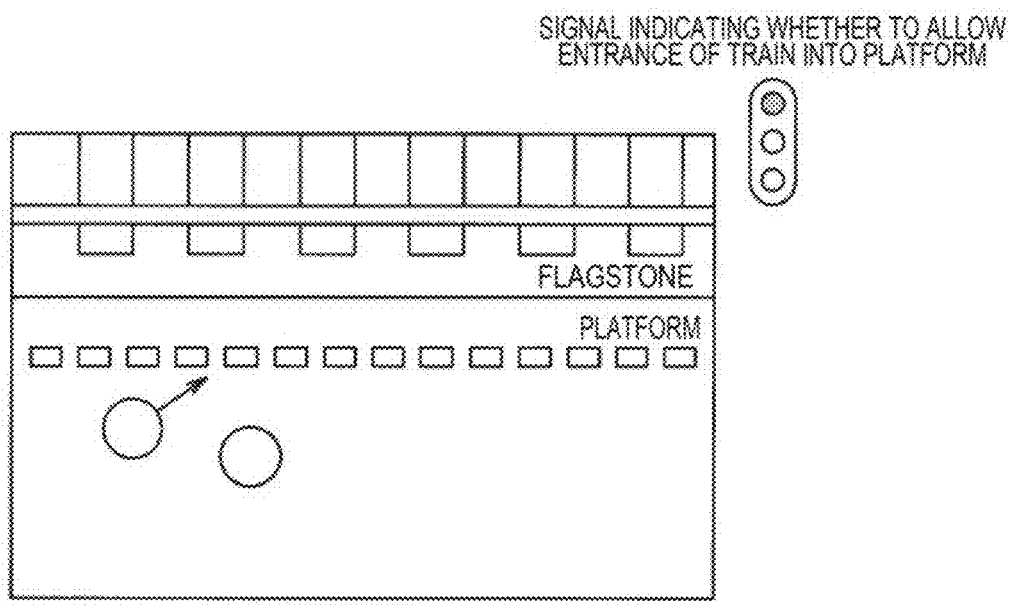
FIG. 27 is an explanatory diagram for describing a sixth example of a use case implemented by a process using an estimated position of a second imaging apparatus related to an information processing method according to the present embodiment.

FIG. 27 is an explanatory diagram for describing a sixth example of the use case implemented by the process using the estimated position of the second imaging apparatus according to the information processing method of the present embodiment. FIG. 27 illustrates an example of the use case related to control of a railway signal related to entrance of a train into the platform and departure of a train from the platform in a railroad.

In the use case illustrated in FIG. 27, for example, the information processing apparatus 100 guides the user of the second imaging apparatus in accordance with the guidance information described in (4-2), and controls the railway signal on the basis of the position of the second imaging apparatus estimated through the process (position estimation process) of (1). For example, in the use case illustrated in FIG. 27, physical injuries are prevented by delivering the guidance information to the second imaging apparatuses of the passengers not to go to the edge of the platform and changing the railway signal to red (a state indicating that entrance is not permitted or that departure is not permitted).

Figure 28:
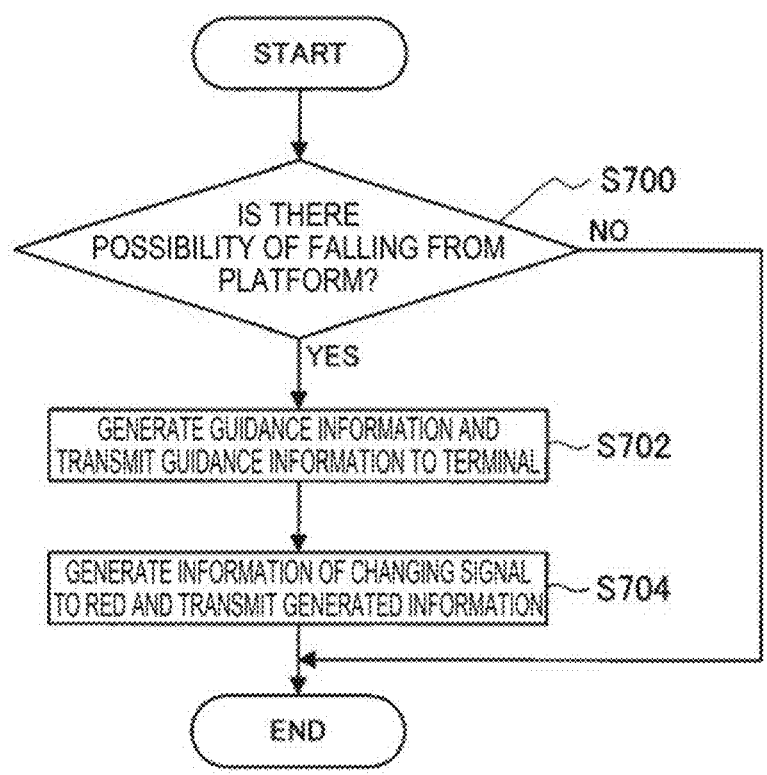
FIG. 28 is an explanatory diagram for describing a sixth example of a use case implemented by a process using an estimated position of a second imaging apparatus related to an information processing method according to the present embodiment.

FIG. 28 is an explanatory diagram for describing the sixth example of the use case implemented by the process using the estimated position of the second imaging apparatus according to the information processing method of the present embodiment, and illustrates an example of the process in the information processing apparatus 100 for implementing the use case illustrated in FIG. 27. The process illustrated in FIG. 28 is performed, for example, before the signal of the railroad is changed to blue (a state indicating that entrance is permitted or departure is permitted).

The information processing apparatus 100 determines whether or not there is a possibility of the passenger (the user of the second imaging apparatus) falling from the platform or touching the train (S700). The information processing apparatus 100 performs the determination in step S700 on the basis of, for example, the position of the second imaging apparatus estimated through the process (position estimation process) of (1).

When it is determined in step S700 that there is no possibility of falling from the platform or the like, the information processing apparatus 100 ends the process.

When it is determined in step S700 that there is a possibility of falling from the platform or the like, for example, the information processing apparatus 100 generates the guidance information described in (4-2) and transmits the guidance information to the second imaging apparatus (S702). Further, for example, the information processing apparatus 100 generates information for changing the railway signal to red, and transmits the generated information to a server that manages the state of the signal or the like (S704).

In the information processing apparatus 100, for example, the use case illustrated in FIG. 27 is implemented, for example, by performing the process illustrated in FIG. 28. It will be appreciated that the process of implementing the use case illustrated in FIG. 27 is not limited to the process illustrated in FIG. 28.

Figure 29:
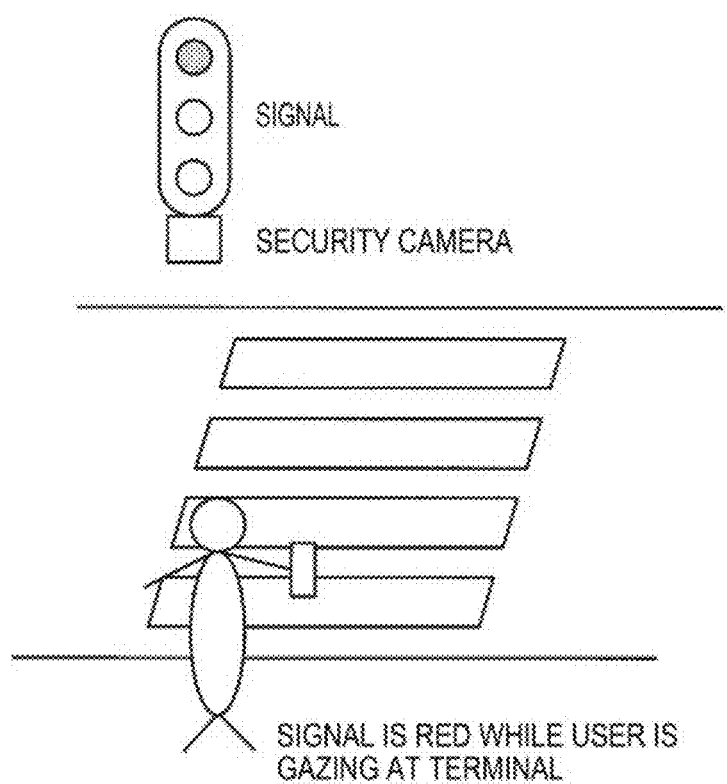
FIG. 29 is an explanatory diagram for describing a sixth example of a use case implemented by a process using an estimated position of a second imaging apparatus related to an information processing method according to the present embodiment.

FIG. 29 is an explanatory diagram for describing the sixth example of the use case implemented by the process using the estimated position of the second imaging apparatus according to the information processing method of the present embodiment. FIG. 29 illustrates an example of the use case related to control of a road signal.

In the use case illustrated in FIG. 29, before the road signal is changed to blue (a state in which passage is permitted), imaging is performed by a terminal on a moving side (corresponding to, for example, the second imaging apparatus. The same applies hereinafter), and after it is confirmed that the user of the terminal is not gazing at the terminal, the signal of the road is changed to blue. In the use case illustrated in FIG. 29, for example, it is possible to prevent the user of the terminal from driving or walking while looking at the terminal.

Figure 30:
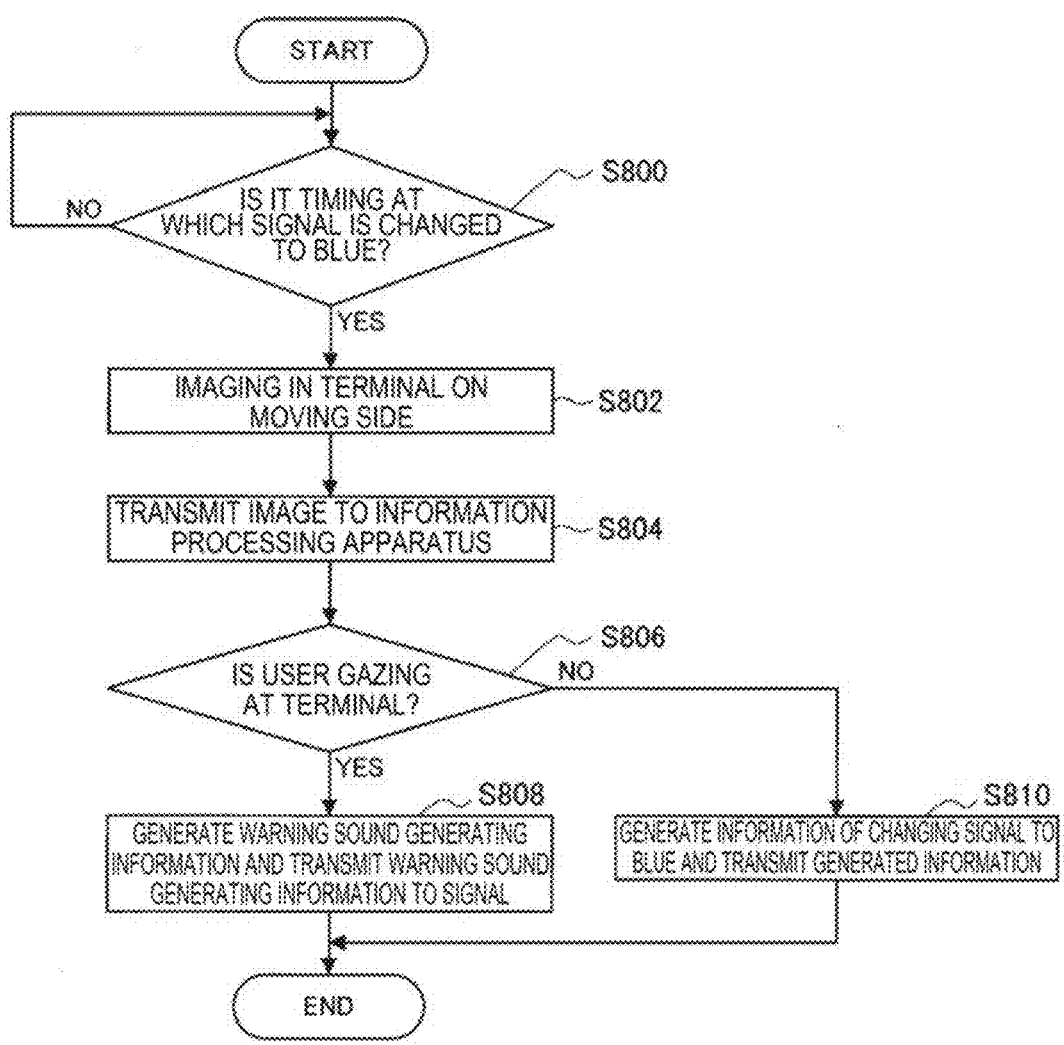
FIG. 30 is an explanatory diagram for describing a sixth example of a use case implemented by a process using an estimated position of a second imaging apparatus related to an information processing method according to the present embodiment.

FIG. 30 is an explanatory diagram for describing the sixth example of the use case implemented by the process using the estimated position of the second imaging apparatus according to the information processing method of the present embodiment, and illustrates an example of the process in the information processing system for implementing the use case.

The information processing apparatus 100 determines whether or not it is a timing at which the signal is changed to blue (S800). When it is determined not to be a timing at which the signal is changed to blue in step S800, the information processing apparatus 100 holds the process until it is determined to be a timing at which the signal is changed to blue.

When it is determined to be a timing at which the signal is changed to blue in step S800, the information processing apparatus 100 causes the terminal on the moving side (the second imaging apparatus) to perform imaging (S802). For example, the information processing apparatus 100 specifies the terminal on the moving side on the basis of a position of the terminal estimated through the process (position estimation process) of (1) using a captured image of a security camera (the first imaging apparatus) installed on the road.

The terminal that has performed the imaging transmits the captured image to the information processing apparatus 100 (S804).

The information processing apparatus 100 analyzes the captured image transmitted in step S804 and determines whether or not the user of the terminal is gazing at the terminal (S806). For example, the information processing apparatus 100 determines the presence or absence of gaze by estimating a line of sight direction of the user from the captured image.

When the user is determined to be gazing at the terminal in step S806, the information processing apparatus 100 generates warning sound generation information (data) for outputting a warning sound for the action of the user gazing at the terminal, and transmits the generated warning sound generation information to the road signal or a server that controls the road signal or the like (S808). Further, for example, the information processing apparatus 100 may transmit information for changing the signal to red (a state in which passage is not permitted) to the road signal or the server that controls the road signal or the like.

Further, when the user is determined not to be gazing at the terminal in step S806, for example, the information processing apparatus 100 transmits information for changing the signal to blue (the state in which passage is permitted) to the road signal or the server that controls the road signal or the like (S810).

In the information processing apparatus 100, for example, the use case illustrated in FIG. 29 is implemented, for example, by performing the process illustrated in FIG. 30. It will be appreciated that the process of implementing the use case illustrated in FIG. 29 is not limited to the process illustrated in FIG. 30.

Here, it is difficult to implement a similar use case using the captured image of the security camera installed on the road because it is difficult to determine a direction of a line of sight of a pedestrian or a driver. On the other hand, for example, in the process illustrated in FIG. 30, since it is determined whether or not the action of the user gazing at the terminal using the captured image of the terminal, it is possible to more easily determine the action of the user gazing at the terminal. Further, for example, when the process illustrated in FIG. 30 is performed, if the action of the user gazing at the terminal is not stopped, the signal of the road is not changed to blue, the effect of preventing the action of the user gazing at the terminal can be increased.

In the use case illustrated in FIG. 29, the action of the user gazing at the terminal at the timing at which the road signal is changed from red to blue is detected, but the use case according to the present embodiment is not limited to the above example. For example, the detection of the action of the user gazing at the terminal may be performed on a vehicle passing in a state in which the signal is blue, and the action of the user gazing at the terminal is detected, the information processing apparatus 100 may deliver information (data) for controlling the state of the signal so that a next signal is changed to red at a point in time at which the vehicle arrives at a position at which it stops safely in the next signal.

Figure 31:
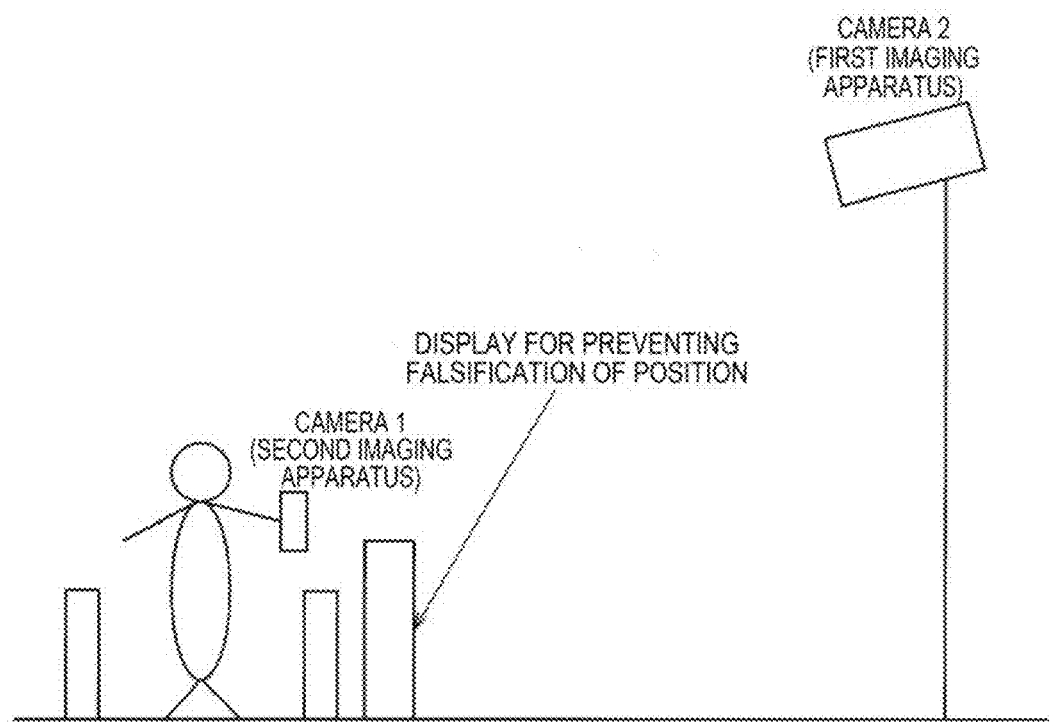
FIG. 31 is an explanatory diagram for describing a seventh example of a use case implemented by a process using an estimated position of a second imaging apparatus related to an information processing method according to the present embodiment.

(4-7) Seventh Example of Use Case: Use Case Related to Entrance/Exit Management FIG. 31 is an explanatory diagram for describing a seventh example of the use case implemented by the process using the estimated position of the second imaging apparatus according to the information processing method of the present embodiment. FIG. 31 illustrates an example of the use case related to entrance/exit management such as entrance and exit at a gate such as a ticket gate or a toll gate or management of admission and charging.

The information processing apparatus 100 can estimate the position of a camera 1 (the second imaging apparatus) through the process (position estimation process) of (1).

Further, the information processing apparatus 100 controls opening and closing of a gate corresponding to an estimated position by performing an authentication process using entrance/exit authority information (data) indicating entrance/exit authority acquired from the camera 1 or a payment process using payment information (data) that can be used for payment of an electronic value acquired from the camera 1 (data having a value equivalent to a money or a currency). As described above, when opening and closing of the gate is controlled using the estimated position, the user of the camera 1 can enter or exit through the gate without performing an operation related to entrance/exit such as an operation of swiping a card or a ticket.

Further, the authentication process, the payment process, or the like may be started when the camera 1 is positioned within a set predetermined range from the gate. As described above, if the authentication processing or the like is started when the camera 1 is positioned within a set predetermined range from the gate, even when it takes time to perform the authentication processing or the like, since a possibility of the user waiting in front of the gate is reduced, it is possible to improve the convenience of the user.

Further, in the process according to the information processing method of the present embodiment, it is possible to track the subject as described above. Therefore, in the case of the use case of the ticket gate, when the user of the camera 1 serving as the subject is tracked, for example, it is possible to specify a movement path from the ticket gate to the ticket gate, and thus it is also possible to detect unauthorized riding.

Further, since the position of the camera 1 is estimated through the process (position estimation process) of (1) according to the information processing method of the present embodiment, for example, it is possible to implement giving of points to point cards, payments by credit cards, cash cards, electronic values, or the like, checking of tickets, passenger tickets, registration cards, parking tickets, and certificates (passports, residence cards, licenses, or insurance card), and the like.

When a process in which it is highly necessary to prevent a fraud such as a payment process or various checking processes is performed, a display device whose display on a display screen changes over time may be installed at a place corresponding to a gate as illustrated in FIG. 31. For example, when the display screen of the display device is detected from the captured image of the camera 1 (the second captured image), the information processing apparatus 100 performs position estimation, a payment process, and the like through the process (position estimation process) of (1). Accordingly, for example, it is possible to more reliably prevent falsification of a position by a malicious user.

Here, the imaging of the display screen of the display device by the camera 1 may be performed such that the information processing apparatus 100 causes the camera 1 to give a notification for instructing the user of the camera to image the display device. Further, the information processing apparatus 100 may transmit the imaging command to the camera 1 twice or more and detects the display screen of the display device from the captured image of the camera 1 (the second captured image) using the captured images which are captured twice or more.

FIG. 32 is an explanatory diagram for describing the seventh example of the use case implemented by the process using the estimated position of the second imaging apparatus according to the information processing method of the present embodiment, and illustrates an example of the process in the information processing system for implementing the use case illustrated in FIG. 31. In FIG. 32, the second imaging apparatus corresponding to the camera 1 illustrated in FIG. 31 is denoted as a "terminal."

The information processing apparatus 100 determines whether or not the terminal is within a predetermined range on the basis of the position estimated through the process (position estimation process) of (1) (S900). When the terminal is determined not to be within a predetermined range in step S900, the information processing apparatus 100 holds the process until the terminal is determined to be within the predetermined range.

When the terminal is determined to be within a predetermined range in step S900, the terminal determines whether or not the information processing apparatus 100 is an authorized device (S902). The terminal determines that the information processing apparatus 100 is an authorized device when authentication using an encryption key or the like is normally completed between the information processing apparatus 100 and the terminal.

When the information processing apparatus 100 is determined not to be an authorized device in step S902, the terminal holds the process, and in the information processing system, the process starting from step S900 is performed again.

When the information processing apparatus 100 is determined to be an authorized device in step S902, the terminal transmits entrance/exit authority information and the payment information to the information processing apparatus 100 (S904).

The information processing apparatus 100 performs the authentication process or the payment process using the entrance/exit authority information or the like transmitted in step S904, determines whether or not entrance/exit is possible, and opens or closes the gate when entrance/exit is determined to be possible (S906). The information processing apparatus 100 opens or closes the gate by, for example, transmitting a control signal for controlling the opening and closing of the gate to the gate.

In the information processing system, for example, the use case illustrated in FIG. 31 is implemented, for example, by performing the process illustrated in FIG. 32. It will be appreciated that the process of implementing the use case illustrated in FIG. 31 is not limited to the process illustrated in FIG. 32.

[5] Example of Method of Displaying Information Transmitted Through Process (Information Transmission Control Process) of (2) According to Information Processing Method of Present Embodiment Next, an example of a method of displaying information transmitted according to the process (information transmission control process) of (2) will be described.

FIGS. 33A(A), 33A(B), 33A(C), 33A(D), 33A(E), 33A(F), 33A(G), 33A(H), 33A(I), 33A(J), 33A(K), 33A(L), 33A(M), 33A(N), 33A(O), 33A(P), 33A(Q), 33A(R), 33A(S), 33A(T), 33A(U), 33B(A), 33B(B), 33B(C), 33B(D), 33B(E) 33B(F), 33C(A), 33C(B), 33C(C) 33C(D), 33D(A), 33D(B), 33E(A), and 33E(B) are explanatory diagrams illustrating an example of a method of displaying information transmitted through the information transmission control process according to the information processing method of the present embodiment. Each of the drawings illustrated in FIGS. 33A(A), 33A(B), 33A(C), 33A(D), 33A(E), 33A(F), 33A(G), 33A(H), 33A(I), 33A(J), 33A(K), 33A(L), 33A(M), 33A(N), 33A(O), 33A(P), 33A(Q), 33A(R), 33A(S), 33A(T), 33A(U), 33B(A), 33B(B), 33B(C), 33B(D), 33B(E) 33B(F), 33C(A), 33C(B), 33C(C) 33C(D), 33D(A), 33D(B), 33E(A), and 33E(B) illustrate an example of a display screen of the second imaging apparatus or a display screen of an external display device connected to the second imaging apparatus.

FIGS. 33A(A), 33A(B), 33A(C), 33A(D), 33A(E), 33A(F), 33A(G), 33A(H), 33A(I), 33A(J), 33A(K), 33A(L), 33A(M), 33A(N), 33A(O), 33A(P), 33A(Q), 33A(R), 33A(S), 33A(T), and 33A(U) illustrate an example of a display on the display screen based on information transmitted through the process (information transmission control process) of (2) according to the information processing method of the present embodiment, and illustrates a display example for stopping it or reducing a moving speed.

For example, when there is an obstacle ahead of the second imaging apparatus (for example, a direction corresponding to the moving direction of the second imaging apparatus), an originally displayed image may be moved to a lower side of the display screen (FIG. 33A(A)), scaled down (FIG. 33A(B)), or folded (FIG. 33A(C)) as illustrated in FIGS. 33A(A), 33A(B), and 33A(C). Further, in the above example, as illustrated in FIGS. 33A(D), 33A(E), and 33A(F), the originally displayed image may be wound up to the lower side of the display screen (FIG. 33A(D)) or partially reduced (FIG. 33A(E)), partially folded (FIG. 33A(F)). For example, when the displays illustrated in FIGS. 33A(A), 33A(B), 33A(C), 33A(D), 33A(E), and 33A(F) are performed through the information transmitted through the process (information transmission control process) of (2), the user of the second imaging apparatus can notice the presence of an obstacle ahead the user while viewing the display screen.

Further, for example, when the displays illustrated in FIGS. 33A(A) 33A(B), 33A(C), 33A(D), 33A(E), and 33A(F) are performed, the following displays may be performed in a vacant area of the display screen.

Display of electric to electric (EE) picture (FIGS. 33A(G) and 33A(H))

Display of warning (FIG. 33A(I))

Display of cause (FIG. 33A(J))

Black display for reducing power consumption (FIG. 33A(K))

Display of an originally displayed image with a changed color (FIG. 33A(L))

Further, for example, when the displays illustrated in FIGS. 33A(A) 33A(B), 33A(C), 33A(D), 33A(E), and 33A (F) are performed, an advertisement may be displayed in the empty area of the display screen as illustrated in FIGS. 33A(M) 33A(N), 33A(O), 33A(P), 33A(Q), and 33A(R). Content of the advertisement may be fixed or may change periodically or non-periodically.

FIGS. 33 A(A), 33A(B), 33A(C), 33A(D), 33A(E), 33A (F), 33A(G), 33A(H), 33A(I), 33A(J), 33A(K), 33A(L), 33A(M), 33A(N), 33A(O), 33A(P), 33A(Q), and 33A(R) illustrate the display examples when there is an obstacle ahead of the second imaging apparatus, but the method of displaying the information transmitted through the process (information transmission control process) of (2) is not limited to the above example.

For example, as illustrated in FIGS. 33A(S), 33A(T), and 33A(U) the originally displayed image may be displayed at different positions of the display screen. FIG. 33A(S) illustrates a display example when the user of the second imaging apparatus moves to the right side in a moving direction, and FIG. 33A(T) illustrates a display example in which the user of the second imaging apparatus stops or reduces the speed while moving to the right side in the moving direction. Further, FIG. 33A(U) illustrates a display example in which an object (a person or the like) in front of the user of the second imaging apparatus is followed.

FIGS. 33B(A), 33B(B), 33B(C), 33B(D), 33B(E), and 33B(F) illustrate another example of the display on the display screen based on the information transmitted through the process (information transmission control process) of (2) according to the information processing method of the present embodiment.

When the display based on the information transmitted through the process (information transmission control process) of (2) is performed, the following display or notification may be performed as illustrated in FIGS. 33B(A), 33B(B), 33B(C), 33B(D), 33B(E), and 33B(F).

Brightness is changed (FIG. 33B(A))
A color is changed (FIG. 33B(B))
A sound is output together (FIG. 33B(C))
The display screen is vibrated (FIG. 33B(D))
A character (including a character string. The same applies hereinafter) or a color is displayed on a part of the display screen (FIG. 33B(E))
Subtitles are displayed (characters related to subtitles may be scrolled) (FIG. 33B(F))

FIGS. 33C(A), 33C(B), 33C(C), and 33C(D) illustrate another example of the display on the display screen based on the information transmitted by the process (information transmission control process) of (2) according to the information processing method of the present embodiment, and illustrates an example of a scroll display when subtitles are displayed as illustrated in FIG. 33B(F). For example, the scroll display may be the following examples.

A position at which characters related to subtitles are displayed is fixed, and the characters are scrolled (FIGS. 33C(A) and 33C(B))
A position at which characters related to subtitles are displayed is shifted in a horizontal direction or a vertical direction of the display screen (FIGS. 33C(C) and 33C(D))

Further, the scroll display according to the present embodiment is not limited to the above example but may be a display in which the above scroll display is combined. Further, a display position of characters related to subtitles or a direction in which characters are shifted may coincide with a direction in which the user of the second imaging apparatus is avoided.

FIGS. 33D(A) and 33D(B) illustrate an example of the display on the display screen based on the information transmitted through the process (information transmission control process) of (2) according to the information processing method of the present embodiment, and illustrates an example of a display indicating whether guidance based on the guidance information is performed.

When the display for the guidance based on the guidance information is performed, the display of the display screen changes in accordance with the guidance content, for example, as illustrated by FIG. 33D(A). Further, a method of changing the display of the display screen is not limited to the example illustrated in FIG. 33D(A), but for example, the display methods described above with reference to FIGS. 33A(A), 33A(B), 33A(C), 33A(D), 33A(E), 33A(F), 33A (G), 33A(H), 33A(I), 33A(J), 33A(K), 33A(L), 33A(M), 33A(N), 33A(O), 33A(P), 33A(Q), 33A(R), 33A(S), 33A (T), 33A(U), 33B(A), 33B(B), 33B(C), 33B(D), 33B(E), 33B(F), 33C(A), 33C(B), 33C(C), and 33C(D) may be used.

Further, when the display for the guidance based on the guidance information is not performed, for example, a frame is displayed on the display area as illustrated in FIG. 33D(B).

For example, when a frame is selectively displayed within the display area in accordance with whether or not the guidance based on the guidance information is performed as illustrated in FIGS. 33D(A) and 33D(B), it is possible to give an explicit indicating of whether or not the guidance based on the guidance information is performed to the user of the second imaging apparatus.

Further, the display indicating whether or not the guidance based on the guidance information is performed is not limited to the example illustrated in FIGS. 33D(A) and 33D(B). FIGS. 33E(A) and 33E(B) illustrate an example of the display on the display screen based on the information transmitted through the process (information transmission control process) of (2) according to the information processing method of the present embodiment, and illustrates another example of the display indicating whether or not the guidance based on the guidance information is performed.

For example, when the display for the guidance based on the guidance information is performed, the frame may be displayed on the display area as illustrated in A of FIG. 33E(A), and when the display for the guidance based on the guidance information is not performed, the frame may not be displayed on the display area as illustrated in FIG. 33E(B). Even when the displays illustrated in FIGS. 33E(A) and 33E(B) are performed, it is possible to give an explicit indication of whether or not the guidance based on the guidance information is performed to the user of the second imaging apparatus.

The method of displaying the information transmitted through the process (information transmission control process) of (2) may be the examples illustrated in FIGS. 33A(A), 33A(B), 33A(C), 33A(D), 33A(E), 33A(F), 33A (G), 33A(H), 33A(I), 33A(J), 33A(K), 33A(L), 33A(M), 33A(N), 33A(O), 33A(P), 33A(Q), 33A(R), 33A(S), 33A (T), 33A(U) and 33B(A), 33B(B), 33B(C), 33B(D), 33B(E) 33B(F) and 33C(A), 33C(B), 33C(C) 33C(D) and 33D(A), 33D(B), 33E(A), and 33E(B). Further, the method of displaying the information transmitted through the process (information transmission control process) of (2) is not limited to the above examples. For example, even when the user of the second imaging apparatus is paying attention to a specific area of the display screen, content of the information transmitted through the process (information transmission control process) of (2) may be displayed on the display screen in accordance with an arbitrary method of enabling the user to notice it.

Information Processing System According to Present Embodiment

Next, an example of a configuration of each of the devices in the information processing system according to the present embodiment including the information processing apparatus according to the present embodiment capable of performing the process according to the information processing method of the present embodiment will be described. The following description will proceed with an example in which the information processing system according to the present embodiment is the information processing system 1000 illustrated in FIG. 1.

[I] Information Processing Apparatus 100

Figure 34:
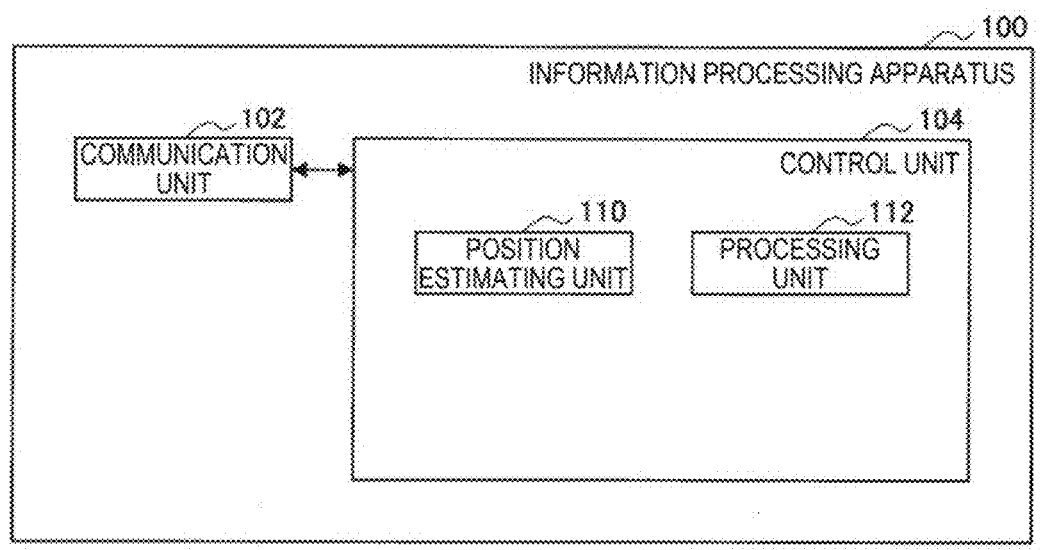
FIG. 34 is a block diagram illustrating an example of a configuration of an information processing apparatus according to the present embodiment.

FIG. 34 is a block diagram showing an example of the configuration of an information processing apparatus 100 according to the present embodiment. The information processing apparatus 100 includes a communication unit 102 and a control unit 104, for example.

The information processing apparatus 100 may include a read-only memory (ROM, not illustrated), a random access memory (RAM, not illustrated), a storage unit (not illustrated), an operation unit that the user can operate (not illustrated), a display unit that displays various screens on a display screen (not illustrated), etc., for example. The information processing apparatus 100 connects the components mentioned above by means of a bus as a data transfer path, for example.

The ROM (not illustrated) stores control data such as a program and operation parameters used by the control unit 104. The RAM (not illustrated) temporarily stores a program and the like executed by the control unit 104.

A storage unit (not illustrated) is a storage unit with which the information processing apparatus 100 is equipped, and stores, for example, data related to the information processing method of the present embodiment such as the first captured image, the second captured image, and the data used for the process (position estimation process) of (1) and various data such as various kinds of applications. Here, examples of the storage unit (not illustrated) include a magnetic recording medium such as a hard disk and a non-volatile memory such as a flash memory. Further, the storage unit (not illustrated) may be removable from the information processing apparatus 100.

Examples of the operation unit (not illustrated) include an operation input device described later, and examples of the display unit (not illustrated) include a display device described later.

[Example of Hardware Configuration of Information Processing Apparatus 100]

Figure 35:
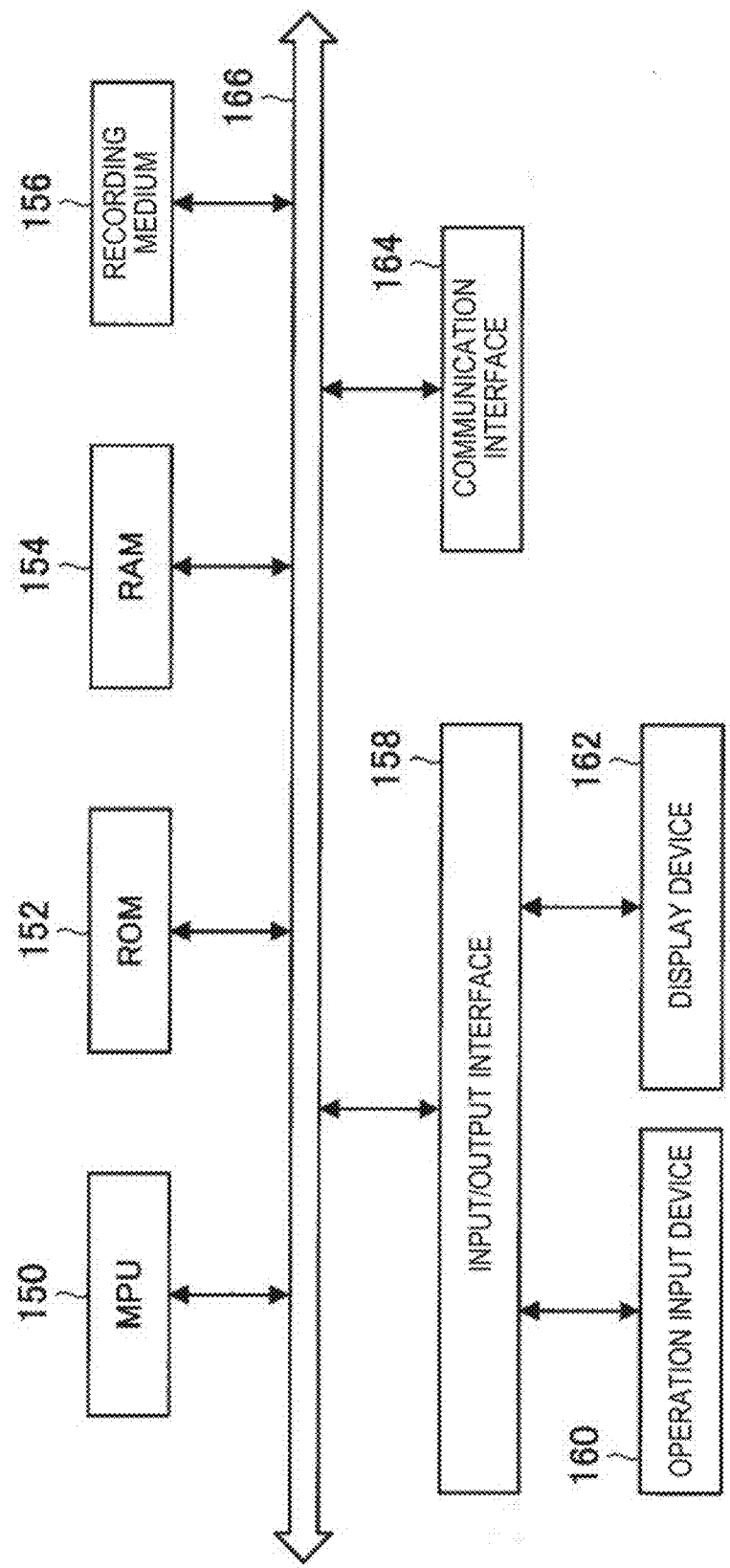
FIG. 35 is an explanatory diagram illustrating an example of a hardware configuration of an information processing apparatus according to the present embodiment.

FIG. 35 is an explanatory diagram of an example of the hardware configuration of the information processing apparatus 100 according to the present embodiment. For example, the information processing apparatus 100 includes an MPU 150, a ROM 152, a RAM 154, a recording medium 156, an input/output interface 158, an operation input device 160, a display device 162 and a communication interface 164. In addition, the information processing apparatus 100, for example, connects the respective components using a bus 166 serving as a data transfer path.

The MPU 150 functions as, for example, one or two or more processors configured of an arithmetic circuit such as a micro-processing unit (MPU), and the control unit 104 that is configured of various processing circuits etc. and controls the entire information processing apparatus 100. In the information processing apparatus 100, the MPU 150 also functions as, for example, a position estimating unit 110 and a processing unit 112 to be described later. Further, either or both of the position estimating unit 110 and the processing unit 112 may be constituted by a dedicated (or general-purpose) circuit capable of implementing the process of each unit.

The ROM 152 stores control data such as a program and operation parameters used by the MPU 150. The RAM 154 temporarily stores, for example, a program and the like executed by the MPU 150.

The recording medium 156 functions as a storage unit (not illustrated), and stores, for example, data related to the information processing method of the present embodiment such as the first captured image, the second captured image, and the data used for the process (position estimation process) of (1) and various data such as various kinds of applications. Here, a magnetic recording medium such as a hard disk and a nonvolatile memory such as a flash memory may be presented as examples of the recording medium 156. The storage unit (not illustrated) may be attachable to/detachable from the information processing apparatus 100.

The input/output interface 158 is connected to, for example, the operation input device 160 and the display device 162. The operation input device 160 functions as the operation unit (not illustrated) and the display device 162 functions as the display unit (not illustrated). Here, a universal serial bus (USB) terminal, a digital visual interface (DVI) terminal, a High-Definition Multimedia Interface (HDMI) (registered trademark) terminal and various processing circuits may be presented as examples of the input/output interface 158.

The operation input device 160 is included in the information processing apparatus 100 and connected to the input/output interface 158 inside the information processing apparatus 100. For example, a button, direction keys, a rotary type selector such as a jog dial or a combination thereof may be presented as an example of the operation input device 160.

The display device 162 is included in the information processing apparatus 100 and connected to the input/output interface 158 in the information processing apparatus 100. For example, a liquid crystal display and an organic electroluminescence display (or an organic light emitting diode (OLED) display) may be presented as examples of the display device 162.

The input/output interface 158 may be connected to external devices of the information processing apparatus 100, such as the external operation input device (e.g., keyboard and mouse) and the external display device. In addition, the display device 162 may be a display device that may be manipulated by the user, such as a touch panel.

The communication interface 164 is a communication unit with which the information processing apparatus 100 is equipped and functions as a communication unit 102 that performs wired or wireless communication with an external device such as an external imaging apparatus (the first imaging apparatus, the second imaging apparatus, or the like) or a server via a network (or directly). Here, examples of the communication interface 164 include a communication antenna and a radio frequency (RF) circuit (wireless communication), an IEEE 802.15.1 port and a transceiving circuit (wireless communication), an IEEE 802.11 port and a transceiving circuit (wireless communication), and a local area network (LAN) terminal and a transceiving circuit (wired communication). Examples of the network according to the present embodiment include a wired network such as a LAN or a wide area network (WAN), a wireless network such as a wireless LAN (WLAN), and the Internet using a communication protocol such as a transmission control protocol/Internet protocol (TCP/IP).

The information processing apparatus 100 performs the process according to the information processing method of the present embodiment, for example, through the configuration illustrated in FIG. 35. A hardware configuration of the information processing apparatus 100 according to the present embodiment is not limited to the configuration illustrated in FIG. 35.

For example, the information processing apparatus 100 may not include the communication interface 164 when communicating with an external device via an external communication device connected thereto.

Further, the information processing apparatus 100 may further include, for example, an imaging device that functions as an imaging unit (not illustrated) that generates a captured image through imaging.

The imaging device includes, for example, a lens/imaging element and a signal processing circuit. The lens/imaging element is configured with, for example, lenses of an optical system and an image sensor using a plurality of imaging elements such as complementary metal oxide semiconductor (CMOS). The signal processing circuit includes, for example, an automatic gain control (AGC) circuit and an analog to digital converter (ADC), and converts an analog signal generated by the imaging element into a digital signal (image data). Further, for example, the signal processing circuit performs various kinds of processes related to RAW development. Further, the signal processing circuit may perform various kinds of signal processing such as white balance correction processing, color tone correction processing, gamma correction processing, YCbCr conversion processing, edge enhancement processing, and the like.

For example, when the imaging device is provided, the information processing apparatus 100 can perform the process (position estimation process) of (1) using the captured image captured by the imaging device as the first captured image or the second captured image. In other words, the information processing apparatus 100 including an imaging device functioning as an imaging unit (not illustrated) can undertake, for example, the role of the first imaging apparatus or the second imaging apparatus in the information processing system according to the present embodiment. The information processing apparatus 100 may perform the process (position estimation process) of (1) using the captured image captured by a connected external imaging device as the first captured image or the second captured image.

Further, the information processing apparatus 100 can be configured not to include, for example, the recording medium 156, the operation input device 160, and the display device 162.

Further, for example, the configuration illustrated in FIG. 35 (or a configuration according to a modified example) may be implemented by one or more integrated circuits (ICs).

An example of the configuration of the information processing apparatus 100 will be described with reference back to FIG. 34. The communication unit 102 is a communication unit with which the information processing apparatus 100 is equipped and performs wired or wireless communication with an external device such as an external imaging apparatus or a server via a network (or directly). Further, the communication of the communication unit 102 is controlled, for example, by the control unit 104.

Here, the communication unit 102 includes, for example, a communication antenna and an RF circuit, a LAN terminal and a transceiving circuit, and the like, but the configuration of the communication unit 102 is not limited to the above example. For example, the communication unit 102 may have a configuration corresponding to an arbitrary standard capable of performing communication such as a USB terminal and a transceiving circuit or an arbitrary configuration capable of performing communication with an external device via a network. Further, the communication unit 102 may be configured to performing communication with one or more external devices in accordance with a plurality of communication schemes.

The control unit 104 is configured with, for example, an MPU or the like and undertakes a role of controlling the entire information processing apparatus 100. Further, the control unit 104 includes, for example, the position estimating unit 110 and the processing unit 112, and undertakes a leading role in performing the process according to the information processing method of the present embodiment.

The position estimating unit 110 undertakes a leading role in the process (position estimation process) of (1), and estimates the position of the second imaging apparatus on the basis of the first captured image and the second captured image captured at the time corresponding to the first captured image.

For example, the position estimating unit 110 performs the position estimation process according to the first example described in (1-1) and the position estimation process according to the second example described in (1-2). Further, the position estimating unit 110 may narrow down the first captured image used for the process and estimate the position of the second imaging apparatus on the basis of the narrowed first captured image and the second captured image captured at the time corresponding to the first captured image.

The processing unit 112 undertakes a leading role in the process using the estimated position of the second imaging apparatus. The processing unit 112 performs the process (information transmission control process) of (2) using, for example, the position of the second imaging apparatus estimated in the position estimating unit 110. Further, the processing unit 112 can also perform other processes using the estimated position of the second imaging apparatus, for example, the process related to the tracking of the subject. Further, for example, the processing unit 112 performs the processes related to the use cases implemented by the process using the estimated position of the second imaging apparatus using the position of the second imaging apparatus estimated by the position estimating unit 110.

For example, the control unit 104 includes the position estimating unit 110 and the processing unit 112 and thus undertakes a leading role in the process according to the information processing method of the present embodiment.

For example, through the configuration illustrated in FIG. 34, the information processing apparatus 100 performs the process according to the information processing method of the present embodiment (for example, the process (position estimation process) of (1) and the process using the estimated position of the second imaging apparatus).

Therefore, the information processing apparatus 100 can estimate the position on the basis of the captured image, for example, through the configuration illustrated in FIG. 34.

Further, for example, through the configuration illustrated in FIG. 34, the information processing apparatus 100 can achieve the effects that are obtained by performing the process according to the information processing method of the present embodiment.

The configuration of the information processing apparatus according to the present embodiment is not limited to the configuration illustrated in FIG. 34.

For example, the information processing apparatus according to the present embodiment may include either or both of the position estimating unit 110 and the processing unit 112 illustrated in FIG. 34, separately from the control unit 104 (for example, can implement them through a separate processing circuit).

Further, as described above, the "process (position estimation process) of (1) and the process using the estimated position of the second imaging apparatus" are processes obtained by dividing the process according to the information processing method of the present embodiment. Therefore, the configuration for implementing the process according to the information processing method of the present embodiment is not limited to the position estimating unit 110 and the processing unit 112 illustrated in FIG. 34 and may have a configuration according to a method of dividing the process according to the information processing method of the present embodiment.

Further, for example, when communication with an external device via an external communication device having a similar function and configuration as the communication unit 102, the information processing apparatus according to the present embodiment may not have the communication unit 102.

Further, the information processing apparatus according to the present embodiment may be configured not to include the processing unit 112 illustrated in FIG. 34. Even when the processing unit 112 is not provided, the information processing apparatus according to the present embodiment can perform the process (position estimation process) of (1) and thus can estimate the position on the basis of the captured image.

Further, the information processing apparatus according to the present embodiment may further include an imaging unit (not illustrated). When the imaging unit (not illustrated) is further provided, the position estimating unit 110 performs the process (position estimation process) of (1) using the captured image generated by the imaging unit as the first captured image or the second captured image.

[II] First Imaging Apparatus 200

The first imaging apparatus 200 is an imaging apparatus whose position is specified. As the first imaging apparatus 200, as described above, an imaging apparatus which is installed at a predetermined place such as a security camera and has a fixed imaging position may be used.

FIG. 36 is an explanatory diagram illustrating an example of a hardware configuration of the first imaging apparatus 200 according to the present embodiment. The first imaging apparatus 200 includes, for example, an MPU 250, a ROM 252, a RAM 254, a recording medium 256, a communication interface 258, and an imaging device 260. Further, in the first imaging apparatus 200, the respective components are connected, for example, via a bus 262 serving as a data transmission line.

The MPU 250 is configured with, for example, a processor including an operation circuit such as an MPU, various kinds of processing circuits, and the like, and controls the first imaging apparatus 200 in general. Further, for example, the MPU 250 performs various processes such as processing of the captured image captured by the imaging device 260.

The ROM 252 stores control data such as programs and operation parameters used by the MPU 250. The RAM 254 temporarily stores, for example, programs executed by the MPU 250.

For example, the recording medium 256 stores various data such as applications. For example, the recording medium 156 may store image data indicating the captured image or the like Examples of the recording medium 256 include a magnetic recording medium such as a hard disk and a nonvolatile memory such as a flash memory. Further, the recording medium 256 may be removable from the first imaging apparatus 200.

The communication interface 258 is a communication unit with which the first imaging apparatus 200 is equipped, and functions as a communication unit (not illustrated) that performs wired or wireless communication with an external device such as the information processing apparatus 100 via a network (or directly). Examples of the communication interface 258 include a communication antenna and an RF circuit (wireless communication), an IEEE 802.15.1 port and a transceiving circuit (wireless communication), an IEEE 802.11 port and a transceiving circuit (wireless communication), and a LAN terminal and a transceiving circuit (wired communication). Further, the communication unit (not illustrated) may have a configuration that supports any standard capable of performing communication such as a USB terminal and a transceiving circuit or may have any configuration capable of performing communication with an external device via a network.

The imaging device 260 is an imaging unit with which the first imaging apparatus 200 is equipped and generates an image (a captured image) through imaging. The imaging device 260 includes, for example, a lens/imaging element and a signal processing circuit. The lens/imaging element is configured with, for example, lenses of an optical system and an image sensor using a plurality of imaging elements such as CMOS. The signal processing circuit includes, for example, an AGC circuit and an ADC, and converts an analog signal generated by the imaging element into a digital signal (image data). Further, for example, the signal processing circuit performs various kinds of processes related to RAW development. Further, the signal processing circuit may perform various kinds of signal processing such as white balance correction processing, color tone correction processing, gamma correction processing, YCbCr conversion processing, edge enhancement processing, and the like.

Through the configuration illustrated in FIG. 36, the first imaging apparatus 200 generates the first captured image through imaging, and transmits the generated first captured image and the like to an external device such as the information processing apparatus 100. Further, the hardware configuration of the first imaging apparatus 200 according to the present embodiment is not limited to the configuration illustrated in FIG. 36.

For example, when the captured image generated by a connected external imaging device is transmitted to an external device such as the information processing apparatus 100, the first imaging apparatus 200 may be configured not to include the imaging device 260.

Further, when the captured image is transmitted to an external device such as the information processing apparatus 100 via the connected external communication device, the first imaging apparatus 200 may be configured not to include the communication interface 258.

Further, for example, the first imaging apparatus 200 may further include other imaging devices such as an infrared camera or other devices such as a device related to position measurement such as a GPS device.

[III] Second Imaging Apparatus 300

The second imaging apparatus 300 is an imaging apparatus whose position is estimated by the information processing apparatus 100. Examples of the second imaging apparatus 300 include an imaging apparatus mounted on an arbitrary vehicle such as a car (an imaging apparatus installed in a vehicle), or a portable device such as a mobile phone, a smartphone, or a tablet type device, and an imaging apparatus with a variable imaging position as described above.

For example, the second imaging apparatus 300 has a similar hardware configuration to the hardware configuration of the first imaging apparatus 200 illustrated in FIG. 36, and generates the second captured image through imaging and transmits the generated second captured image and the like to an external device such as an information processing apparatus 100.

Further, the hardware configuration of the second imaging apparatus 300 according to the present embodiment is not limited to a similar hardware configuration as the hardware configuration of the first imaging apparatus 200 illustrated in FIG. 36. For example, the second imaging apparatus 300 may further include a sensor capable of detecting motion such as acceleration sensor or other devices such as a device related to position measurement such as a GPS device.

The information processing apparatus has been described above as a component constituting the information processing system according to the present embodiment, but the present embodiment is not limited to this example. The present embodiment can be applied to various devices capable of processing images such as computers such as personal computers (PCs) or servers, communication devices such as mobile phones or smartphones, and tablet type devices. Further, for example, the present embodiment can also be applied to one or more ICs which can be incorporated into the above-described apparatus.

Further, as described above, the information processing apparatus according to the present embodiment may be the first imaging apparatus or the second imaging apparatus in the information processing system according to the present embodiment.

Further, the information processing apparatus according to the present embodiment may be used for a system that is composed of one or two or more devices and is designed to be connected to a network (or to perform communication between devices), such as for cloud computing. In other words, the information processing apparatus according to the present embodiment described above may be configured as a system composed of a plurality of devices, for example.

(Program According to Present Embodiment)

A position can be estimated on the basis of a captured image as a program (a program capable of executing the process according to the information processing method of the present embodiment such as the "process (position estimation process) of (1)" or the "process (position estimation process) of (1) and the process using the estimated position of the second imaging apparatus") causing a computer to function as the information processing apparatus according to the present embodiment is executed by a processor or the like in the computer.

Further, by a program for causing a computer to function as the the information processing apparatus according to the present embodiment being executed by the processor, or the like, at the computer, it is possible to provide effects provided by the above-described processing relating to the information processing method according to the present embodiment being performed.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the above shows that a program (computer program) causing a computer to function as the information processing apparatus according to the present embodiment is provided, but the present embodiment can further provide a recording medium caused to store the program.

The above configuration shows an example of the present embodiment and naturally comes under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An information processing apparatus, including:

a position estimating unit configured to estimate a position of a second imaging apparatus on the basis of a first captured image captured by a first imaging apparatus whose position is specified and a second captured image captured at a time corresponding to the first captured image by the second imaging apparatus serving as a position estimation target.

(2)

The information processing apparatus according to (1), in which, in the case where an object included in the first captured image is included in the second captured image, the position estimating unit estimates a position of the first imaging apparatus as the position of the second imaging apparatus.

(3)

The information processing apparatus according to (2), in which, in the case where the second imaging apparatus is further included in the first captured image, the position estimating unit estimates the position of the first imaging apparatus as the position of the second imaging apparatus.

(4)

The information processing apparatus according to (2), in which, in the case where the first imaging apparatus is further included in the second captured image, the position estimating unit estimates the position of the first imaging apparatus as the position of the second imaging apparatus.

(5)

The information processing apparatus according to any one of (2) to (4), in which, in the case where a position of the object is specified, the position estimating unit estimates the position of the first imaging apparatus or the position of the object as the position of the second imaging apparatus.

(6)

The information processing apparatus according to (1), in which, in the case where an object included in the first captured image is included in the second captured image, the position estimating unit estimates the position of the second imaging apparatus on the basis of first relative position information indicating a relative position of the object with respect to the first imaging apparatus and second relative position information indicating a relative position of the object with respect to the second imaging apparatus.

(7)

The information processing apparatus according to (6), in which the position estimating unit estimates a relative position of the second imaging apparatus with respect to the position of the first imaging apparatus as the position of the second imaging apparatus.

(8)

The information processing apparatus according to (6), in which the position estimating unit estimates an absolute position of the second imaging apparatus based on the position of the first imaging apparatus and a relative position of the second imaging apparatus with respect to the position of the first imaging apparatus as the position of the second imaging apparatus.

(9)

The information processing apparatus according to (1), in which, in the case where an object included in the first captured image is included in the second captured image, and the second imaging apparatus is included in the first captured image, the position estimating unit estimates the position of the second imaging apparatus on the basis of third relative position information indicating a relative position of the second imaging apparatus with respect to the first imaging apparatus.

(10)

The information processing apparatus according to (1), in which, in the case where an object included in the first captured image is included in the second captured image, and the first imaging apparatus is included in the second captured image, the position estimating unit estimates the position of the second imaging apparatus on the basis of fourth relative position information indicating a relative position of the first imaging apparatus with respect to the second imaging apparatus.

(11)

The information processing apparatus according to any one of (1) to (10), in which the position estimating unit
  narrows down a position at which the second imaging apparatus is likely to be located on the basis of information related to the second imaging apparatus, and
  estimates the position of the second imaging apparatus on the basis of the first captured image captured by the first imaging apparatus located at a position corresponding to the narrowed-down position.

(12)

The information processing apparatus according to any one of (1) to (11) further including, a processing unit configured to transmit information based on the estimated position of the second imaging apparatus to an external device.

(13)

The information processing apparatus according to any one of ( ) to (12), further including, an imaging unit configured to generate a captured image through image capturing, in which the position estimating unit uses the captured image generated by the imaging unit as the first captured image or the second captured image.

(14)

The information processing apparatus according to any one of (1) to (13), in which the second imaging apparatus is an imaging apparatus installed in a vehicle.

(15)

The information processing apparatus according to any one of (1) to (14), in which the position estimating unit estimates the position of the second imaging apparatus on the basis of the first captured image and the second captured image which are acquired via communication.

(16)

The information processing apparatus according to any one of (6) to (8), in which the position estimating unit estimates the position of the second imaging apparatus on the basis of the first relative position information stored in a recording medium that stores the first relative position information.

(17)

The information processing apparatus according to any one of (1) to (11), further including, a processing unit configured to estimate a subject corresponding to the second imaging apparatus on the basis of the estimated position of the second imaging apparatus and the first captured image, and detect the estimated subject from the first captured image captured after the estimation in the case where the subject is estimated.

(18)

The information processing apparatus according to any one of (6) to (8), in which the relative position of the object with respect to the second imaging apparatus is estimated from a distance between the second imaging apparatus and the object estimated from a magnitude of an imaging range by using information of a lens of the second imaging apparatus, and a direction in which an object is located with respect to the second imaging apparatus estimated from a shape of the imaging range.

(19)

An information processing method that is performed by an information processing apparatus, the information processing method including:

a step of estimating a position of a second imaging apparatus on the basis of a first captured image captured by a first imaging apparatus whose position is specified and a second captured image captured at a time corresponding to the first captured image by the second imaging apparatus serving as a position estimation target.

(20)

An information processing system, including:

a first imaging apparatus whose position is specified;

a second imaging apparatus that serves as a position estimation target; and an information processing apparatus that includes a position estimating unit configured to estimate a position of the second imaging apparatus on the basis of a first captured image captured by the first imaging apparatus and a second captured image captured at a time corresponding to the first captured image by the second imaging apparatus.

REFERENCE SIGNS LIST

100 information processing apparatus
102 communication unit 104 control unit
110 position estimating unit
112 processing unit
200 first imaging apparatus
300 second imaging apparatus
1000 information processing system

The invention claimed is:

1. An information processing apparatus, comprising:
at least one processor configured to:
  determine a position of a subject in at least one of a first image or a second image; and
  determine a position of a first imaging apparatus based on the determined position of the subject and a specified position of a second imaging apparatus, wherein
    the second image is captured by the second imaging apparatus, and
    the first image is captured by the first imaging apparatus at a time that is same as a time of capture of the second image.

2. The information processing apparatus according to claim 1, wherein the at least one processor is further configured to determine the position of the first imaging apparatus as the specified position of the second imaging apparatus, based on the subject included in each of the first image and the second image.

3. The information processing apparatus according to claim 2, wherein the at least one processor is further configured to determine the position of the first imaging apparatus as the specified position of the second imaging apparatus, based on the second image that includes the first imaging apparatus.

4. The information processing apparatus according to claim 2, wherein the at least one processor is further configured to determine the position of the first imaging apparatus as the specified position of the second imaging apparatus, based on the first image that includes the second imaging apparatus.

5. The information processing apparatus according to claim 2, wherein
the at least one processor is further configured to determine the position of the first imaging apparatus as one of the position of the subject or the specified position of the second imaging apparatus.

6. The information processing apparatus according to claim 1, wherein the at least one processor is further configured to:
  determine that the subject is included in the first image and the second image; and
  determine the position of the first imaging apparatus based on the determination that the subject is included in the first image and the second image, first relative position information indicating a relative position of the subject with respect to the first imaging apparatus, and second relative position information indicating a relative position of the subject with respect to the second imaging apparatus.

7. The information processing apparatus according to claim 6, wherein the at least one processor is further configured to determine the position of the first imaging apparatus as a relative position of the first imaging apparatus with respect to the specified position of the second imaging apparatus.

8. The information processing apparatus according to claim 6, wherein the at least one processor is further configured to determine the position of the first imaging apparatus as an absolute position of the first imaging apparatus, based on the specified position of the second imaging apparatus and based on a relative position of the first imaging apparatus with respect to the specified position of the second imaging apparatus.

9. The information processing apparatus according to claim 1, wherein the at least one processor is further configured to:
  determine that the subject is included in the first image and the second image;
  determine that the second image includes the first imaging apparatus; and
  determine the position of the first imaging apparatus based on:
    the determination that the subject is included in the first image and the second image,
    the determination that the second image includes the first imaging apparatus, and
    third relative position information indicating a relative position of the first imaging apparatus with respect to the second imaging apparatus.

10. The information processing apparatus according to claim 1, wherein the at least one processor is further configured to:
  determine that the subject is included in the first image and the second image;
  determine that the first image includes the second imaging apparatus; and
  determine the position of the first imaging apparatus based on:
    the determination that the subject is included in the first image and the second image,
    the determination that the first image includes the second imaging apparatus, and
    fourth relative position information indicating a relative position of the second imaging apparatus with respect to the first imaging apparatus.

11. The information processing apparatus according to claim 1, wherein the at least one processor is further configured to:
  determine a narrowed-down position corresponding to the first imaging apparatus based on information associated with the first imaging apparatus; and
  determine the position of the first imaging apparatus based on the second image captured by the second imaging apparatus, wherein the second imaging apparatus is at a position corresponding to the narrowed-down position.

12. The information processing apparatus according to claim 1, wherein the processor is further configured to transmit information to an external device based on the determined position of the first imaging apparatus.

13. The information processing apparatus according to claim 1, further comprising an imaging device configured to generate a captured image, wherein the at least one processor is further configured to utilize the captured image as one of the first image or the second image.

14. The information processing apparatus according to claim 1, wherein the first imaging apparatus is in a vehicle.

15. The information processing apparatus according to claim 6, wherein the at least one processor is further configured to determine the position of the first imaging apparatus based on the first relative position information stored in a recording medium.

16. The information processing apparatus according to claim 1, wherein the at least one processor is further configured to detect the subject from the first image.

17. The information processing apparatus according to claim 6, wherein the at least one processor is further configured to determine:
- a distance between the first imaging apparatus and the subject based on a magnitude of an imaging range of the first imaging apparatus, and further based on information of a lens of the first imaging apparatus,
- a direction associated with the subject with respect to the first imaging apparatus, based on a shape of the imaging range, and
- the relative position of the subject with respect to the first imaging apparatus based on the distance between the first imaging apparatus and the subject, and the direction associated with the subject.

18. An information processing method, comprising:
in an information processing apparatus:
- determining a position of a subject in at least one of a first image or a second image; and
- determining a position of a first imaging apparatus based on the determined position of the subject and a specified position of a second imaging apparatus, wherein
  - the second image is captured by the second imaging apparatus, and
  - the first image is captured by the first imaging apparatus at a time that is same as a time of capture of the second image.

19. An information processing system, comprising:
- a first imaging apparatus having a specified position, wherein the first imaging apparatus is configured to capture a first image;
- a second imaging apparatus that is a position estimation target, wherein the second imaging apparatus is configured to capture a second image; and
- an information processing apparatus that includes at least one processor configured to:
  - determine a position of a subject in at least one of the first image or the second image; and
  - determine a position of the second imaging apparatus based on the determined position of the subject and the specified position of the first imaging apparatus,
    - wherein the first image is captured by the first imaging apparatus at a time that is same as a time of capture of the second image.

20. An information processing apparatus, comprising:
at least one processor configured to:
- determine a position of a first imaging apparatus based on a first image and a second image, wherein
  - the second image is captured by a second imaging apparatus having a specified position,
  - the first image is captured by the first imaging apparatus at a time that is same as a time of capture of the second image, and
  - the position of the first imaging apparatus is determined as the specified position of the second imaging apparatus, based on one of:
    - the second image that includes the first imaging apparatus, or
    - the first image that includes the second imaging apparatus.

* * * * *